US011431898B2

(12) United States Patent
Miyatani

(10) Patent No.: US 11,431,898 B2
(45) Date of Patent: Aug. 30, 2022

(54) SIGNAL PROCESSING DEVICE AND IMAGING DEVICE

(71) Applicant: SONY CORPORATION, Tokyo (JP)

(72) Inventor: Yoshitaka Miyatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 16/754,489

(22) PCT Filed: Oct. 19, 2018

(86) PCT No.: PCT/JP2018/038939
§ 371 (c)(1),
(2) Date: Apr. 8, 2020

(87) PCT Pub. No.: WO2019/078332
PCT Pub. Date: Apr. 25, 2019

(65) Prior Publication Data
US 2020/0396380 A1    Dec. 17, 2020

(30) Foreign Application Priority Data
Oct. 19, 2017   (JP) .............................. JP2017-202770

(51) Int. Cl.
*H04N 5/232*   (2006.01)
*H04N 5/378*   (2011.01)

(52) U.S. Cl.
CPC ......... *H04N 5/23229* (2013.01); *H04N 5/378* (2013.01)

(58) Field of Classification Search
CPC ............... H04N 5/23229; H04N 5/378; H04N 2013/0088; H04N 5/225; H04N 5/232;
(Continued)

(56) References Cited

U.S. PATENT DOCUMENTS

2009/0022410 A1   1/2009   Haskell
2014/0226038 A1*  8/2014   Kimura ............. H04N 5/23277
                                                    348/239
(Continued)

FOREIGN PATENT DOCUMENTS

CN        102572273 A       7/2012
JP        2016-253325   *  12/2016   ............. G01B 11/24
(Continued)

OTHER PUBLICATIONS

International Search Report dated Dec. 25, 2018 in PCT/JP2018/038939 filed Oct. 19, 2018, 1 page.

*Primary Examiner* — Nhan T Tran
(74) *Attorney, Agent, or Firm* — Oblon, McClelland, Maier & Neustadt, L.L.P.

(57) ABSTRACT

The present disclosure relates to a signal processing device and an imaging device capable of improving an image quality of the imaging device that does not use an imaging lens.

A signal processing device includes a restoration unit that restores one restored image by using a plurality of detection signal sets obtained by an imaging element in a plurality of states in which at least one of a position or orientation with respect to a subject is different, the imaging element that includes a plurality of pixel output units that receives incident light from the subject incident without an intervention of an imaging lens or a pinhole and each outputs one detection signal indicating an output pixel value modulated by an incident angle of the incident light, and outputs a detection signal set including a plurality of detection signals output from the plurality of pixel output units. The present disclosure is applicable to, for example, an imaging system that images using a plurality of imaging devices.

20 Claims, 45 Drawing Sheets

(58) Field of Classification Search
CPC ......... H04N 5/2258; G06T 1/00; G06T 5/001; G06T 7/70
See application file for complete search history.

(56) References Cited

U.S. PATENT DOCUMENTS

| | | | |
|---|---|---|---|
| 2015/0219808 A1* | 8/2015 | Gill | G02B 5/1842 |
| | | | 348/335 |
| 2015/0326838 A1 | 11/2015 | Kawai | |
| 2019/0020789 A1* | 1/2019 | Shimano | H04N 5/232 |
| 2019/0313018 A1* | 10/2019 | Ono | H04N 5/22541 |

FOREIGN PATENT DOCUMENTS

| | | |
|---|---|---|
| WO | WO 2017/145348 A1 | 8/2017 |
| WO | WO 2017/149687 A1 | 9/2017 |

* cited by examiner

SIGNAL PROCESSING DEVICE AND IMAGING DEVICE

TECHNICAL FIELD

The present disclosure relates to a signal processing device and an imaging device, and especially relates to a signal processing device and an imaging device capable of improving an image quality of an imaging device that does not use an imaging lens.

BACKGROUND ART

Conventionally, suggested is an imaging device that images while modulating light from a subject by a lattice-shaped optical filter that covers a light-receiving surface of an imaging element or an optical filter including a diffraction grating without using an imaging lens, and restores a restored image formed as an image of the subject by predetermined arithmetic processing (refer to, for example, Non-Patent Document 1 and Patent Documents 1 and 2).

CITATION LIST

Non-Patent Document

Non-Patent Document 1: M. Salman Asif and four others, "Flatcam: Replacing lenses with masks and computation", "2015 IEEE International Conference on Computer Vision Workshop (ICCVW)", 2015, pages 663-666

Patent Document

Patent Document 1: Japanese Unexamined Patent Publication No. 2016-510910
Patent Document 2: International Publication No. 2016/123529

SUMMARY OF THE INVENTION

Problems to be Solved by the Invention

Incidentally, it is desired to improve an image quality of an imaging device that does not use the imaging lens as disclosed in Non-Patent Document 1 and Patent Documents 1 and 2.

The present disclosure is achieved in view of such a situation, and an object thereof is to improve the image quality of the imaging device that does not use the imaging device.

Solutions to Problems

A signal processing device according to a first aspect of the present disclosure includes a restoration unit that restores one restored image by using a plurality of detection signal sets obtained by an imaging element in a plurality of states in which at least one of a position or orientation with respect to a subject is different, the imaging element that includes a plurality of pixel output units that receives incident light from the subject incident without an intervention of an imaging lens or a pinhole and each outputs one detection signal indicating an output pixel value modulated by an incident angle of the incident light, and outputs a detection signal set including a plurality of detection signals output from the plurality of pixel output units.

An imaging device according to a second aspect of the present disclosure includes one or more imaging elements that includes a plurality of pixel output units that receives incident light from a subject incident without an intervention of an imaging lens or a pinhole and each outputs one detection signal indicating an output pixel value modulated by an incident angle of the incident light, and outputs a detection signal set including a plurality of detection signals output from the plurality of pixel output units, and an association unit that associates the detection signal set with metadata used for restoring a restored image using the detection signal set.

In the first aspect of the present disclosure, one restored image is restored by using a plurality of detection signal sets obtained by an imaging element in a plurality of states in which at least one of a position or orientation with respect to a subject is different, the imaging element that includes a plurality of pixel output units that receives incident light from the subject incident without an intervention of an imaging lens or a pinhole and each outputs one detection signal indicating an output pixel value modulated by an incident angle of the incident light, and outputs a detection signal set including a plurality of detection signals output from the plurality of pixel output units.

In the second aspect of the present disclosure, a detection signal set and metadata used for restoring a restored image using the detection signal set are associated with each other.

Effects of the Invention

According to the first aspect or the second aspect of the present disclosure, the image quality of the imaging device that does not use the imaging lens is improved.

Note that, the effects are not necessarily limited to the effects herein described and may include any of the effects described in the present disclosure.

MODE FOR CARRYING OUT THE INVENTION

A preferred embodiment of the present disclosure is hereinafter described in detail with reference to the accompanying drawings. Note that, in this specification and the drawings, the components having substantially the same functional configuration are assigned with the same reference sign and the description thereof is not repeated appropriately.

Furthermore, the description is given in the following order.

1. Overview of Imaging Device of Present Disclosure
2. Basic Configuration Example of Imaging Device of Present Disclosure
3. Embodiment
4. Variation
5. Others 1. Overview of Imaging Device of Present Disclosure First, an overview of an imaging device of the present disclosure is described.

Figure 1:
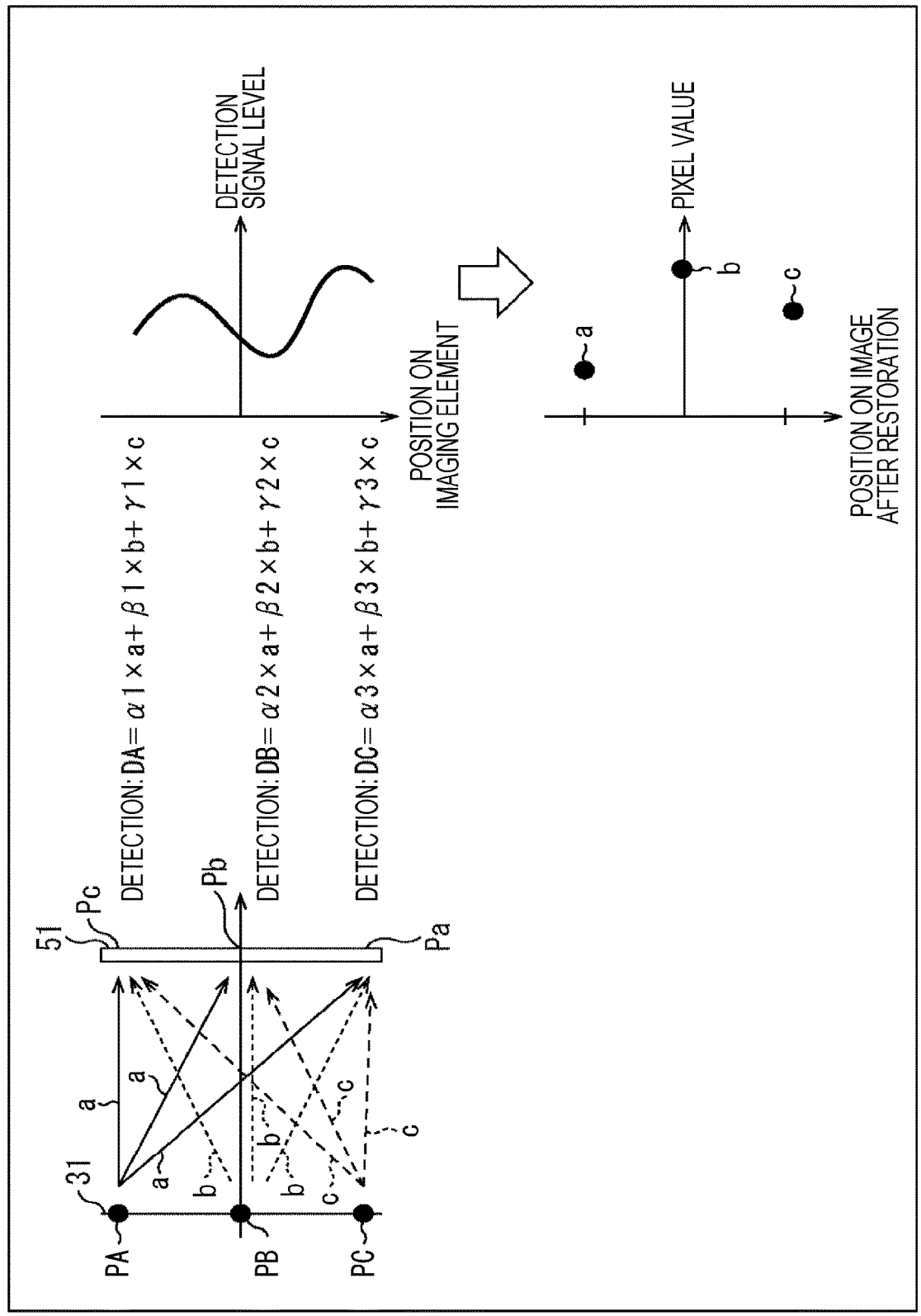
FIG. 1 is a view for illustrating a principle of imaging in an imaging device to which a technology of the present disclosure is applied.

In the imaging device of the present disclosure, as illustrated in an upper left part of FIG. 1, an imaging element 51 in which each pixel has detection sensitivity with incident angle directivity is used. Here, each pixel having the detection sensitivity with the incident angle directivity has a light-receiving sensitivity characteristic according to an incident angle of incident light on each pixel different for each pixel. However, the light-receiving sensitivity characteristics of all the pixels need not be fully different, and the light-receiving sensitivity characteristics of some pixels may be the same.

Here, for example, each of all subjects is a set of point light sources and light is emitted from each point light source in all directions. For example, a subject surface 31 of a subject in the upper left part of FIG. 1 includes point light sources PA to PC, and the point light sources PA to PC emit a plurality of light beams of light intensities a to c, respectively, around.

Furthermore, the imaging element 51 hereinafter includes pixels having different incident angle directivities in positions Pa to Pc (hereinafter referred to as pixels Pa to Pc).

In this case, as illustrated in the upper left part of FIG. 1, the light beams of the same light intensity emitted from the same point light source are incident on respective pixels of the imaging element 51. For example, the light beam of the light intensity a emitted from the point light source PA is incident on each of the pixels Pa to Pc of the imaging element 51. In contrast, the light beams emitted from the same point light source are incident on the respective pixels at different incident angles. For example, the light beams from the point light source PA are incident on the pixels Pa to Pc at the different incident angles.

Here, since the incident angle directivities of the pixels Pa to Pc are different from one another, the light beams of the same light intensity emitted from the same point light source are detected with different sensitivities by the respective pixels. As a result, the light beams of the same light intensity are detected at different detection signal levels by the respective pixels. For example, the detection signal levels for the light beams of the light intensity a from the point light source PA have different values among the pixels Pa to Pc.

Then, the light-receiving sensitivity level of each pixel for the light beam from each point light source is obtained by multiplying the light intensity of the light beam by a coefficient indicating the light-receiving sensitivity to the incident angle of the light beam (that is, the incident angle directivity). For example, the detection signal level of the pixel Pa for the light beam from the point light source PA is obtained by multiplying the light intensity a of the light beam of the point light source PA by the coefficient indicating the incident angle directivity of the pixel Pa to the incident angle of the light beam on the pixel Pa.

Accordingly, detection signal levels DA, DB, and DC of the pixels Pc, Pb, and Pa are expressed by following equations (1) to (3), respectively.

$$DA = \alpha 1 \times a + \beta 1 \times b + \gamma 1 \times c \quad (1)$$

$$DB = \alpha 2 \times a + \beta 2 \times b + \gamma 2 \times c \quad (2)$$

$$DC = \alpha 3 \times a + \beta 3 \times b + \gamma 3 \times c \quad (3)$$

Here, a coefficient $\alpha 1$ is the coefficient indicating the incident angle directivity of the pixel Pc to the incident angle of the light beam from the point light source PA on the pixel Pc, and is set according to the incident angle. Furthermore, $\alpha 1 \times a$ represents the detection signal level of the pixel Pc to the light beam from the point light source PA.

A coefficient $\beta 1$ is the coefficient indicating the incident angle directivity of the pixel Pc to the incident angle of the light beam from the point light source PB on the pixel Pc, and is set according to the incident angle. Furthermore, $\beta 1 \times b$ represents the detection signal level of the pixel Pc for the light beam from the point light source PB.

A coefficient $\gamma 1$ is the coefficient indicating the incident angle directivity of the pixel Pc to the incident angle of the light beam from the point light source PC to the pixel Pc, and is set according to the incident angle. Furthermore, $\gamma 1 \times c$ represents the detection signal level of the pixel Pc to the light beam from the point light source PC.

In this manner, the detection signal level DA of the pixel Pa is obtained by the sum of products of the light intensities a, b, and c of the light beams from the point light sources PA, PB, and PC, respectively, in the pixel Pc, and the coefficients $\alpha 1$, $\beta 1$, and $\gamma 1$ indicating the incident angle directivities according to the incident angles.

Similarly, the detection signal level DB of the pixel Pb is obtained by the sum of products of the light intensities a, b, and c of the light beams from the point light sources PA, PB, and PC, respectively, in the pixel Pb, and the coefficients $\alpha 2$, $\beta 2$, and $\gamma 2$ indicating the incident angle directivities according to the incident angles as expressed by equation (2). Furthermore, the detection signal level DC of the pixel Pc is obtained by the sum of products of the light intensities a, b, and c of the light beams from the point light sources PA, PB, and PC, respectively, in the pixel Pa, and the coefficients $\alpha 2$, $\beta 2$, and $\gamma 2$ indicating the incident angle directivities according to the incident angles as expressed by equation (3).

However, in the detection signal levels DA, DB, and DC of the pixels Pa, Pb, and Pc, the light intensities a, b, and c of the light beams emitted from the point light sources PA, PB, and PC are mixed as expressed by equations (1) to (3). Therefore, as illustrated in an upper right part of FIG. 1, the detection signal level in the imaging element 51 is different from the light intensity of each point light source on the subject surface 31. Therefore, an image obtained by the imaging element 51 is different from that formed as the image of the subject surface 31.

In contrast, the light intensities a to c of the light beams of the respective point light sources PA to PC are obtained by creating simultaneous equations including equations (1) to (3) and solving the created simultaneous equations. Then, by arranging pixels having pixel values according to the obtained light intensities a to c in accordance with arrangement (relative positions) of the point light sources PA to PC, a restored image formed as the image of the subject surface 31 is restored as illustrated in the lower right part of FIG. 1.

Note that, hereinafter, a set of coefficients (for example, coefficients $\alpha 1$, $\beta 1$, and $\gamma 1$) for each of the equations forming the simultaneous equations is referred to as a coefficient set. Furthermore, hereinafter, a group of a plurality of coefficient sets (for example, coefficient set $\alpha 1$, $\beta 1$, and $\gamma 1$, coefficient set $\alpha 2$, $\beta 2$, and $\gamma 2$, and coefficient set $\alpha 3$, $\beta 3$, and $\gamma 3$) corresponding to a plurality of equations included in the simultaneous equations is referred to as a coefficient set group.

In this manner, the imaging device including the imaging element 51 in which each pixel has the incident angle directivity as an indispensable configuration may be realized without need of an imaging lens, a pinhole, and an optical filter disclosed in Patent Document 1 and Non-Patent Document 1 (hereinafter, referred to as Patent Document and the like). As a result, the imaging lens, the pinhole, and the optical filter disclosed in Patent Document and the like are not the indispensable configurations, so that it is possible to make the imaging device short in height, that is, make a thickness thin in the light incident direction in the configuration to realize an imaging function.

Furthermore, since the indispensable configuration is only the imaging element 51, a degree of freedom in design may be improved. For example, in a conventional imaging device using the imaging lens, it is necessary to arrange the pixels of the imaging element into a two-dimensional array in accordance with a position in which the image of the subject is formed by the imaging lens; however, this is not necessary in the imaging device using the imaging element 51. Therefore, a degree of freedom in arrangement of each pixel is improved, and for example, each pixel may be freely arranged within a range in which light from the subject is incident. For example, it becomes possible to arrange the respective pixels in a circular region, in a hollow square (square-shaped) region, or distribute in a plurality of regions.

Then, regardless of the arrangement of the respective pixels, it is possible to obtain the light intensity of the light beam from each point light source by creating the simultaneous equations expressed by equations (1) to (3) described above by using the coefficients according to the incident angles of the light beams from the respective point light sources on the subject surface 31 on the respective pixels and solving the same. Then, by arranging the pixels having the pixel values according to the obtained light intensities of the respective point light sources in accordance with the arrangement of the respective point light sources on the subject surface 31, it is possible to restore the restored image formed as the image of the subject surface 31.

2. Basic Configuration Example of Imaging Device of Present Disclosure

Next, a basic configuration example of the imaging device of the present disclosure is described with reference to FIGS. 2 to 25.

<Configuration Example of Imaging Device 101>

Figure 2:
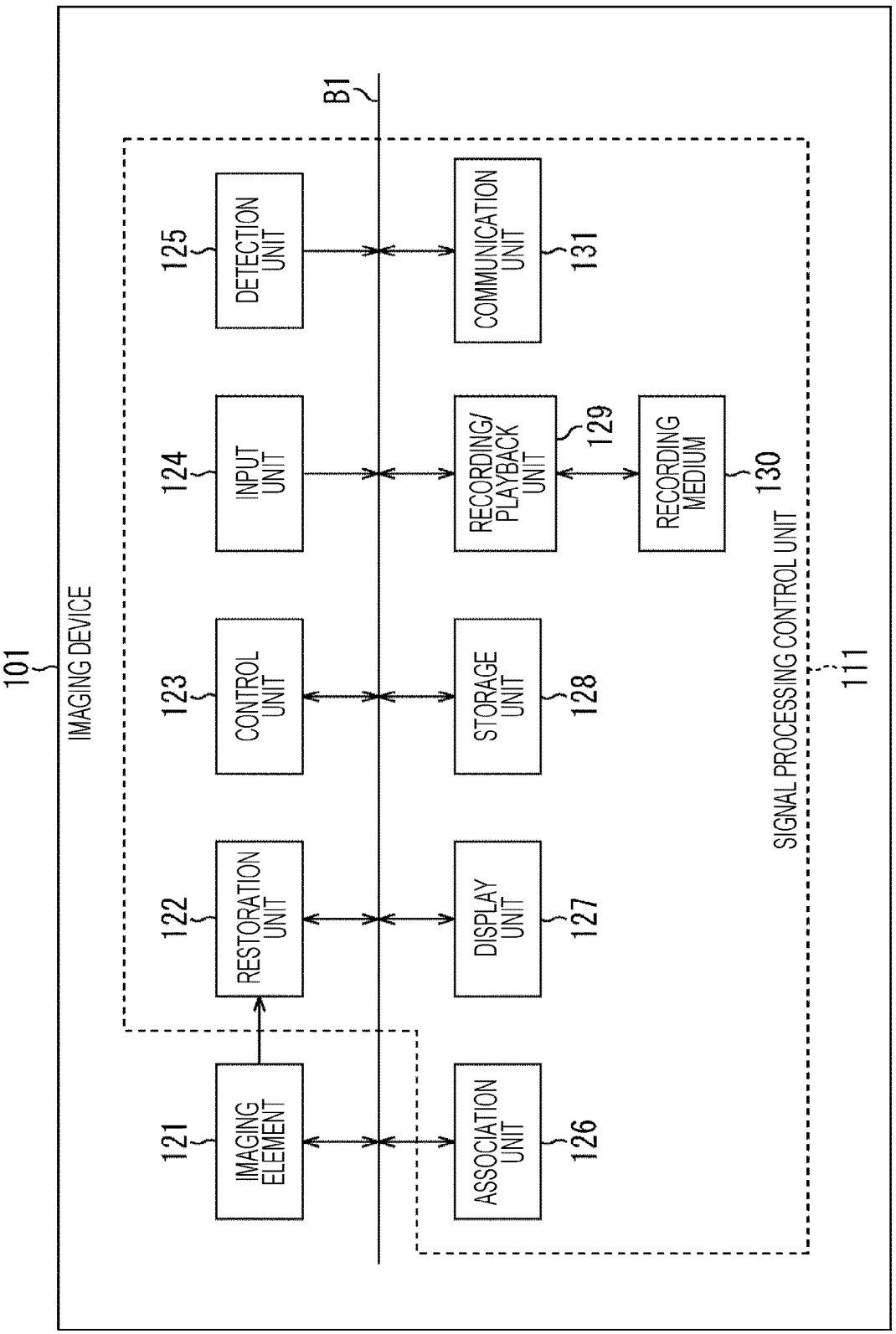
FIG. 2 is a block diagram illustrating a basic configuration example of the imaging device to which the technology of the present disclosure is applied.

FIG. 2 is a block diagram illustrating a configuration example of an imaging device 101 that is a basic imaging device to which the technology of the present disclosure is applied.

The imaging device 101 includes an imaging element 121, a restoration unit 122, a control unit 123, an input unit 124, a detection unit 125, an association unit 126, a display unit 127, a storage unit 128, a recording/playback unit 129, a recording medium 130, and a communication unit 131. Furthermore, the restoration unit 122, the control unit 123, the input unit 124, the detection unit 125, the association unit 126, the display unit 127, the storage unit 128, the recording/playback unit 129, the recording medium 130, and the communication unit 131 form a signal processing control unit 111 that performs signal processing and control and the like of the imaging device 101. Note that, the imaging device 101 does not include an imaging lens (free from imaging lens).

Furthermore, the imaging element 121, the restoration unit 122, the control unit 123, the input unit 124, the detection unit 125, the association unit 126, the display unit 127, the storage unit 128, the recording/playback unit 129, and the communication unit 131 are connected to one another via a bus B1, and perform transmission and reception of data and the like via the bus B1. Note that, hereinafter, in order to simplify the description, description of the bus B1 in a case where each unit of the imaging device 101 performs transmission and reception of the data and the like via the bus B1 is omitted. For example, it is described that the input unit 124 supplies data to the control unit 123 in a case where the input unit 124 supplies the data to the control unit 123 via the bus B1.

The imaging element 121 corresponds to the imaging element 51 described with reference to FIG. 1, the imaging element that includes pixels having incident angle directivities and outputs an image including detection signals indicating the detection signal levels according to an amount of incident light to the restoration unit 122 or the bus B1.

More specifically, the imaging element 121 may have a basic structure similar to that of a general imaging element such as, for example, a complementary metal oxide semiconductor (CMOS) image sensor. However, in the imaging element 121, a configuration of each pixel forming a pixel array is different from that of the general one, and the configuration is with the incident angle directivity as described later with reference to FIGS. 3 to 5, for example. Then, the imaging element 121 has the light-receiving sensitivity different (changing) depending on the incident angle of the incident light for each pixel and has the incident angle directivity to the incident angle of the incident light in a pixel unit.

Note that, the image output from the imaging element 121 is an image including the detection signals in which the image of the subject is not formed as illustrated in the upper right part of FIG. 1 described above, so that the subject cannot be visually recognized. That is, a detection image including the detection signals output by the imaging element 121 is an image that is a set of pixel signals but with which a user cannot recognize the subject through visual contact (the subject cannot be visually recognized).

Therefore, hereinafter, the image including the detection signals in which the image of the subject is not formed as illustrated in the upper right part of FIG. 1, that is, the image captured by the imaging element 121 is referred to as the detection image.

Note that, the imaging element 121 is not necessarily configured as the pixel array, and may also be configured as a line sensor, for example.

Furthermore, the incident angle directivities need not necessarily be different in a pixel unit, and the pixels having the same incident angle directivity may be included.

The restoration unit 122 obtains, for example, a coefficient set group corresponding to a subject distance corresponding to a distance from the imaging element 51 to the subject surface 31 (subject surface corresponding to the restored image) in FIG. 1 and corresponding to the above-described coefficients α1 to α3, β1 to β3, and γ1 to γ3 from the storage unit 128. Furthermore, the restoration unit 122 creates the simultaneous equations as expressed by equations (1) to (3) described above by using the detection signal level of each pixel of the detection image output from the imaging element 121 and the obtained coefficient set group. Then, the restoration unit 122 obtains the pixel value of each pixel forming the image formed as the image of the subject illustrated in the lower right part of FIG. 1 by solving the created simultaneous equations. Therefore, an image in which the user may recognize the subject through the visual contact (in which the subject may be visually recognized) is restored from the detection image. Hereinafter, the image restored from the detection image is referred to as the restored image. However, in a case where the imaging element 121 is sensitive only to light outside a visible wavelength band such as ultraviolet rays, the restored image is not the image in which the subject may be identified as a normal image, but this is also referred to as the restored image.

Furthermore, in the following, the restored image that is an image in a state in which the image of the subject is formed, the image before color separation such as demosaic processing or synchronization processing is referred to as a RAW image, and the detection image captured by the imaging element 121 is distinguished therefrom as not being the RAW image although this is the image according to a color filter array.

Note that, the number of pixels of the imaging element 121 and the number of pixels forming the restored image are not necessarily the same.

Furthermore, the restoration unit 122 performs demosaic processing, γ correction, white balance adjustment, conversion processing to a predetermined compression format and the like on the restored image as necessary. Then, the restoration unit 122 outputs the restored image to the bus B1.

The control unit 123 includes, for example, various processors and controls each unit of the imaging device 101.

The input unit 124 includes an input device (for example, a key, a switch, a button, a dial, a touch panel, a remote controller and the like) for operating the imaging device 101, inputting data used for processing and the like. The input unit 124 outputs an operation signal, the input data and the like to the bus B1.

The detection unit 125 includes various sensors and the like used for detecting states of the imaging device 101, the subject and the like. For example, the detection unit 125 includes an acceleration sensor and a gyro sensor that detect an attitude and movement of the imaging device 101, a position detection sensor that detects a position of the imaging device 101 (for example, a global navigation satellite system (GNSS) receiver and the like), a ranging sensor that detects the subject distance and the like. The detection unit 125 outputs a signal indicating a detection result to the bus B1.

The association unit 126 associates the detection image obtained by the imaging element 121 with metadata corresponding to the detection image. The metadata includes, for example, the coefficient set group for restoring the restored image using a target detection image, the subject distance and the like.

Note that, a method of associating the detection image with the metadata is not especially limited as long as a correspondence relationship between the detection image and the metadata may be specified. For example, by assigning the metadata to image data including the detection image, assigning the same ID to the detection image and the metadata, or recording the detection image and the metadata on the same recording medium 130, the detection image and the metadata are associated with each other.

The display unit 127 includes a display, for example, and displays various types of information (for example, the restored image and the like). Note that, the display unit 127 may include an audio output unit such as a speaker to output audio.

The storage unit 128 includes one or more storage devices such as a read only memory (ROM), a random access memory (RAM), and a flash memory, and stores, for example, programs, data and the like used for processing of the imaging device 101. For example, the storage unit 128 stores the coefficient set group corresponding to the above-described coefficients α1 to α3, β1 to β3, and γ1 to γ3 in association with various subject distances.

More specifically, for example, the storage unit 128 stores the coefficient set group including the coefficient for each pixel 121a of the imaging element 121 for each point light source set on the subject surface 31 for each subject surface 31 at each subject distance.

The recording/playback unit 129 records data on the recording medium 130 and plays back (reads out) the data recorded on the recording medium 130. For example, the recording/playback unit 129 records the restored image on the recording medium 130 or reads out the same from the recording medium 130. Furthermore, for example, the recording/playback unit 129 records the detection image and the corresponding metadata on the recording medium 130 or reads out the same from the recording medium 130.

The recording medium 130 includes, for example, any of a hard disk drive (HDD), a solid state drive (SSD), a magnetic disk, an optical disk, a magneto-optical disk, a semiconductor memory or the like, a combination thereof or the like.

The communication unit 131 communicates with other devices (for example, other imaging device, signal processing device and the like) by a predetermined communication method. Note that, the communication method of the communication unit 131 may be wired or wireless. Furthermore, the communication unit 131 may support a plurality of communication methods.

<First Configuration Example of Imaging Element 121>

Figure 3:
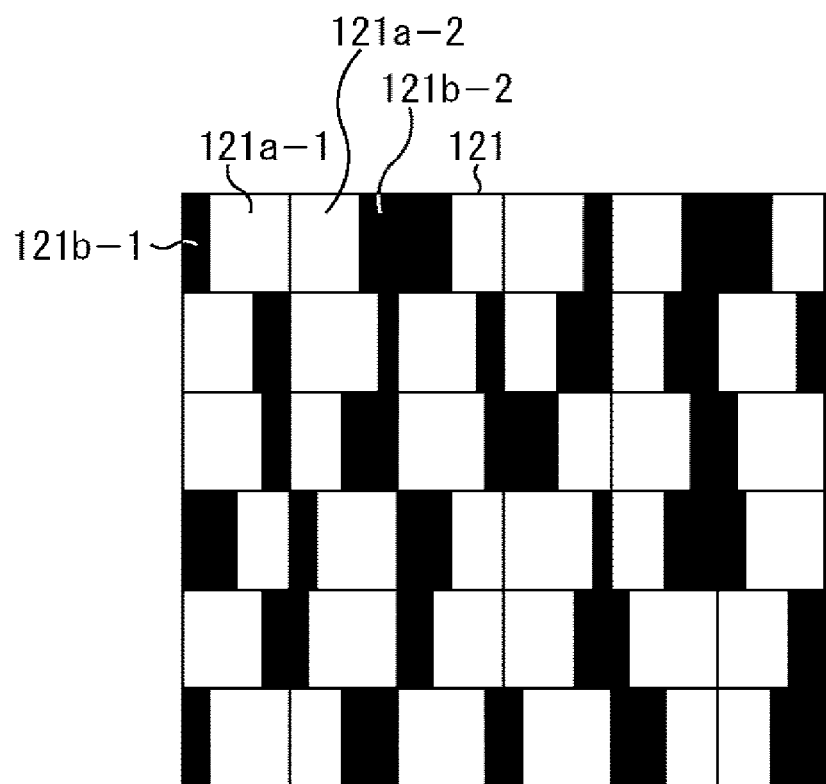
FIG. 3 is a view illustrating a configuration example of a pixel array unit of the imaging element in FIG. 2.
Figure 4:
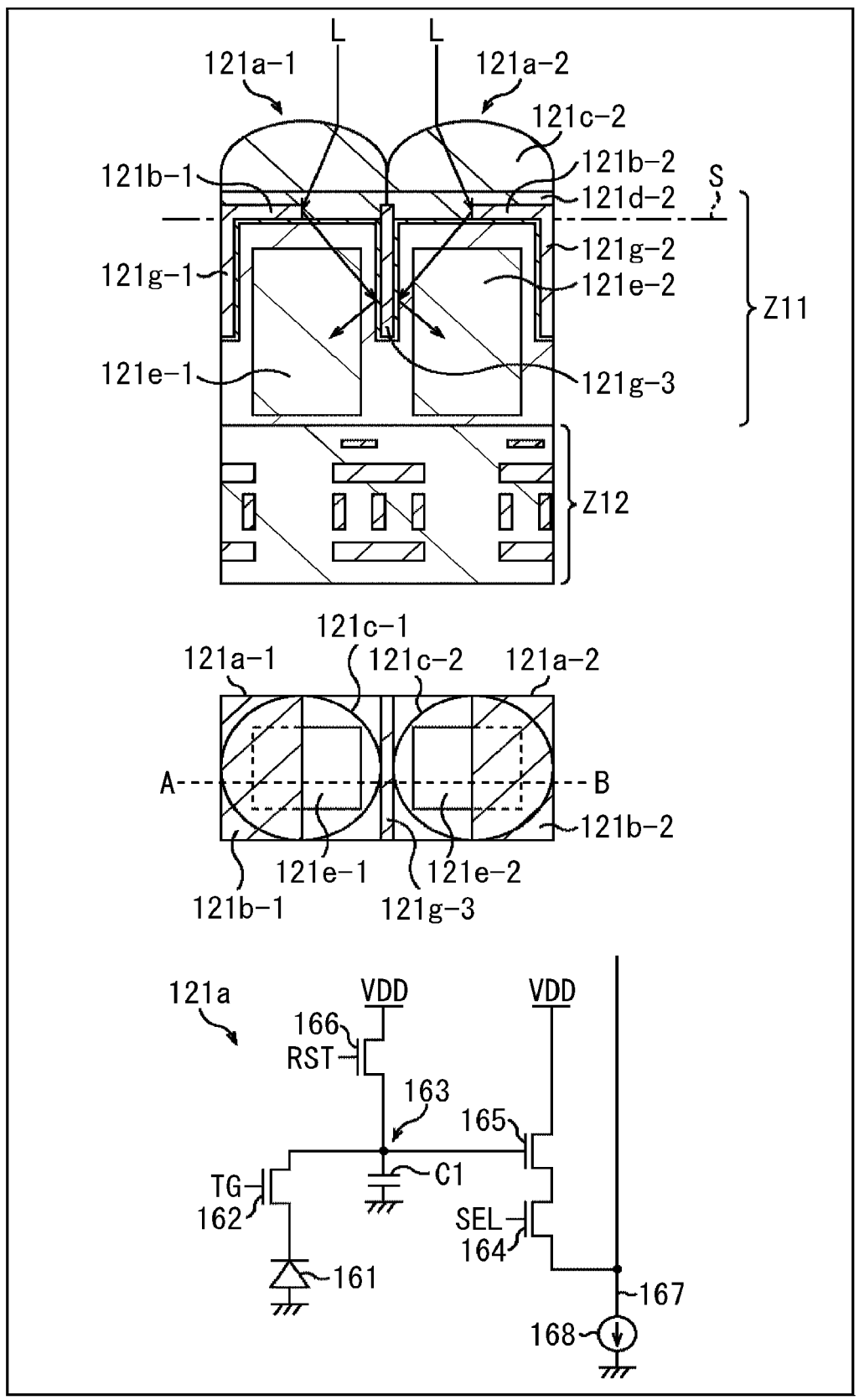
FIG. 4 is a view illustrating a first configuration example of the imaging element in FIG. 2.

Next, with reference to FIGS. 3 and 4, a first configuration example of the imaging element 121 of the imaging device 101 in FIG. 2 is described.

FIG. 3 illustrates a front view of a part of a pixel array unit of the imaging element 121. Note that, FIG. 3 illustrates an example of a case where the number of pixels in the pixel array unit is six pixels vertically×six pixels horizontally, but the number of pixels in the pixel array unit is not limited to this.

In the imaging element 121 in FIG. 3, each pixel 121a includes a light-shielding film 121b that is one of modulation elements so as to cover a part of a light-receiving region (light-receiving surface) of a photodiode thereof, and the incident light incident on each pixel 121a is optically modulated according to the incident angle. Then, for example, by providing the light-shielding film 121b in a different range for each pixel 121a, the light-receiving sensitivity to the incident angle of the incident light differs for each pixel 121a, and the respective pixels 121a have different incident angle directivities.

For example, a light-shielding range of the light-receiving region of the photodiode is different between pixels 121a-1 and 121a-2 due to provided light-shielding films 121b-1 and 121b-2 (at least any one of the light-shielding region (position) or a light-shielding area is different). That is, in the pixel 121a-1, the light-shielding film 121b-1 is provided so as to shield a part of a left side of the light-receiving region of the photodiode by a predetermined width. In contrast, in the pixel 121a-2, the light-shielding film 121b-2 is provided so as to shield a part of a right side of the light-receiving region by a predetermined width. Note that, the width by which the light-shielding film 121b-1 shields the light-receiving region of the photodiode may be different from/the same as the width by which the light-shielding film 121b-2 shields the light-receiving region of the photodiode. In the other pixels 121a as well, similarly, the light-shielding film 121b is randomly arranged in the pixel array so as to shield a different range of the light-receiving region for each pixel.

Note that, as a ratio of the light-shielding film 121b covering the light-receiving region of each pixel increases, the amount of light that the photodiode may receive decreases. Therefore, an area of the light-shielding film 121b is desirably the area that may secure a desired light amount, and may be limited to a maximum of about ¾ of the light-receiving region, for example. With this arrangement, it becomes possible to secure the light amount not smaller than the desired amount.

However, if each pixel includes an unshielded range by a width corresponding to a wavelength of the light to be received, it is possible to receive a minimum amount of light. That is, for example, in a case of a blue pixel (B pixel), the wavelength is about 500 nm, and it is possible to receive the minimum amount of light if the light is not shielded beyond a width corresponding to this wavelength.

An upper stage of FIG. 4 is a side cross-sectional view of the first configuration example of the imaging element 121, and a middle stage of FIG. 4 is a top view of the first configuration example of the imaging element 121. Furthermore, the side-cross sectional view in the upper stage of FIG. 4 is an AB cross-section in the middle stage of FIG. 4. Moreover, a lower stage of FIG. 4 is a circuit configuration example of the imaging element 121.

In the imaging element 121 in the upper stage of FIG. 4, the incident light is incident from an upper side downward in the drawing. The adjacent pixels 121a-1 and 121a-2 are so-called backside irradiation-type with a wiring layer Z12 provided in a lowermost layer in the drawing and a photo-electric conversion layer Z11 provided thereon.

Note that, in a case where there is no need to distinguish between the pixels 121a-1 and 121a-2, description of a number at the end of the reference sign is omitted, and they are simply referred to as the pixels 121a. Hereinafter, in the specification, a number at the end of the reference sign is sometimes omitted similarly for other configurations.

Furthermore, FIG. 4 illustrates only the side view and the top view of two pixels forming the pixel array of the imaging element 121; it goes without saying that more pixels 121a are arranged but not illustrated.

Moreover, the pixels 121a-1 and 121a-2 include photodiodes 121e-1 and 121e-2 in the photoelectric conversion layer Z11, respectively. Furthermore, on the photodiodes 121e-1 and 121e-2, on-chip lenses 121c-1 and 121c-2 and color filters 121d-1 and 121d-2 are stacked from above, respectively.

The on-chip lenses 121c-1 and 121c-2 condense the incident light on the photodiodes 121e-1 and 121e-2, respectively.

The color filters 121d-1 and 121d-2 are optical filters that transmit light of specific wavelengths such as red, green, blue, infrared, and white, for example. Note that, in a case of white, the color filters 121d-1 and 121d-2 may be transparent filters or they are not required.

In the photoelectric conversion layer Z11 of the pixels 121a-1 and 121a-2, light-shielding films 121g-1 to 121g-3 are formed at boundaries between the pixels, and incident light L is inhibited from being incident on the adjacent pixel to generate crosstalk as illustrated in FIG. 4, for example.

Furthermore, as illustrated in the upper and middle stages of FIG. 4, the light-shielding films 121b-1 and 121b-2 shield a part of a light-receiving surface S as seen from above. In the light-receiving surface S of the photodiodes 121e-1 and 121e-2 in the pixels 121a-1 and 121a-2, different ranges are shielded by the light-shielding films 121b-1 and 121b-2, so that the different incident angle directivity is set independently for each pixel. However, the light-shielding range does not have to be different in all the pixels 121a of the imaging element 121, and there may also be the pixels 121a in which the same range is shielded.

Note that, as illustrated in the upper stage of FIG. 4, the light-shielding film 121b-1 and the light-shielding film 121g-1 are connected to each other and formed into an L shape as seen from the side. Similarly, the light-shielding film 121b-2 and the light-shielding film 121g-2 are connected to each other and formed into an L shape as seen from the side. Furthermore, the light-shielding films 121b-1, 121b-2, and 121g-1 to 121g-3 are formed using metal, for example, tungsten (W), aluminum (Al), or an alloy of Al and copper (Cu).

Furthermore, the light-shielding films 121b-1, 121b-2, and 121g-1 to 121g-3 may be simultaneously formed using the same metal as that of wiring by the same process as the process by which the wiring is formed in a semiconductor process. Note that, the light-shielding films 121b-1, 121b-2, and 121g-1 to 121g-3 do not necessarily have the same thickness depending on the position.

Furthermore, as illustrated in the lower stage of FIG. 4, the pixel 121a includes a photodiode 161 (corresponding to the photodiode 121e), a transfer transistor 162, a floating diffusion (FD) unit 163, a selection transistor 164, an amplification transistor 165, and a reset transistor 166, and is connected to a current source 168 via a vertical signal line 167.

The photodiode 161 is such that an anode electrode is grounded and a cathode electrode is connected to a gate electrode of the amplification transistor 165 via the transfer transistor 162.

The transfer transistor 162 is driven according to a transfer signal TG. For example, when the transfer signal TG supplied to a gate electrode of the transfer transistor 162 reaches a high level, the transfer transistor 162 is turned on. Therefore, charges accumulated in the photodiode 161 are transferred to the FD unit 163 via the transfer transistor 162.

The amplification transistor 165 serves as an input unit of a source follower that is a readout circuit that reads out a signal obtained by photoelectric conversion in the photodiode 161, and outputs a pixel signal at a level corresponding to the charges accumulated in the FD unit 163 to the vertical signal line 167. That is, the amplification transistor 165 forms the source follower with the current source 168 connected to one end of the vertical signal line 167 with a drain terminal connected to a power supply VDD and a source terminal connected to the vertical signal line 167 via the selection transistor 164.

The FD unit 163 is a floating diffusion region having a charge capacitance C1 provided between the transfer transistor 162 and the amplification transistor 165, and temporarily accumulates the charges transferred from the photodiode 161 via the transfer transistor 162. The FD unit 163 serves as a charge detection unit that converts the charges into a voltage, and the charges accumulated in the FD unit 163 are converted into the voltage in the amplification transistor 165.

The selection transistor 164 is driven according to a selection signal SEL, turned on when the selection signal SEL supplied to a gate electrode reaches a high level, and connects the amplification transistor 165 and the vertical signal line 167.

The reset transistor 166 is driven according to a reset signal RST. For example, the reset transistor 166 is turned on when a reset signal RST supplied to a gate electrode reaches a high level, discharges the charges accumulated in the FD unit 163 to the power supply VDD, and resets the FD unit 163.

For example, the pixel circuit illustrated in the lower stage of FIG. 4 operates as follows.

That is, as a first operation, the reset transistor 166 and the transfer transistor 162 are turned on, the charges accumulated in the FD unit 163 are discharged to the power supply VDD, and the FD unit 163 is reset.

As a second operation, the reset transistor 166 and the transfer transistor 162 are turned off, an exposure period is started, and the charges according to the amount of incident light are accumulated by the photodiode 161.

As a third operation, after the reset transistor 166 is turned on and the FD unit 163 is reset, the reset transistor 166 is turned off. By this operation, the FD unit 163 is set to reference potential.

As a fourth operation, the potential of the FD unit 163 in the reset state is output from the amplification transistor 165 as the reference potential.

As a fifth operation, the transfer transistor 162 is turned on, and the charges accumulated in the photodiode 161 are transferred to the FD unit 163.

As a sixth operation, the potential of the FD unit 163 to which the charges of the photodiode are transferred is output from the amplification transistor 165 as signal potential.

Then, a signal obtained by subtracting the reference potential from the signal potential by correlated double sampling (CDS) is output as a detection signal (pixel signal) of the pixel 121a. A value of this detection signal (output pixel value) is modulated according to the incident angle of the incident light from the subject, and has the different characteristic (directivity) depending on the incident angle (has the incident angle directivity).

<Second Configuration Example of Imaging Element 121>

Figure 5:
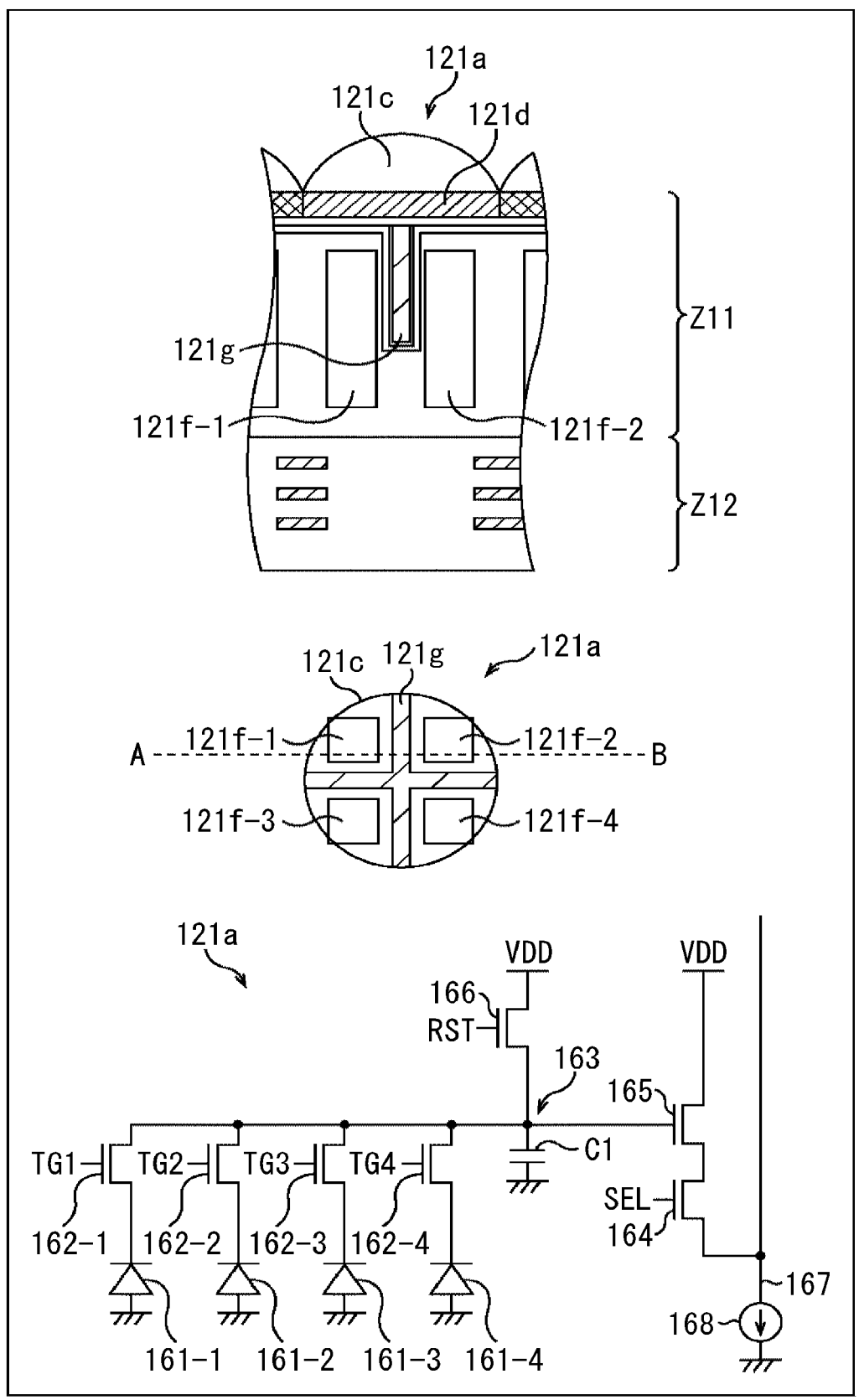
FIG. 5 is a view illustrating a second configuration example of the imaging element in FIG. 2.

FIG. 5 is a view illustrating a second configuration example of the imaging element 121. An upper stage of FIG. 5 is a side cross-sectional view of the pixel 121a of the imaging element 121 being the second configuration example, and a middle stage of FIG. 5 is a top view of the imaging element 121. Furthermore, the side cross-sectional view in the upper stage of FIG. 5 is an AB cross-section in the middle stage of FIG. 5. Moreover, a lower stage of FIG. 5 is a circuit configuration example of the imaging element 121.

The imaging element 121 in FIG. 5 has a configuration different from that of the imaging element 121 in FIG. 4 in that four photodiodes 121f-1 to 121f-4 are formed in one pixel 121a, and the light-shielding film 121g is formed in a region that separates the photodiodes 121f-1 to 121f-4. That is, in the imaging element 121 in FIG. 5, the light-shielding film 121g is formed into a "+" shape as seen from above. Note that, the common configuration is assigned with the same reference sign as that in FIG. 4 and the detailed description thereof is omitted.

In the imaging element 121 in FIG. 5, occurrence of electrical and optical crosstalk among the photodiodes 121f-1 to 121f-4 is prevented because the photodiodes 121f-1 to 121f-4 are separated by the light-shielding film 121g. That is, the light-shielding film 121g in FIG. 5 is for preventing the crosstalk as is the case with the light-shielding film 121g of the imaging element 121 in FIG. 4 and is not for providing the incident angle directivity.

Furthermore, in the imaging element 121 in FIG. 5, one FD unit 163 is shared by the four photodiodes 121f-1 to 121f-4. The lower stage of FIG. 5 illustrates the circuit configuration example in which one FD unit 163 is shared by the four photodiodes 121f-1 to 121f-4. Note that, in the lower stage of FIG. 5, the description of the configuration the same as that in the lower stage of FIG. 4 is not repeated.

The lower stage of FIG. 5 differs from the circuit configuration in the lower stage of FIG. 4 in that photodiodes 161-1 to 161-4 (corresponding to the photodiodes 121f-1 to 121f-4 in the upper stage of FIG. 5) and transfer transistors 162-1 to 162-4 are provided in place of the photodiode 161 (corresponding to the photodiode 121e in the upper stage of FIG. 4) and the transfer transistor 162, respectively, to share the FD unit 163.

With such a configuration, the charges accumulated in the photodiodes 121f-1 to 121f-4 are transferred to the common FD unit 163 having a predetermined capacitance provided at a connection between the photodiodes 121f-1 to 121f-4 and the gate electrode of the amplification transistor 165. Then, a signal corresponding to a level of the charges held in the FD unit 163 is read out as a detection signal (pixel signal) (however, the CDS processing is performed as described above).

Therefore, the charges accumulated by the photodiodes 121f-1 to 121f-4 are allowed to selectively contribute to an output of the pixel 121a, that is, the detection signal in various combinations. That is, it is configured such that the charges may be read out independently for each of the photodiodes 121f-1 to 121f-4, and it is possible to obtain the different incident angle directivities by making the photodiodes 121f-1 to 121f-4 that contribute to the output (degree of contribution to the output of the photodiodes 121f-1 to 121f-4) different from each other.

For example, by transferring the charges of the photodiodes 121f-1 and 121f-3 to the FD unit 163 and adding the signals obtained by reading out them, the incident angle directivity in a lateral direction may be obtained. Similarly, by transferring the charges of the photodiodes 121f-1 and 121f-2 to the FD unit 163 and adding the signals obtained by reading out them, the incident angle directivity in a vertical direction may be obtained.

Furthermore, a signal obtained on the basis of the charges selectively read out independently from the four photodiodes 121f-1 to 121f-4 is the detection signal corresponding to one pixel forming the detection image.

Note that, contribution of (the charges of) each photodiode 121f to the detection signal may be realized, for example, not only by whether or not to transfer the charges (detection value) of each photodiode 121f to the FD unit 163, but also by using an electronic shutter function to reset the charges accumulated in the photodiode 121f before the transfer to the FD unit 163 and the like. For example, if the charges of the photodiode 121f are reset immediately before the transfer to the FD unit 163, the photodiode 121f does not contribute to the detection signal at all. On the other hand, when there is a time between the reset of the charges of the photodiode 121f and the transfer of the charges to the FD unit 163, the photodiode 121f partially contributes to the detection signal.

As described above, in a case of the imaging element 121 in FIG. 5, by changing the combination of the photodiodes used for the detection signal out of the four photodiodes 121f-1 to 121f-4, it is possible to allow each pixel to have the different incident angle directivity. Furthermore, the detection signal output from each pixel 121a of the imaging element 121 in FIG. 5 has a value (output pixel value) modulated according to the incident angle of the incident light from the subject, and has the characteristic (directivity) different depending on the incident angle (has the incident angle directivity).

Note that, hereinafter, a unit of outputting the detection signal corresponding to one pixel of the detection image is referred to as a pixel output unit. The pixel output unit includes at least one or more photodiodes, and each pixel 121a of the imaging element 121 generally corresponds to one pixel output unit.

For example, in the imaging element 121 in FIG. 4, since one pixel 121a includes one photodiode 121e, one pixel output unit includes one photodiode 121e. In other words, one photodiode 121e forms one pixel output unit.

Then, by making a light-shielding state by the light-shielding film 121b of each pixel 121a different, the incident angle directivity of each pixel output unit may be made different. Then, in the imaging element 121 in FIG. 4, the incident light on each pixel 121a is optically modulated using the light-shielding film 121b, and as a result, the detection signal of one pixel of the detection image reflecting the incident angle directivity is obtained by the signal output from the photodiode 121e of each pixel 121a. That is, the imaging element 121 in FIG. 4 includes a plurality of pixel output units that receives the incident light from the subject incident without an intervention of an imaging lens or a pinhole, each pixel output unit includes one photodiode 121e, and the characteristic (incident angle directivity) to the incident angle of the incident light from the subject is set for each pixel output unit.

On the other hand, in the imaging element 121 in FIG. 5, one pixel 121a includes four photodiodes 121f-1 to 121f-4, so that one pixel output unit includes four photodiodes 121e. In other words, the four photodiodes 121f forms one pixel output unit. On the other hand, each photodiode 121e alone does not form an individual pixel output unit.

Then, as described above, the incident angle directivity for each pixel output unit is different by making the photodiode 121f that contributes to the detection signal among the four photodiodes 121f-1 to 121f-4 different for each pixel 121a. That is, in the imaging element 121 in FIG. 5, a range that does not contribute to the output (detection signal) out of the four photodiodes 121f-1 to 121f-4 serves as the light-shielding region. Then, the detection signal of one pixel of the detection image reflecting the incident angle directivity is obtained by a combination of signals output from the photodiodes 121f-1 to 121f-4. That is, the imaging element 121 in FIG. 5 includes a plurality of pixel output units that receives the incident light from the subject incident without an intervention of the imaging lens or the pinhole, each pixel output unit includes a plurality of photodiodes (for example, photodiodes 121f-1 to 121f-4), and (a degree of) the photodiode contributing to the output is made different, so that a characteristic in each pixel output unit (incident angle directivity) to the incident angle of the incident light from the subject is different from each other.

Note that, in the imaging element 121 in FIG. 5, the incident light is incident on all the photodiodes 121f-1 to 121f-4 without being optically modulated, so that the detection signal is not the signal obtained by optical modulation. Furthermore, hereinafter, the photodiode 121f that does not contribute to the detection signal is also referred to as the photodiode 121f that does not contribute to the pixel output unit or output.

Note that, FIG. 5 illustrates an example in which the light-receiving surface of the pixel output unit (pixel 121a) is divided into four equal parts, and the photodiode 121f having the light-receiving surface of the same size is arranged in each region, that is, the example in which the photodiode is equally divided into four; however, the dividing number and dividing position of the photodiode may be arbitrarily set.

For example, the photodiode is not necessarily equally divided, and the dividing position of the photodiode may be different for each pixel output unit. Therefore, for example, even if the photodiode 121f in the same position is allowed to contribute to the output among a plurality of pixel output units, the incident angle directivity differs between the pixel output units. Furthermore, for example, by making the dividing number different between pixel output units, it becomes possible to set the incident angle directivity more freely.

Moreover, for example, both the dividing number and the dividing position may be made different between the pixel output units.

Furthermore, both the imaging element 121 in FIG. 4 and the imaging element 121 in FIG. 5 have a configuration in which each pixel output unit may independently set the incident angle directivity. In contrast, in the imaging device disclosed in Non-Patent Document 1 and Patent Documents 1 and 2 described above, each pixel output unit of the imaging element does not have a configuration in which the incident angle directivity may be set independently. Note that, in the imaging element 121 in FIG. 4, the incident angle directivity of each pixel output unit is set by the light-shielding film 121b at the time of manufacture. On the other hand, in the imaging element 121 in FIG. 5, the dividing number and dividing position of the photodiode of each pixel output unit are set at the time of manufacture, but the incident angle directivity of each pixel output unit (combination of photodiodes allowed to contribute to output) may be set at the time of use (for example, at the time of imaging). Note that, in both the imaging element 121 in FIG. 4 and the imaging element 121 in FIG. 5, it is not always necessary for all the pixel output units to have a configuration with the incident angle directivity.

Note that, as described above, each pixel of the imaging element normally corresponds to one pixel output unit; however, as described later, there is a case where a plurality of pixels forms one pixel output unit. In the following, it is described assuming that each pixel of the imaging element corresponds to one pixel output unit unless otherwise specified.

<Principle of Causing Incident Angle Directivity>

Figure 6:
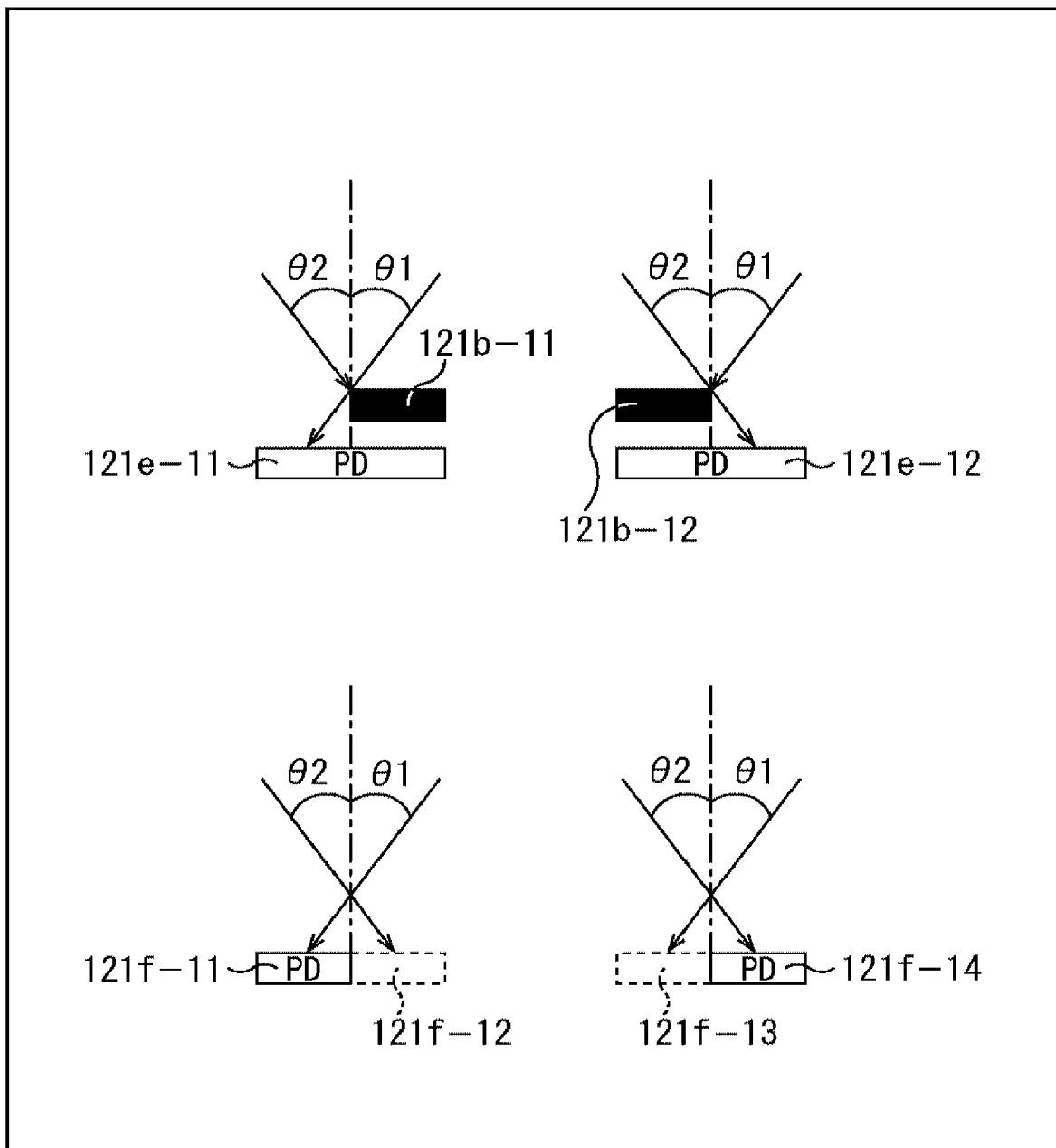
FIG. 6 is a view for illustrating a principle of incident angle directivity generation.

The incident angle directivity of each pixel of the imaging element 121 occurs, for example, by a principle illustrated in FIG. 6. Note that, a left upper part and a right upper part of FIG. 6 are views for illustrating the principle of occurrence of the incident angle directivity in the imaging element 121 in FIG. 4, and a lower left part and a lower right part of FIG. 6 are views for illustrating the principle of occurrence of the incident angle directivity in the imaging element 121 in FIG. 5.

Each of the pixels in the upper left part and upper right part of FIG. 6 includes one photodiode 121e. In contrast, each of the pixels in the lower left part and the lower right part of FIG. 6 includes two photodiodes 121f. Note that, herein, an example in which one pixel includes two photodiodes 121f is illustrated, but this is for convenience in explanation, and the number of photodiodes 121f included in one pixel may be other than this.

In the pixel in the upper left part of FIG. 6, a light-shielding film 121b-11 is formed so as to shield a right half of a light-receiving surface of a photodiode 121e-11. Furthermore, in the pixel in the upper right part of FIG. 6, a light-shielding film 121b-12 is formed so as to shield a left half of a light-receiving surface of a photodiode 121e-12. Note that, a dashed-dotted line in the drawing is an auxiliary line that passes through the center in a horizontal direction of the light-receiving surface of the photodiode 121e and is perpendicular to the light-receiving surface.

For example, in the pixel in the upper left part of FIG. 6, the incident light from the upper right that forms an incident angle θ1 with respect to the dashed-dotted line in the drawing is easily received by a range on a left half not shielded by the light-shielding film 121b-11 of the photodiode 121e-11. In contrast, the incident light from the upper left that forms an incident angle θ2 with respect to the dashed-dotted line in the drawing is less easily received by the range on the left half not shielded by the light-shielding film 121b-11 of the photodiode 121e-11. Accordingly, the pixel in the upper left part of FIG. 6 has the incident angle directivity with high light-receiving sensitivity for the incident light from the upper right in the drawing and low light-receiving sensitivity for the incident light from the upper left.

On the other hand, for example, in the pixel in the upper right part of FIG. 6, the incident light from the upper right forming the incident angle θ1 is less easily received by a range in a left half shielded by the light-shielding film 121b-12 of the photodiode 121e-12. In contrast, the incident light from the upper left that forms the incident angle θ2 is easily received by a range in a right half not shielded by the light-shielding film 121b-12 of the photodiode 121e-12. Accordingly, the pixel in the upper right part of FIG. 6 has the incident angle directivity with low light-receiving sensitivity for the incident light from the upper right in the drawing and high light-receiving sensitivity for the incident light from the upper left.

Furthermore, the pixel in the lower left part of FIG. 6 includes photodiodes 121*f*-11 and 121*f*-12 on left and right sides in the drawing, and has a configuration with the incident angle directivity without the light-shielding film 121*b* provided by reading out the detection signal of one of them.

That is, in the pixel in the lower left part of FIG. 6, by reading out only the signal of the photodiode 121*f*-11 provided on the left side in the drawing, the incident angle directivity similar to that of the pixel in the upper left part of FIG. 6 may be obtained. That is, the incident light from the upper right that forms the incident angle θ1 with respect to the dashed-dotted line in the drawing is incident on the photodiode 121*f*-11, and a signal corresponding to the amount of received light is read out from the photodiode 121*f*-11, so that this contributes to the detection signal output from the pixel. In contrast, the incident light from the upper left that forms the incident angle θ2 with respect to the dashed-dotted line in the drawing is incident on the photodiode 121*f*-12, but this is not read out from the photodiode 121*f*-12, so that this does not contribute to the detection signal output from the pixel.

Similarly, in a case where two photodiodes 121*f*-13 and 121*f*-14 are provided as in the pixel in the lower right part in FIG. 6, by reading out only the signal of the photodiode 121*f*-14 provided on the right side in the drawing, the incident angle directivity similar to that of the pixel in the upper right part of FIG. 6 may be obtained. That is, the incident light from the upper right that forms the incident angle θ1 is incident on the photodiode 121*f*-13, but the signal is not read out from the photodiode 121*f*-13, so that this does not contribute to the detection signal output from the pixel. In contrast, the incident light from the upper left forming the incident angle θ2 is incident on the photodiode 121*f*-14, and a signal corresponding to the amount of received light is read out from the photodiode 121*f*-14, so that this contributes to the detection signal output from the pixel.

Note that, in the pixel in the upper part of FIG. 6, the example in which the light-shielding range and the range not shielded are separated in the central position in the horizontal direction of the pixel (the light-receiving surface of the photodiode 121*e*) is illustrated, but the ranges may be separated in a position other than this. Furthermore, in the pixel in the lower part of FIG. 6, the example in which the two photodiodes 121*f* are separated in the central position in the horizontal direction of the pixel is illustrated, but they may be separated in a position other than this. In this manner, by changing the light-shielding range or the position in which the photodiode 121*f* is separated, the different incident angle directivities may be generated.

<Regarding Incident Angle Directivity in Configuration Including On-Chip Lens>

Next, the incident angle directivity in a configuration including the on-chip lens 121*c* is described with reference to FIG. 7.

Figure 7:
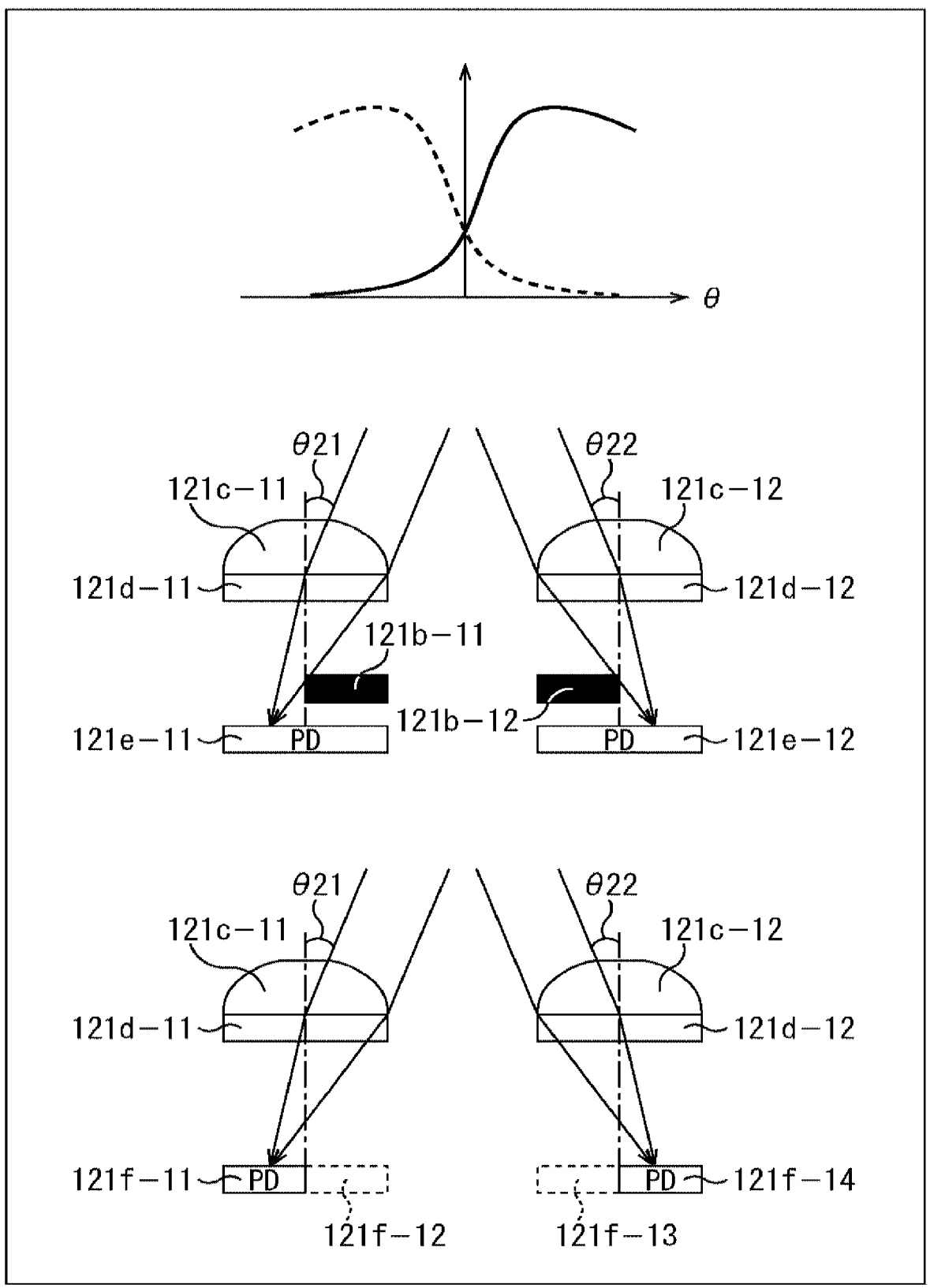
FIG. 7 is a view for illustrating a change in incident angle directivity using an on-chip lens.

A graph in an upper stage of FIG. 7 illustrates the incident angle directivity of the pixels in middle and lower stages of FIG. 7. Note that, the incident angle θ is plotted along the abscissa, and the detection signal level is plotted along the ordinate. Note that the incident angle θ is 0 degree in a case where the direction of the incident light coincides with a dashed-dotted line on a left side in the middle stage of FIG. 7, an incident angle θ21 side on the left side in the middle stage of FIG. 7 is a positive direction, and an incident angle θ22 side on a right side in the middle stage of FIG. 7 is a negative direction. Therefore, the incident angle of the incident light incident on the on-chip lens 121*c* from the upper right is larger than that of the incident light incident from the upper left. That is, the incident angle θ increases as a travel direction of the incident light inclines to the left (increases in the positive direction) and decreases as this inclines to the right (increases in the negative direction).

Furthermore, the pixel in the left part in the middle stage of FIG. 7 is obtained by adding an on-chip lens 121*c*-11 that condenses the incident light and a color filter 121*d*-11 that transmits light of a predetermined wavelength to the pixel in the left part in the upper stage of FIG. 6. That is, in this pixel, the on-chip lens 121*c*-11, the color filter 121*d*-11, the light-shielding film 121*b*-11, and the photodiode 121*e*-11 are stacked in this order in the light incident direction from the upper part of the drawing.

Similarly, the pixel in the right part in the middle stage of FIG. 7, the pixel in a left part in the lower stage of FIG. 7, and the pixel in a right part in the lower stage of FIG. 7 are obtained by adding the on-chip lens 121*c*-11 and the color filter 121*d*-11, or an on-chip lens 121*c*-12 and a color filter 121*d*-12 to the pixel in the right part in the upper stage of FIG. 6, the pixel in the left part in the lower stage of FIG. 6, and the pixel in the right part in the lower stage of FIG. 6, respectively.

In the pixel in the left part in the middle stage of FIG. 7, the detection signal level (light-receiving sensitivity) of the photodiode 121*e*-11 changes according to the incident angle θ of the incident light as indicated by a solid waveform in the upper stage of FIG. 7. That is, the larger the incident angle θ being the angle formed by the incident light with respect to the dashed-dotted line in the drawing (the larger the incident angle θ in the positive direction (the more this inclines rightward in the drawing)), the light is condensed in a range in which the light-shielding film 121*b*-11 is not provided, so that the detection signal level of the photodiode 121*e*-11 increases. In contrast, the smaller the incident angle θ of the incident light (the larger the incident angle θ in the negative direction (the more this inclines leftward in the drawing)), the light is condensed in a range in which the light-shielding film 121*b*-11 is provided, so that the detection signal level of the photodiode 121*e*-11 decreases.

Furthermore, in the pixel in the right part in the middle stage of FIG. 7, the detection signal level (light-receiving sensitivity) of the photodiode 121*e*-12 changes according to the incident angle θ of the incident light as indicated by a dotted waveform in the upper stage of FIG. 7. That is, the larger the incident angle θ of the incident light (the larger the incident angle in the positive direction), the light is condensed in the range in which the light-shielding film 121*b*-12 is provided, so that the detection signal level of the photodiode 121*e*-12 decreases. In contrast, the smaller the incident angle θ of the incident light (the larger the incident angle θ in the negative direction), the light is incident on the range in which the light-shielding film 121*b*-12 is not provided, so that the detection signal level of the photodiode 121*e*-12 increases.

The solid and dotted waveforms indicated in the upper stage of FIG. 7 may be changed according to the range of the light-shielding film 121*b*. Therefore, it becomes possible to allow the respective pixels to have the different incident angle directivities depending on the range of the light-shielding film 121*b*.

As described above, the incident angle directivity is the characteristic of the light-receiving sensitivity of each pixel according to the incident angle θ, and this may also be said to be a characteristic of a light-shielding value according to the incident angle θ in the pixel in the middle stage of FIG. 7. That is, the light-shielding film 121b shields the incident light in a specific direction at a high level, but cannot sufficiently shield the incident light in other directions. This change in shielding level generates the detection signal level different according to the incident angle θ as illustrated in the upper stage of FIG. 7. Therefore, when the direction in which the light-shielding at the highest level may be performed in each pixel is defined as the light-shielding direction of each pixel, having the different incident angle directivities in the respective pixels means having the different light-shielding directions in the respective pixels.

Furthermore, in the pixel in the left part in the lower stage of FIG. 7, as is the case with the pixel in the left part in the lower stage of FIG. 6, by using the signal of only the photodiode 121f-11 in the left part of the drawing, the incident angle directivity similar to that of the pixel in the left part in the middle stage of FIG. 7 may be obtained. That is, when the incident angle θ of the incident light increases (when the incident angle θ increases in the positive direction), the detection signal level increases because the light is condensed in the range of the photodiode 121f-11 from which the signal is read out. In contrast, the smaller the incident angle θ of the incident light (the larger the incident angle θ in the negative direction), the light is condensed in the range of the photodiode 121f-12 from which the signal is read out, so that the detection signal level decreases.

Furthermore, similarly, in the pixel in the right part in the lower stage of FIG. 7, as is the case with the pixel in the right part in the lower stage of FIG. 6, by using the signal of only a photodiode 121f-14 in the right part of the drawing, the incident angle directivity similar to that of the pixel in the right part in the middle stage of FIG. 7 may be obtained. That is, when the incident angle θ of the incident light increases (when the incident angle θ increases in the positive direction), the detection signal level per pixel decreases because the light is condensed in the range of a photodiode 121f-13 that does not contribute to the output (detection signal). In contrast, the smaller the incident angle θ of the incident light (the larger the incident angle θ in the negative direction), the light is condensed in the range of the photodiode 121f-14 that contributes to the output (detection signal), so that the detection signal level per pixel decreases.

Note that, as in the pixel in the lower stage of FIG. 7, in a pixel provided with the plurality of photodiodes in the pixel and capable of changing the photodiode that contributes to the output, in order to allow each photodiode to have directivity to the incident angle of the incident light and generate the incident angle directivity in a pixel unit, the on-chip lens 121c is the indispensable configuration for each pixel.

Note that, as for the incident angle directivity, it is desirable that randomness is higher in a pixel unit. For example, if adjacent pixels have the same incident angle directivity, equations (1) to (3) described above or equations (4) to (6) to be described later might be the same equations, and as a result, the number of equations might be insufficient for an unknown number that is a solution of the simultaneous equations, and the pixel values forming the restored image might not be obtained.

Note that, in the following description, an example of a case of using the pixel 121a that realizes the incident angle directivity using the light-shielding film 121b as the pixel 121a in FIG. 4 is mainly described. However, except for a case where the light-shielding film 121b is indispensable, it is also possible to use the pixel 121a that basically divides the photodiode to realize the incident angle directivity.

<Configuration of Light-Shielding Film>

In the description above, as illustrated in FIG. 3, the example in which the entire light-receiving surface is shielded in the vertical direction and the light-shielding width and position in the horizontal direction are changed is illustrated as the configuration of the light-shielding film 121b of each pixel 121a of the imaging element 121; however, as a matter of course, it is also possible to allow each pixel 121a to have the incident angle directivity by shielding the entire light-receiving surface in the horizontal direction and changing the width (height) and position in the vertical direction.

Note that, in the following, as illustrated in the example in FIG. 3, the light-shielding film 121b that shields the entire light-receiving surface of the pixel 121a in the vertical direction and shields the light-receiving surface by a predetermined width in the horizontal direction is referred to as a lateral band-type light-shielding film 121b. Furthermore, the light-shielding film 121b that shields the entire light-receiving surface of the pixel 121a in the horizontal direction and shields the light-receiving surface by a predetermined height in the vertical direction is referred to as a longitudinal band-type light-shielding film 121b.

Figure 8:
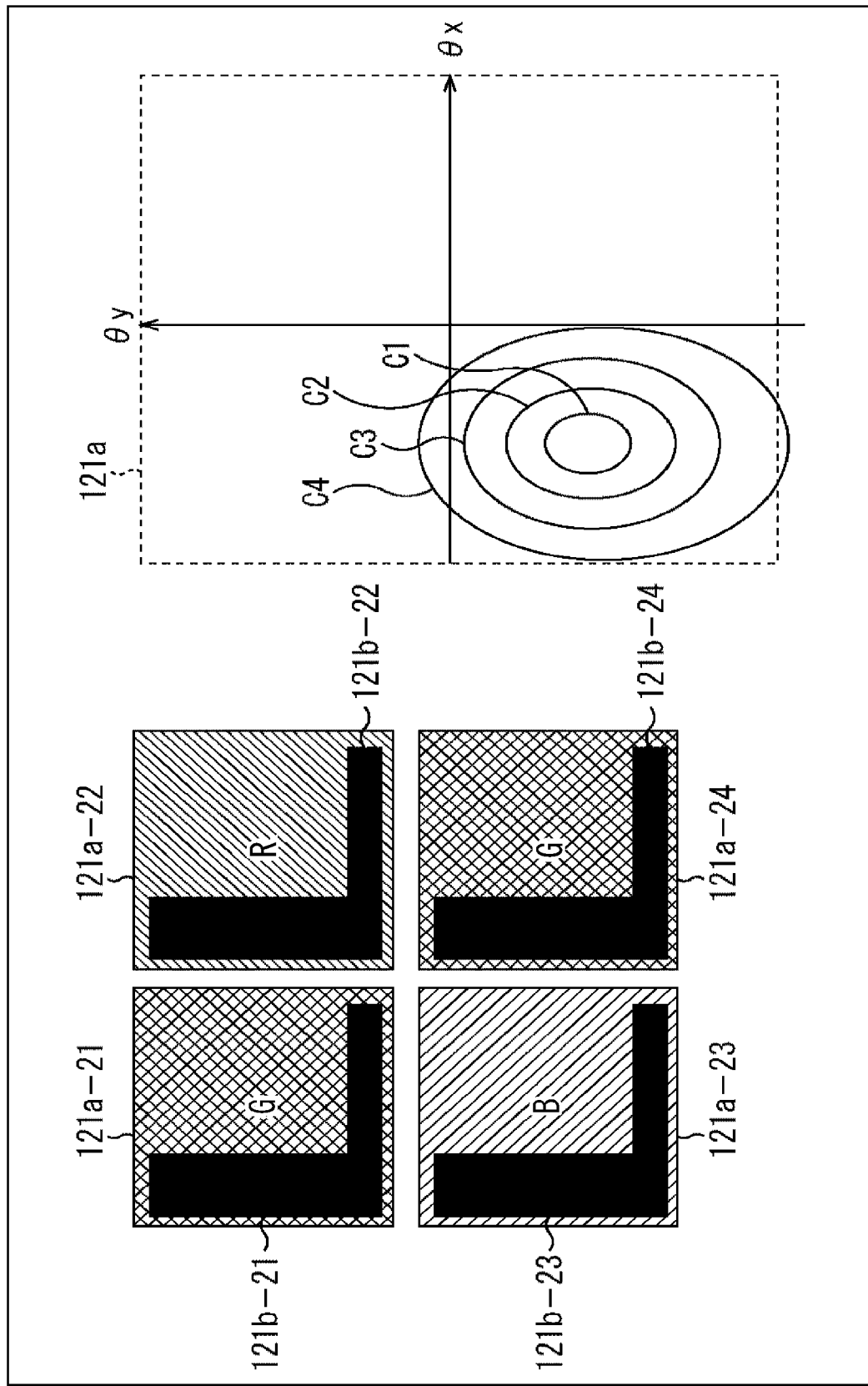
FIG. 8 is a view illustrating an example of a type of a light-shielding film.

Furthermore, as illustrated in a left part of FIG. 8, it is also possible to combine the longitudinal band-type and lateral band-type light-shielding films 121b, for example, to provide an L-shaped light-shielding film 121b for each pixel in the Bayer array.

Note that, in FIG. 8, a black range represents the light-shielding film 121b, and this is similarly displayed in the subsequent drawings unless otherwise specified. Furthermore, in the example in FIG. 8, for each of pixels 121a-21 and 121a-24 being green (G) pixels, a pixel 121a-22 being a red (R) pixel, and a pixel 121a-23 being a blue (B) pixel forming the Bayer array, L-shaped light-shielding films 121b-21 to 121b-24 are provided.

In this case, each pixel 121a has the incident angle directivity as illustrated in the right part of FIG. 8. That is, in the right part of FIG. 8, distribution of the light reception sensitivities of the respective pixels 121a is illustrated in which the incident angle θx in the horizontal direction (x direction) of the incident light is plotted along the abscissa, and the incident angle θy in the vertical direction (y direction) of the incident light is plotted along the ordinate. Then, the light-receiving sensitivity within a range C4 is higher than that outside the range C4, the light-receiving sensitivity within a range C3 is higher than that outside the range C3, the light-receiving sensitivity within a range C2 is higher than that outside the range C2, and the light-receiving sensitivity within a range C1 is higher than that outside the range C1.

Accordingly, in each pixel 121a, the detection signal level to the incident light in which the incident angle θx in the horizontal direction (x direction) and the incident angle θy in the vertical direction (y direction) are within the range C1 is the highest. Then, the detection signal level decreases in the order of the incident light in which the incident angle θx and the incident angle θy are within the range C2, the range C3, the range C4, and the range other than the range C4. Note that, intensity distribution of the light-receiving sensitivities illustrated in the right part of FIG. 8 is determined by the range shielded by the light-shielding film 121b in each pixel 121a regardless of the Bayer array.

Note that, in the following, as the L-shaped light-shielding films 121b-21 to 121b-24 in FIG. 8, the light-shielding film 121b having a shape obtained by connecting the longitudinal band-type light-shielding film and the lateral band-type light-shielding film at their ends is collectively referred to as the L-shaped light-shielding film 121b.

<Method of Setting Incident Angle Directivity>

Next, an example of a method of setting the incident angle directivity is described with reference to FIG. 9.

Figure 9:
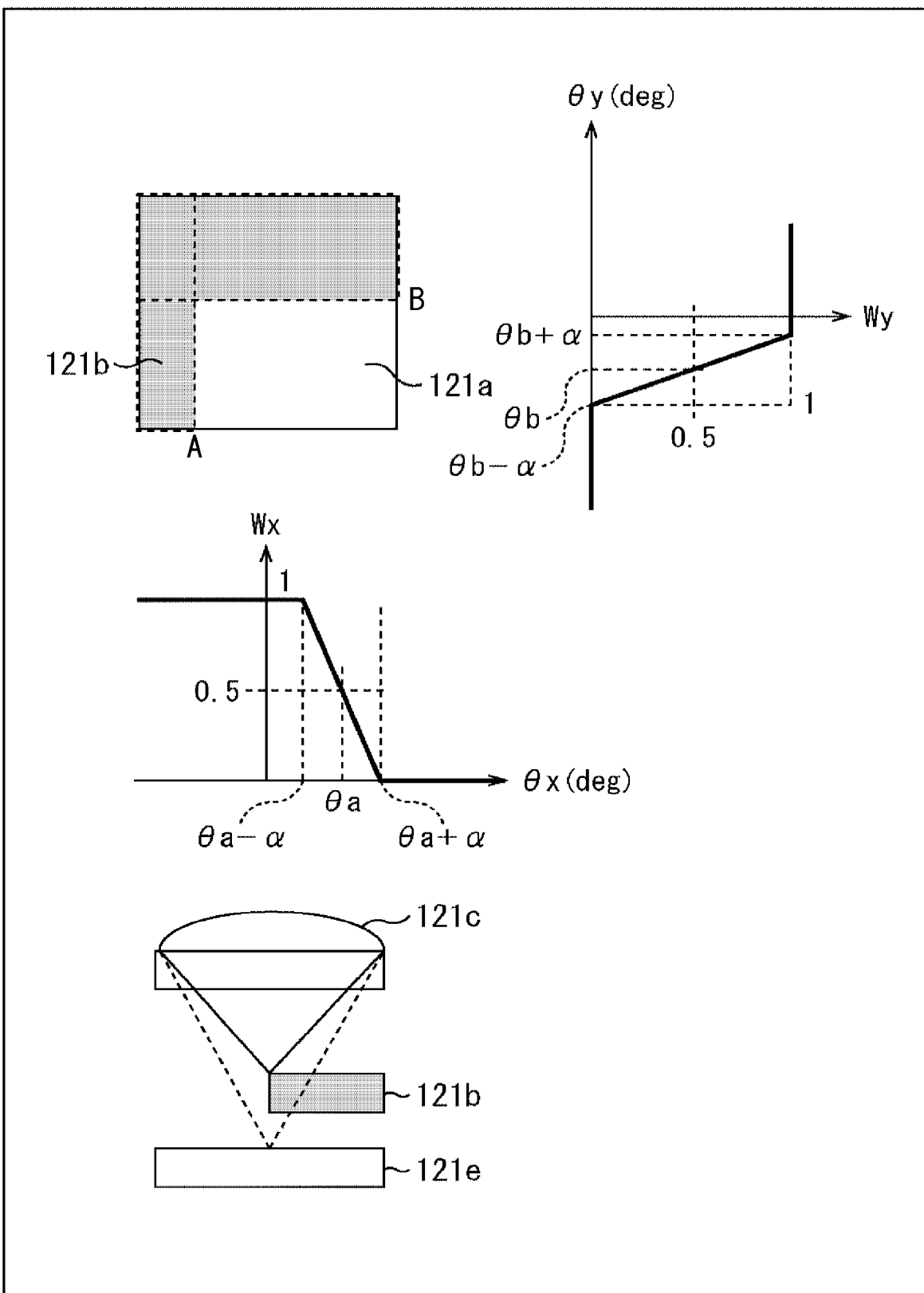
FIG. 9 is a view for illustrating a design of the incident angle directivity.

For example, a case where the light-shielding range in the horizontal direction of the light-shielding film 121b is a range from a left end of the pixel 121a to a position A, and the light-shielding range in the vertical direction is a range from an upper end of the pixel 121a to a position B as illustrated in an upper stage of FIG. 9 is considered.

In this case, a weight Wx of 0 to 1, the weight according to the incident angle θx (deg) from the central position in the horizontal direction of each pixel that serves as an index of the incident angle directivity in the horizontal direction is set. In further detail, in a case where it is assumed that the weight Wx is 0.5 at the incident angle θx=θa corresponding to the position A, the weight Wx is set such that the weight Wx is 1 at the incident angle θx<θa−α, (−(θx−θa)/2α+0.5) at θa−α≤incident angle θx≤θa+α, and 0 at the incident angle θx>θa+α.

Similarly, a weight Wy of 0 to 1, the weight according to the incident angle θy (deg) from the central position in the vertical direction of each pixel that serves as an index of the incident angle directivity in the vertical direction is set. In further detail, in a case where it is assumed that the weight Wy is 0.5 at the incident angle θy=θb corresponding to the position B, the weight Wy is set such that the weight Wy is 0 at the incident angle θy<θb−α, ((θy−θb)/2α+0.5) at θb−α≤incident angle θy≤θb+α, and 1 at the incident angle θy>θb+α.

Note that, the weight Wx and the weight Wy change as illustrated in the graph in FIG. 9 in a case where an ideal condition is satisfied.

Then, by using the weights Wx and Wy obtained in this manner, it is possible to obtain a coefficient corresponding to the incident angle directivity, that is, the light-receiving sensitivity characteristic of each pixel 121a. For example, a value obtained by multiplying the weight Wx corresponding to the incident angle θx of the incident light from a certain point light source of the subject surface 31 by the weight Wy corresponding to the incident angle θy is set as the coefficient for the point light source.

Furthermore, at that time, an inclination (1/2α) indicating the change in weight in the range in which the weight Wx in the horizontal direction and the weight Wy in the vertical direction are around 0.5 may be set by using the on-chip lens 121c having different focal distances.

For example, in a case where the focal distance of the on-chip lens 121c focuses on a surface of the light-shielding film 121b as indicated by a solid line in a lower stage of FIG. 9, the inclination (1/2α) of the weight Wx in the horizontal direction and the weight Wy in the vertical direction becomes steep. That is, the weight Wx and the weight Wy drastically change to 0 or 1 in the vicinity of a boundary of the incident angle in the horizontal direction θx=θa and the incident angle in the vertical direction θy=θb where the values are near 0.5.

Furthermore, for example, in a case where the focal distance of the on-chip lens 121c focuses on the surface of the photodiode 121e as indicated by a dotted line in the lower stage of FIG. 9, the inclination (1/2α) of the weight Wx in the horizontal direction and the weight Wy in the vertical direction becomes gradient. That is, the weight Wx and the weight Wy gradually change to 0 or 1 in the vicinity of the boundary of the incident angle in the horizontal direction θx=θa and the incident angle in the vertical direction θy=θb where the values are near 0.5.

For example, the focal distance of the on-chip lens 121c changes depending on a curvature of the on-chip lens 121c. Therefore, by using the on-chip lens 121c having different curvatures to change the focal distance of the on-chip lens 121c, it is possible to obtain different incident angle directivities, that is, different light-receiving sensitivity characteristics.

Therefore, the incident angle directivity of the pixel 121a may be adjusted by a combination of the range in which the photodiode 121e is shielded by the light-shielding film 121b and the curvature of the on-chip lens 121c. Note that, the curvature of the on-chip lens may be the same for all the pixels 121a of the imaging element 121 or may be different for some of the pixels 121a.

For example, as an index indicating the incident angle directivity of each pixel 121a of the imaging element 121, on the basis of the position of each pixel 121a, the shape, position, and range of the light-shielding film 121b of each pixel 121a, the curvature of the on-chip lens 121c and the like, the characteristics of the weight Wx and the weight Wy as illustrated in the graph of FIG. 9 are set for each pixel 121a.

Furthermore, the incident angle of the light beam from the point light source to the pixel 121a is obtained on the basis of a positional relationship between a certain point light source on the subject surface 31 at a predetermined subject distance and a certain pixel 121a of the imaging element 121. Then, the coefficient of the pixel 121a for the point light source is obtained on the basis of the obtained incident angle and the characteristics of the weight Wx and the weight Wy of the pixel 121a.

Similarly, by obtaining the coefficient as described above for the combinations of the respective point light sources on the subject surface 31 and the respective pixels 121a of the imaging element 121, the coefficient set group of the imaging element 121 for the subject surface 31 such as the coefficient sets α1, β1, and γ1, coefficient set α2, β2, and γ2, and coefficient set α3, β3, and γ3 in equations (1) to (3) described above may be obtained.

Note that, as described later with reference to FIG. 13, when the subject distance from the subject surface 31 to the light-receiving surface of the imaging element 121 is different, the incident angle of the light beam on the imaging element 121 from each point light source of the subject surface 31 is different, so that a different coefficient set group is required for each subject distance.

Furthermore, even on the subject surface 31 at the same subject distance, if the number and arrangement of the point light sources to be set are different, the incident angles of the light beams on the imaging element 121 from the respective point light sources are different. Therefore, there is a case where a plurality of coefficient set groups is required for the subject surface 31 at the same subject distance. Furthermore, the incident angle directivity of each pixel 121a needs to be set such that independence of the simultaneous equations described above may be secured.

<Difference Between On-Chip Lens and Imaging Lens>

In the imaging device 101 of the present disclosure, the imaging element 121 has a configuration in which an optical block including the imaging lens or the pinhole is not required, but as described above, the on-chip lens 121c is provided. Here, the on-chip lens 121c and the imaging lens have different physical actions.

Figure 10:
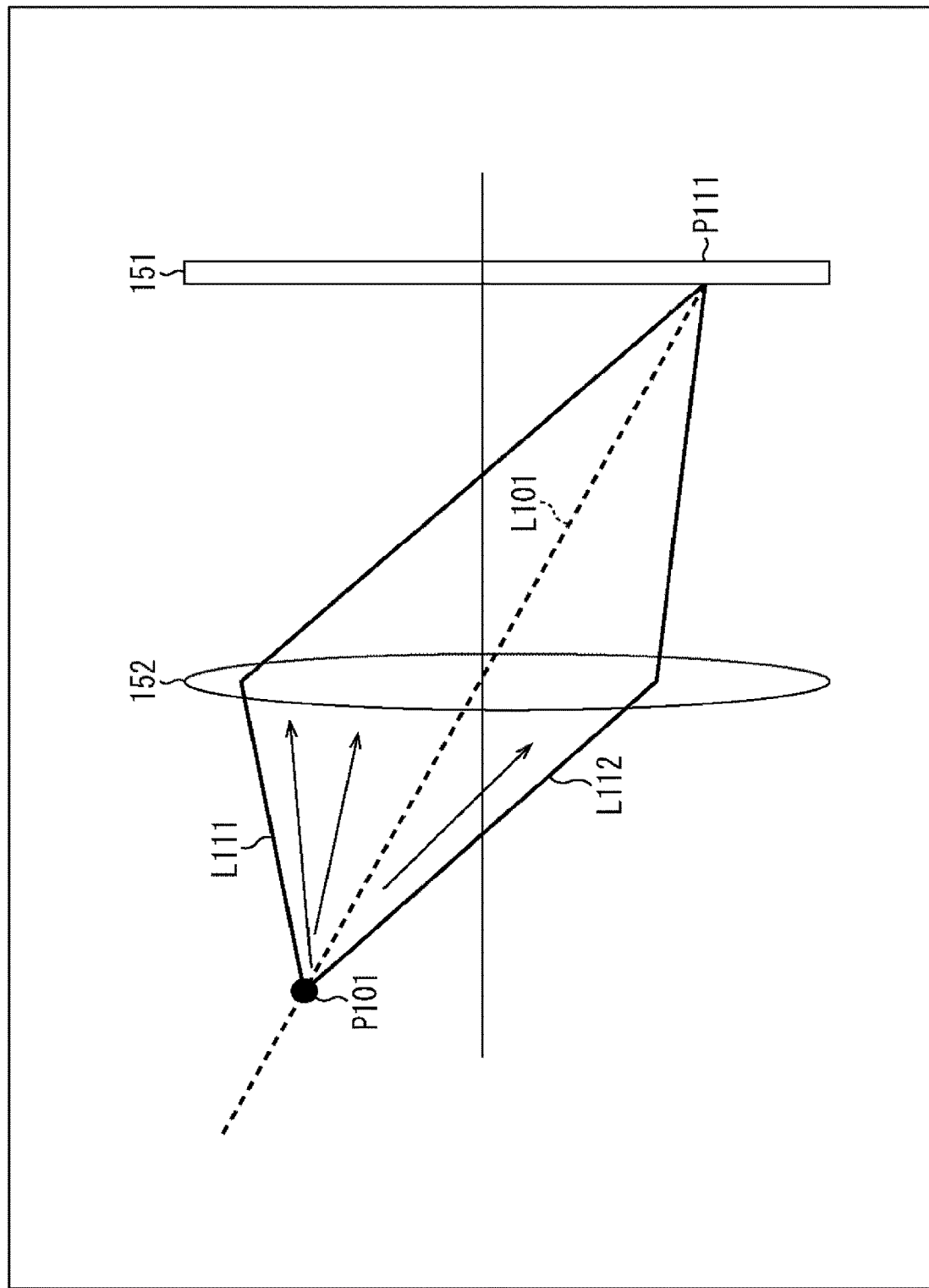
FIG. 10 is a view for illustrating a difference between the on-chip lens and an imaging lens.

For example, as illustrated in FIG. 10, light incident on an imaging lens 152 out of diffused light emitted from a point light source P101 is condensed at a pixel position P111 on the imaging element 151. That is, the imaging lens 152 is designed to condense the diffused light incident at different angles from the point light source P101 at the pixel position P111 to form an image of the point light source P101. The pixel position P111 is specified by a principal light beam L101 passing through the point light source P101 and the center of the imaging lens 152.

Figure 11:
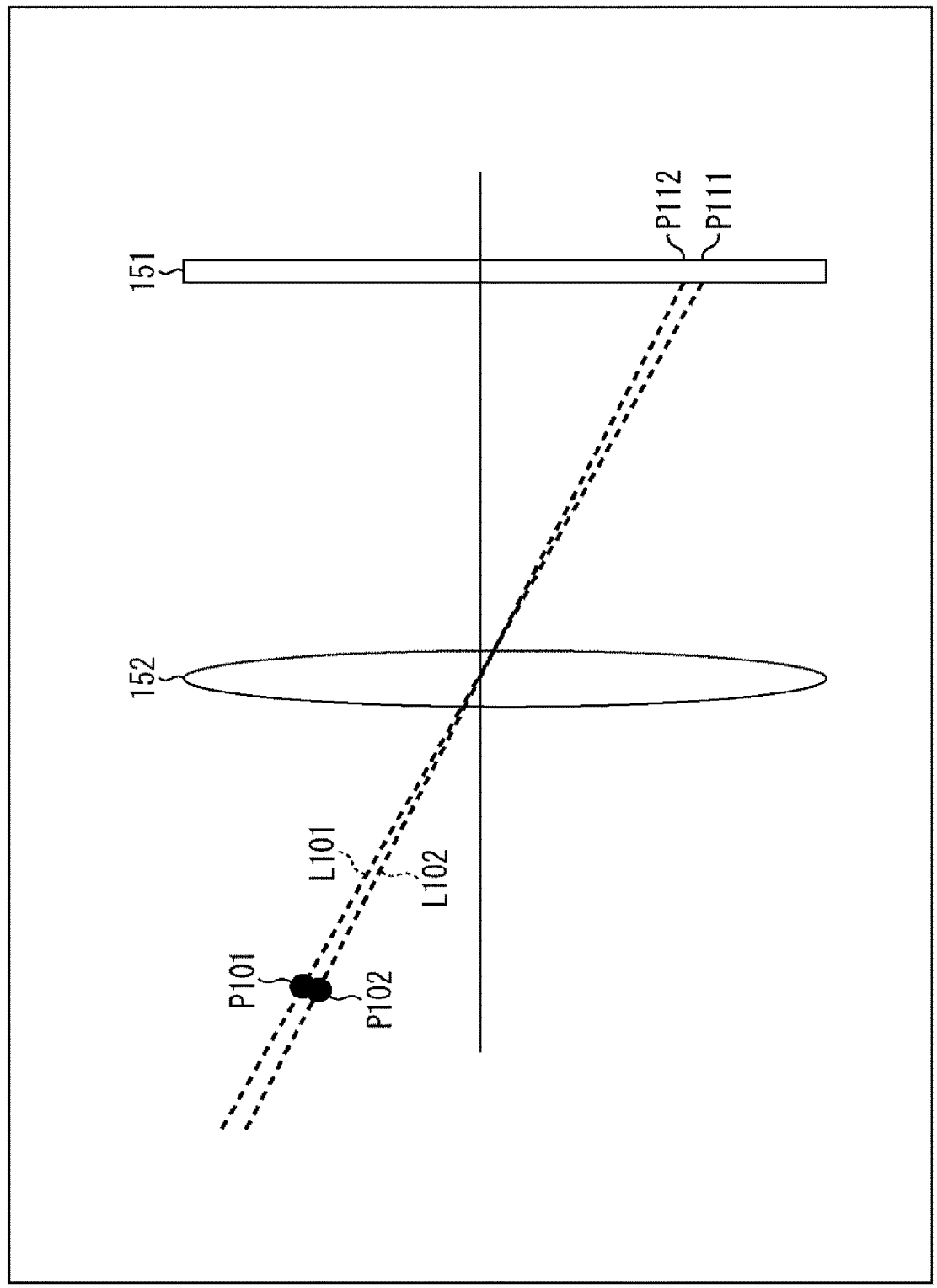
FIG. 11 is a view for illustrating a difference between the on-chip lens and the imaging lens.

Furthermore, for example, as illustrated in FIG. 11, the light incident on the imaging lens 152 out of the diffused light emitted from a point light source P102 different from the point light source P101 is condensed at a pixel position P112 different from the pixel position P111 on the imaging element 151. That is, the imaging lens 152 is designed to condense the diffused light incident at different angles from the point light source P102 at the pixel position P112 to form an image of the point light source P102. The pixel position P112 is specified by a principal light beam L102 passing through the point light source P102 and the center of the imaging lens 152.

In this manner, the imaging lens 152 forms the images of the point light sources P101 and P102 having the different principal light beams at the different pixel positions P111 and P112 on the imaging element 151, respectively.

Figure 12:
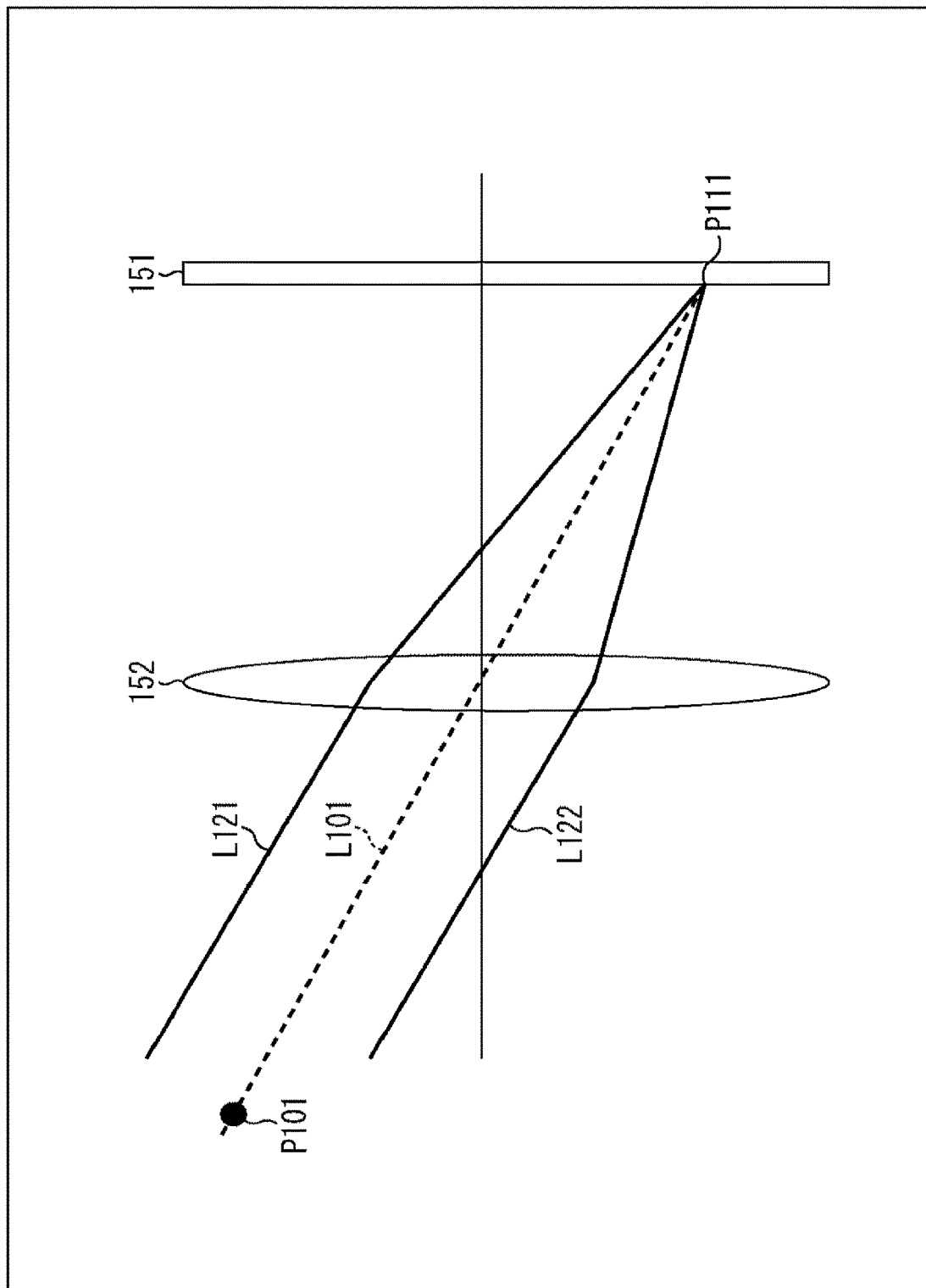
FIG. 12 is a view for illustrating a difference between the on-chip lens and the imaging lens.

Moreover, as illustrated in FIG. 12, in a case where the point light source P101 is present at infinity, a part of the diffused light emitted from the point light source P101 is incident on the imaging lens 152 as parallel light parallel to the principal light beam L101. For example, the parallel light including light beams between the light beams L121 and L122 parallel to the principal light beam L101 is incident on the imaging lens 152. Then, the parallel light incident on the imaging lens 152 is condensed at the pixel position P111 on the imaging element 151. That is, the imaging lens 152 is designed to condense the parallel light from the point light source P101 present at infinity at the pixel position P111 to form the image of the point light source P101.

Therefore, the imaging lens 152 has a condensing function to allow the diffused light from the point light source having a principal light beam incident angle θ1 to be incident on a pixel (pixel output unit) P1 and allow the diffused light from the point light source having a principal light beam incident angle θ2 different from the principal light beam incident angle θ1 to be incident on a pixel (pixel output unit) P2 different from the pixel P1, for example. That is, the imaging lens 152 has the condensing function of allowing the diffused light from the light sources having the different principal light beam incident angles to be incident on a plurality of adjacent pixels (pixel output units). However, for example, the light beams from the point light sources close to each other or the point light sources that are present at infinity and are substantially close to each other might be incident on the same pixel (pixel output unit).

In contrast, for example, as described with reference to FIGS. 4 and 5, the light passing through the on-chip lens 121c is incident only on the light-receiving surface of the photodiode 121e or the photodiode 121f forming the corresponding pixel (pixel output unit). In other words, the on-chip lens 121c is provided for each pixel (pixel output unit), and condenses the incident light incident thereon on only the corresponding pixel (pixel output unit). That is, the on-chip lens 121c does not have the condensing function of allowing the light beams from the different point light sources to be incident on the different pixels (pixel output units).

Note that, in a case where the pinhole is used, a relationship between the position of each pixel (pixel output unit) and the incident angle of light is uniquely determined. Therefore, in a case of a configuration using the pinhole and the conventional imaging element, it is not possible to freely set the incident angle directivity independently for each pixel.

<Relationship Between Subject Surface and Imaging Element>

Next, a relationship of the distance between the subject surface and the imaging element 121 is described with reference to FIG. 13.

Figure 13:
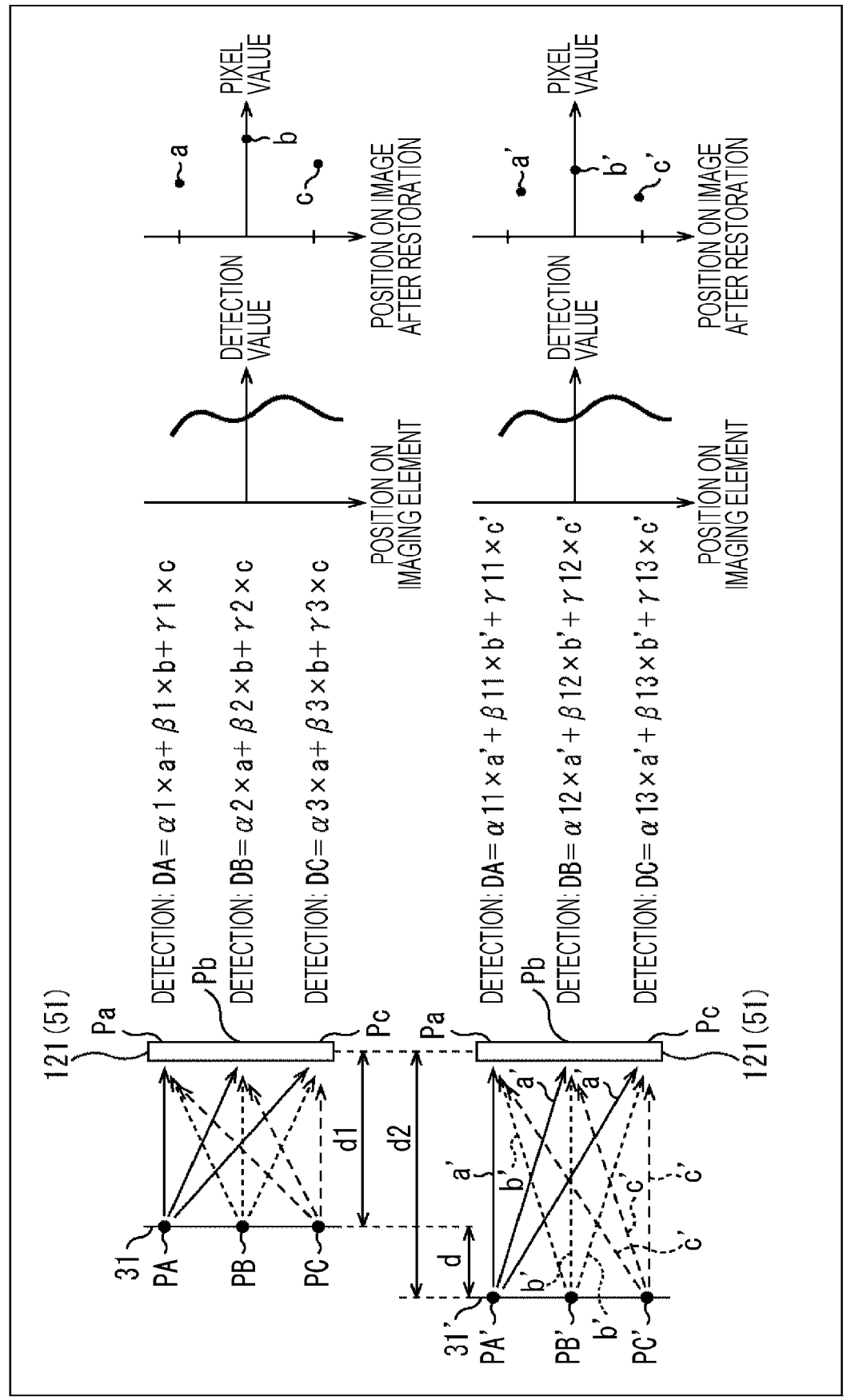
FIG. 13 is a view for illustrating a relationship between a subject distance and a coefficient indicating the incident angle directivity.

Note that, as illustrated in an upper left part of FIG. 13, in a case where a subject distance between the imaging element 121 (similar to the imaging element 51 in FIG. 1) and the subject surface 31 is a distance d1, the detection signal levels DA, DB, and DC in the pixels Pc, Pb, and Pa on the imaging element 121 are expressed by the same equations as equations (1) to (3) described above.

$$DA = \alpha1 \times a + \beta1 \times b + \gamma1 \times c \quad (1)$$

$$DB = \alpha2 \times a + \beta2 \times b + \gamma2 \times c \quad (2)$$

$$DC = \alpha3 \times a + \beta3 \times b + \gamma3 \times c \quad (3)$$

Furthermore, as illustrated in a lower left part of FIG. 13, also in a case where a subject surface 31' at a subject distance d2 from the imaging element 121 larger than the distance d1 by d, that is, the subject surface 31' on a back side of the subject surface 31 as seen from the imaging element 121 is considered, the detection signal levels in the pixels Pc, Pb, and Pa on the imaging element 121 are similar at the detection signal levels DA, DB, and DC as illustrated in a central portion in the lower stage of FIG. 13.

However, in this case, light beams of light intensities a', b', and c' from point light sources PA', PB', and PC' on the subject surface 31' are received by the respective pixels of the imaging element 121.

Furthermore, since the incident angles of the light beams of the light intensities a', b', and c' on the imaging element 121 are different (change), different coefficient set groups are required. Accordingly, the detection signal levels DA, DB, and DC in the pixels Pa, Pb, and Pc, respectively, are expressed by, for example, following equations (4) to (6).

$$DA = \alpha11 \times a' + \beta11 \times b' + \gamma11 \times c' \quad (4)$$

$$DB = \alpha12 \times a' + \beta12 \times b' + \gamma12 \times c' \quad (5)$$

$$DC = \alpha13 \times a' + \beta13 \times b' + \gamma13 \times c' \quad (6)$$

Here, the coefficient set group including the coefficient sets α11, β11, and γ11, coefficient sets α12, β12, and γ12, and coefficient sets α13, β13, and γ13 is the coefficient set group for the subject surface 31' corresponding to the coefficient sets α1, β1, and γ1, coefficient sets α2, β2, and γ2, and coefficient sets α3, β3, and γ3 for the subject surface 31.

Accordingly, by solving the simultaneous equations including equations (4) to (6) using the coefficient set groups α11, β11, γ11, α12, β12, γ12, α13, β13, and γ13 set in advance, it is possible to obtain the light intensities a', b', and c' of the light beams from the point light sources PA', PB', and PC' of the subject surface 31' as illustrated in a lower right part of FIG. 13 in a manner similar to that in a case of obtaining the light intensities a, b, and c of the light beams from the point light sources PA, PB, and PC of the subject surface 31. As a result, it becomes possible to restore a restored image of the subject surface 31'.

Therefore, in the imaging device 101 in FIG. 2, by preparing the coefficient set group for each distance (subject distance) from the imaging element 121 to the subject surface in advance, creating the simultaneous equations while switching the coefficient set group for each subject distance, and solving the created simultaneous equations, it is possible to obtain the restored images of the subject surfaces at various subject distances on the basis of one detection image. For example, by imaging and recording the detection image once, and thereafter switching the coefficient set group according to the distance to the subject surface by using the recorded detection image to restore the restored image, it is possible to generate the restored image of the subject surface at an arbitrary subject distance.

Furthermore, in a case where the subject distance and an angle of view may be specified, it is also possible to generate the restored image by using the detection signal of the pixel having the incident angle directivity suitable for the imaging of the subject surface corresponding to the specified subject distance and angle of view without using all the pixels. Therefore, the restored image may be generated by using the detection signal of the pixel suitable for the imaging of the subject surface corresponding to the specified subject distance and angle of view.

Figure 14:
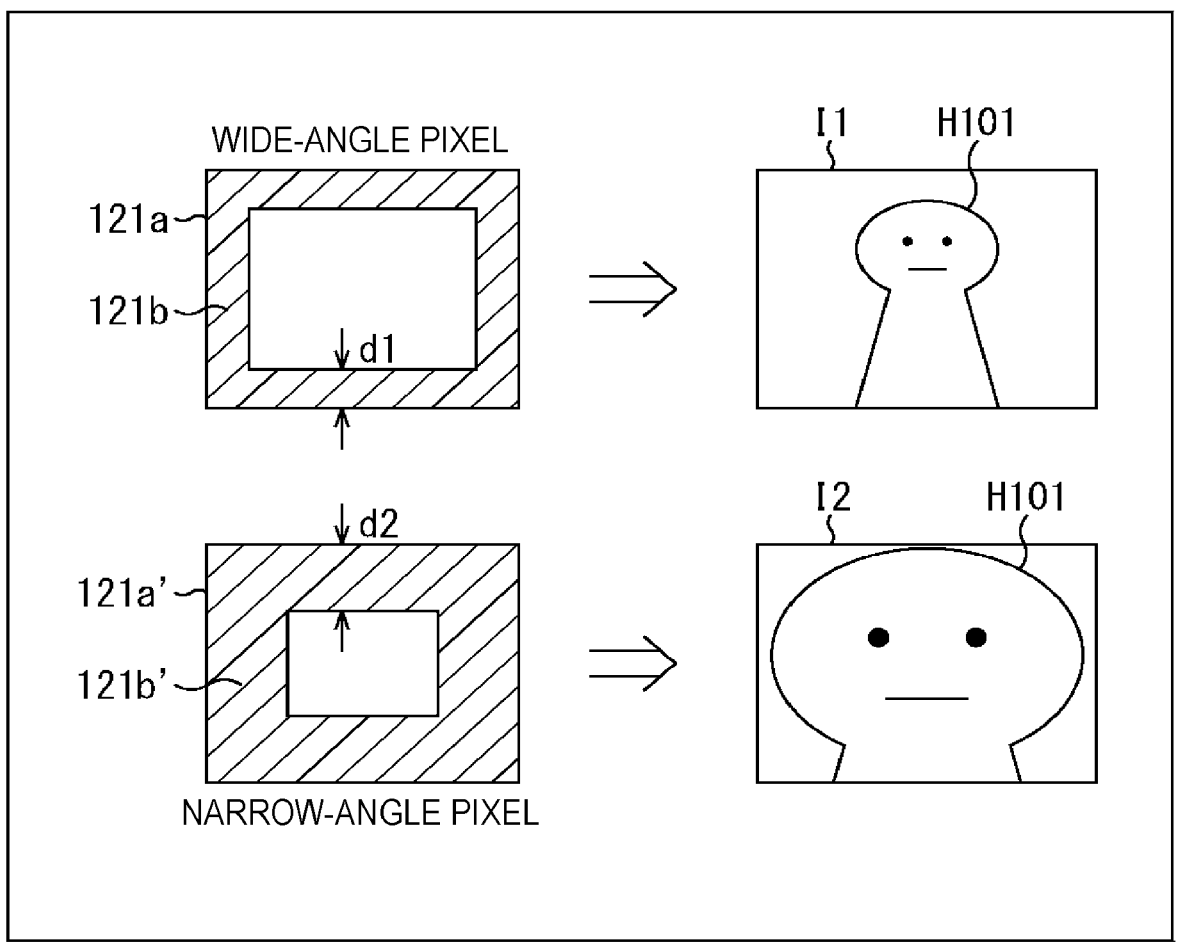
FIG. 14 is a view for illustrating a relationship between a narrow-angle pixel and a wide-angle pixel.

For example, the pixel 121a that is shielded by the light-shielding film 121b by a width d1 from each end of four sides as illustrated in an upper stage of FIG. 14 and a pixel 121a' that is shielded by the light-shielding film 121b by a width d2 (>d1) from each end of four sides as illustrated in a lower stage of FIG. 14 are considered.

Figure 15:
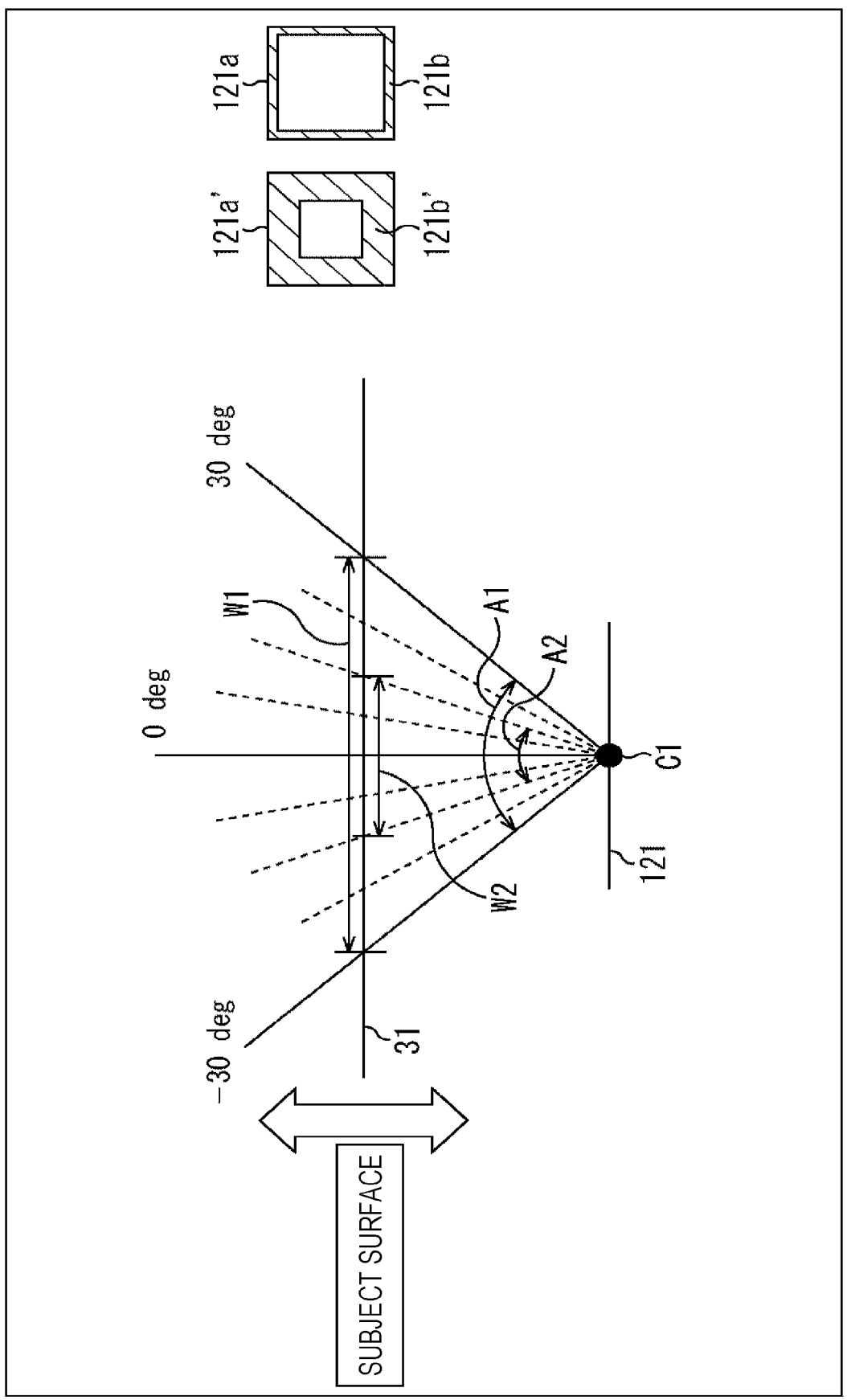
FIG. 15 is a view for illustrating a relationship between the narrow-angle pixel and the wide-angle pixel.

FIG. 15 illustrates an example of the incident angle of the incident light from the subject surface 31 to a central position C1 of the imaging element 121. Note that, FIG. 15 illustrates the example of the incident angle of the incident light in the horizontal direction, but this is substantially similar also in the vertical direction. Furthermore, in a right part of FIG. 15, the pixels 121a and 121a' in FIG. 14 are illustrated.

For example, in a case where the pixel 121a in FIG. 14 is arranged in the central position C1 of the imaging element 121, a range of the incident angle of the incident light on the pixel 121a from the subject surface 31 is an angle A1 as illustrated in a left part of FIG. 15. Accordingly, the pixel 121a may receive the incident light by a width W1 in the horizontal direction of the subject surface 31.

In contrast, in a case where the pixel 121a' in FIG. 14 is arranged in the central position C1 of the imaging element 121, the pixel 121a' has a wider light-shielding range than the pixel 121a, so that the range of the incident angle of the incident light on the pixel 121a' from the subject surface 31 is an angle A2 (<A1) as illustrated in the left part of FIG. 15. Accordingly, the pixel 121a' may receive the incident light by a width W2 (<W1) in the horizontal direction of the subject surface 31.

That is, the pixel 121a having a narrow light-shielding range is a wide-angle pixel suitable for imaging a wide range on the subject surface 31, whereas the pixel 121a' having a wide light-shielding range is a narrow-angle pixel suitable for imaging a narrow range on the subject surface 31. Note that, the wide-angle pixel and the narrow-angle pixel here are expressions that compare both the pixels 121a and 121a' in FIG. 14, and are not limited when comparing pixels of other angles of view.

Therefore, for example, the pixel 121a is used to restore an image I1 in FIG. 14. The image I1 is the image having an angle of view SQ1 corresponding to the subject width W1 including an entire person H101 as the subject in an upper stage of FIG. 16. In contrast, for example, the pixel 121a' is used to restore an image I2 in FIG. 14. The image I2 is the image having an angle of view SQ2 corresponding to the subject width W2 in which a periphery of a face of the person H101 in the upper stage of FIG. 16 is zoomed up.

Figure 16:
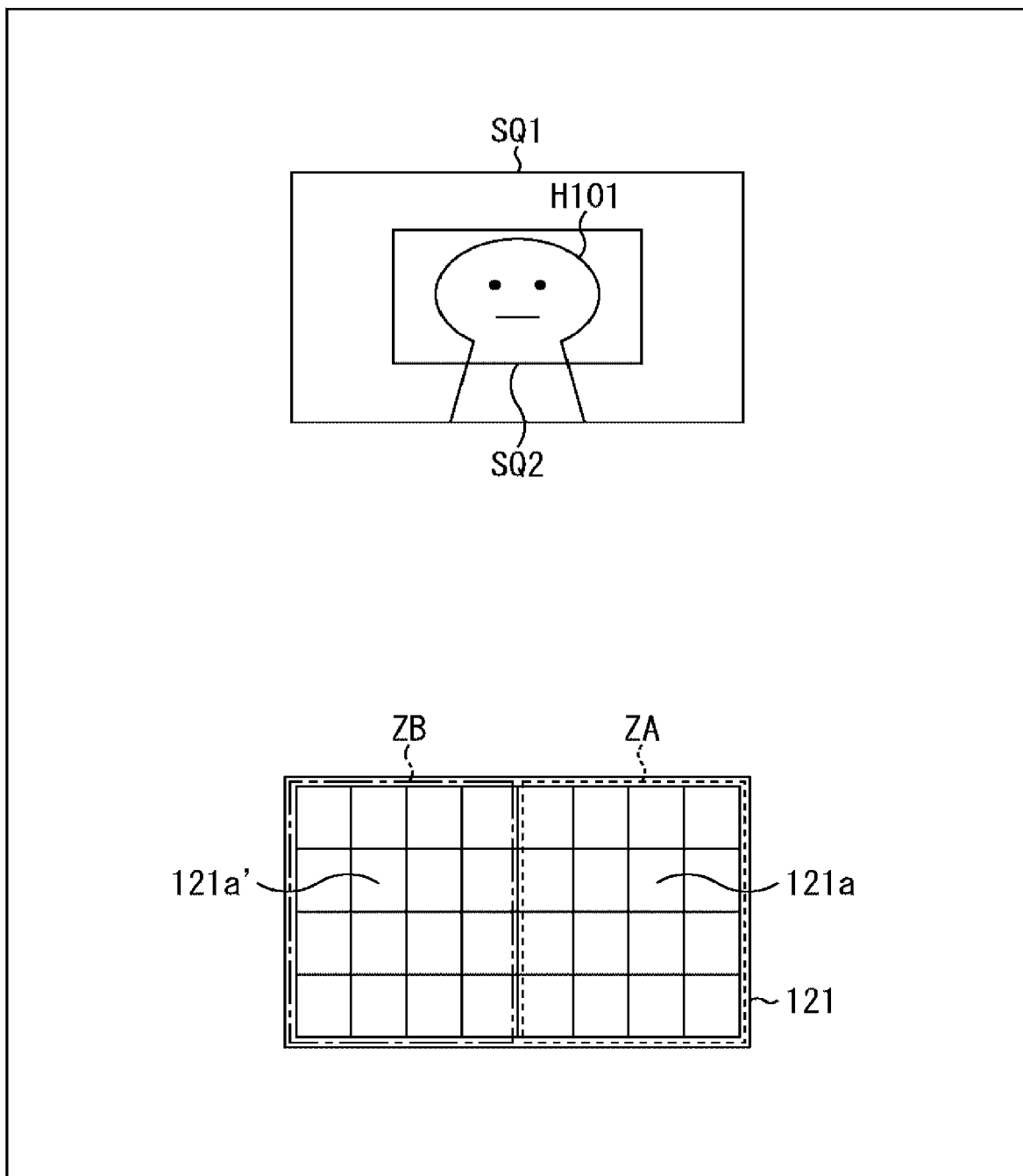
FIG. 16 is a view for illustrating a relationship between the narrow-angle pixel and the wide-angle pixel.

Furthermore, for example, as illustrated in a lower stage of FIG. 16, it is considered to arrange a predetermined number of pixels 121a in FIG. 14 in a range ZA enclosed by a dotted line of the imaging elements 121 and arrange a predetermined number of pixels 121a' in a range ZB enclosed by a dashed-dotted line. Then, for example, when restoring the image of the angle of view SQ1 corresponding to the subject width W1, the image of the angle of view SQ1 may be appropriately restored by using the detection signal of each pixel 121a in the range ZA. On the other hand, when restoring the image of the angle of view SQ2 corresponding to the subject width W2, the image of the angle of view SQ2 may be appropriately restored by using the detection signal of each pixel 121a' in the range ZB.

Note that, since the angle of view SQ2 is narrower than the angle of view SQ1, in a case of restoring the images of the angle of view SQ2 and the angle of view SQ1 with the same number of pixels, it is possible to obtain the restored image with a higher image quality when restoring the image of the angle of view SQ2 than when restoring the image of the angle of view SQ1.

That is, in a case where it is considered to obtain the restored image using the same number of pixels, it is possible to obtain the restored image with a higher image quality when restoring the image with the narrower angle of view.

Figure 17:
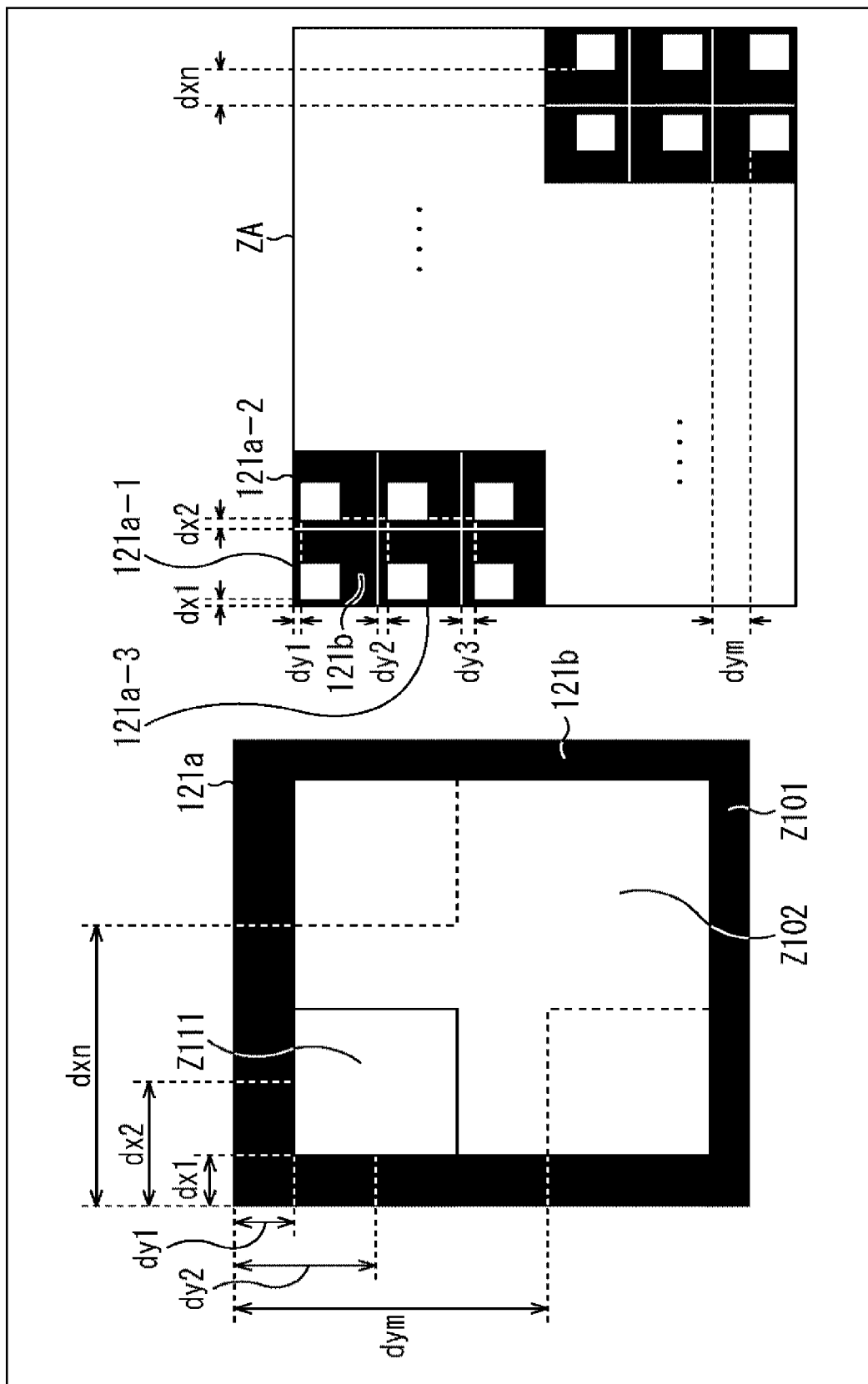
FIG. 17 is a view for illustrating a difference in image quality between the narrow-angle pixel and the wide-angle pixel.

For example, a right part of FIG. 17 illustrates a configuration example in the range ZA of the imaging element 121 in FIG. 16. A left part of FIG. 17 illustrates a configuration example of the pixel 121a in the range ZA.

In FIG. 17, a range in black represents the light-shielding film 121b, and the light-shielding range of each pixel 121a is determined, for example, according to rules illustrated in the left part of FIG. 17.

A main light-shielding portion Z101 in the left part of FIG. 17 (black part in the left part of FIG. 17) is a range that is shielded in common in each pixel 121a. Specifically, the main light-shielding portion Z101 has a range of a width dx1 from left and right sides of the pixel 121a into the pixel 121a, and a range of a height dy1 from upper and lower sides of the pixel 121a into the pixel 121a, respectively. Then, in each pixel 121a, a rectangular opening Z111 that is not shielded by the light-shielding film 121b is provided in a range Z102 inside the main light-shielding portion Z101. Accordingly, in each pixel 121a, a range other than the opening Z111 is shielded by the light-shielding film 121b.

Here, the openings Z111 of the respective pixels 121a are regularly arranged. Specifically, a position in the horizontal direction of the opening Z111 in each pixel 121a is the same in the pixels 121a in the same column in the vertical direction. Furthermore, a position in the vertical direction of the opening Z111 in each pixel 121a is the same in the pixels 121a in the same row in the horizontal direction.

On the other hand, the position in the horizontal direction of the opening Z111 in each pixel 121a is shifted at a predetermined interval according to the position in the horizontal direction of the pixel 121a. That is, as the position of the pixel 121a advances rightward, a left side of the opening Z111 moves to a position shifted rightward by widths dx1, dx2, . . . , and dxn from the left side of the pixel 121a. An interval between the widths dx1 and dx2, an interval between the widths dx2 and dx3, . . . , and an interval between the widths dxn−1 and dxn is a value obtained by dividing a length obtained by subtracting the width of the opening Z111 from the width in the horizontal direction of the range Z102 by the number of pixels n−1 in the horizontal direction.

Furthermore, the position in the vertical direction of the opening Z111 in each pixel 121a is shifted at a predetermined interval according to the position in the vertical direction of the pixel 121a. That is, as the position of the pixel 121a advances downward, an upper side of the opening Z111 moves to a position shifted downward by widths dy1, dy2, . . . , and dyn from the upper side of the pixel 121a. An interval between the heights dy1 and dy2, an interval between the heights dy2 and dy3, . . . , and an interval between the heights dyn−1 and dyn is a value obtained by dividing a length obtained by subtracting the height of the opening Z111 from the height in the vertical direction of the range Z102 by the number of pixels m−1 in the vertical direction.

Figure 18:
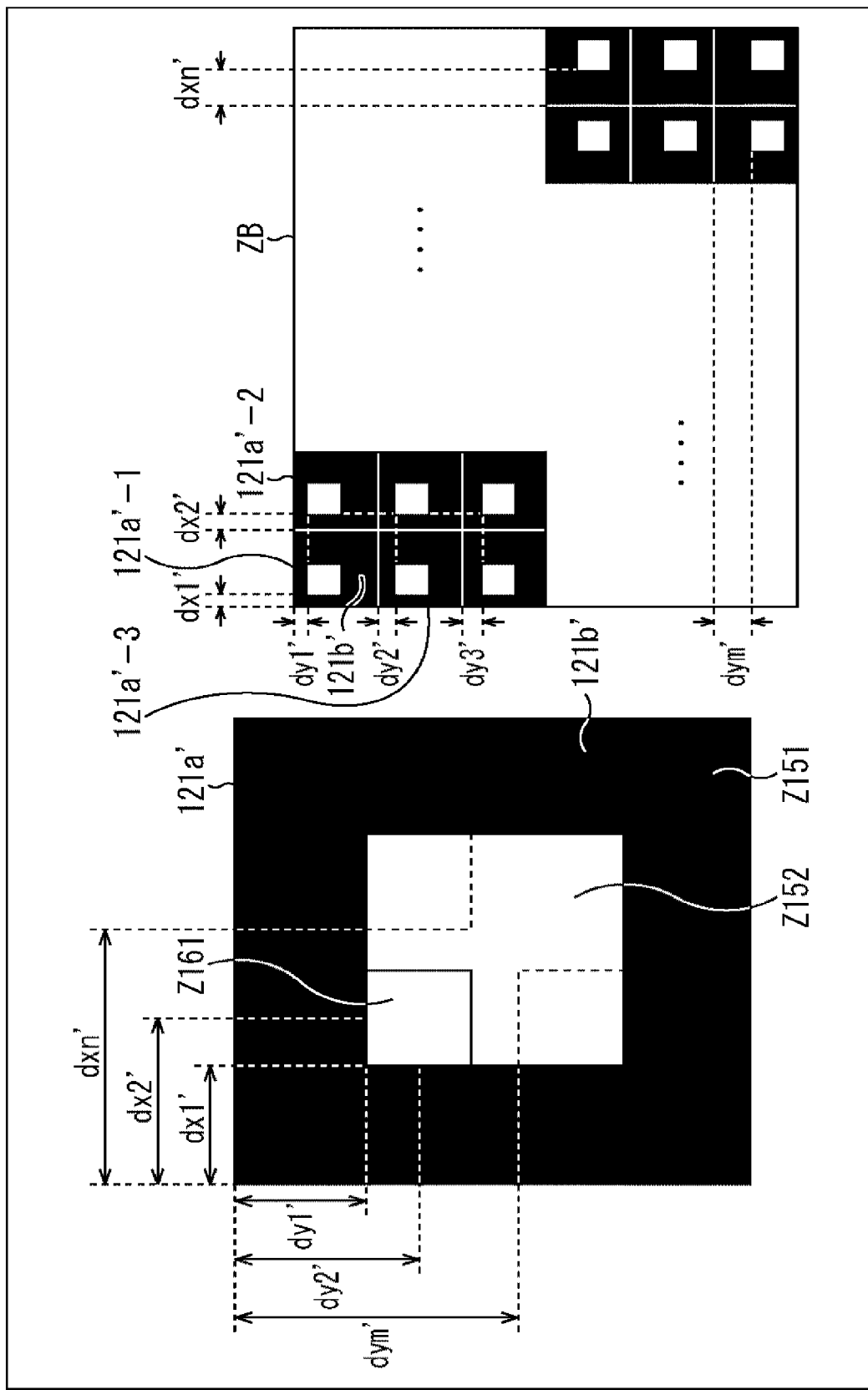
FIG. 18 is a view for illustrating a difference in image quality between the narrow-angle pixel and the wide-angle pixel.

A right part of FIG. 18 illustrates a configuration example within the range ZB of the imaging element 121 in FIG. 16. A left part of FIG. 18 illustrates a configuration example of the pixel 121a' in the range ZB.

In FIG. 18, a range in black represents the light-shielding film 121b', and the light-shielding range of each pixel 121a' is determined, for example, according to rules illustrated in the left part of FIG. 18.

A main light-shielding portion Z151 in the left part of FIG. 18 (black part in the left part of FIG. 18) is a range that is shielded in common in each pixel 121a'. Specifically, the main light-shielding portion Z151 has a range of a width dx1' from left and right sides of the pixel 121a' into the pixel 121a', and a range of a height dy1' from upper and lower sides of the pixel 121a' into the pixel 121a', respectively. Then, in each pixel 121a', a rectangular opening Z161 that is not shielded by the light-shielding film 121b' is provided in a range Z152 inside the main light-shielding portion Z151. Accordingly, in each pixel 121a', a range other than the opening 2161 is shielded by the light-shielding film 121b'.

Here, the openings Z161 of the respective pixels 121a' are regularly arranged in a manner similar to that of the openings Z111 of the respective pixels 121a in FIG. 17. Specifically, a position in the horizontal direction of the opening Z161 in each pixel 121a' is the same in the pixels 121a' in the same column in the vertical direction. Furthermore, a position in the vertical direction of the opening Z161 in each pixel 121a' is the same in the pixels 121a' in the same row in the horizontal direction.

On the other hand, the position in the horizontal direction of the opening Z161 in each pixel 121a' is shifted at a predetermined interval according to the position in the horizontal direction of the pixel 121a'. That is, as the position of the pixel 121a' advances rightward, a left side of the opening Z161 moves to a position shifted rightward by widths dx1', dx2', . . . , and dxn' from the left side of the pixel 121a'. An interval between the widths dx1' and dx2', an interval between the widths dx2' and dx3', . . . , and an interval between the widths dxn−1' and dxn' is a value obtained by dividing a length obtained by subtracting the width of the opening Z161 from the width in the horizontal direction of the range Z152 by the number of pixels n−1 in the horizontal direction.

Furthermore, the position in the vertical direction of the opening Z161 in each pixel 121a' is shifted at a predetermined interval according to the position in the vertical direction of the pixel 121a'. That is, as a position of the pixel 121a' advances downward, an upper side of the opening Z161 moves to a position shifted downward by widths dy1', dy2', . . . , and dyn' from the upper side of the pixel 121a'. An interval between the heights dy1' and dy2', an interval between the heights dy2' and dy3', . . . , and an interval between the heights dyn−1' and dyn' is a value obtained by dividing a length obtained by subtracting the height of the opening Z161 from the height in the vertical direction of the range Z152 by the number of pixels m−1 in the vertical direction.

Here, the length obtained by subtracting the width of the opening Z111 from the width in the horizontal direction of the range Z102 of the pixel 121a in FIG. 17 is larger than the width obtained by subtracting the width of the opening Z161 from the width in the horizontal direction of the range Z152 of the pixel 121a' in FIG. 18. Accordingly, a change interval between the widths dx1, dx2, . . . , and dxn in FIG. 17 is larger than the change interval between the widths dx1', dx2', and dxn' in FIG. 18.

Furthermore, the length obtained by subtracting the height of the opening Z111 from the height in the vertical direction of the range Z102 of the pixel 121a in FIG. 17 is larger than the length obtained by subtracting the height of the opening Z161 from the height in the vertical direction of the range Z152 of the pixel 121a' in FIG. 18. Accordingly, a change interval between the heights dy1, dy2, . . . , and dyn in FIG. 17 is larger than the change interval between the heights dy1', dy2', and dyn' in FIG. 18.

As described above, the change interval of the positions in the horizontal and vertical directions of the opening Z111 of the light-shielding film 121b of each pixel 121a in FIG. 17 is different from the change interval of the positions in the horizontal and vertical directions of the opening Z161 of the light-shielding film 121b' of each pixel 121a' in FIG. 18. Then, this difference in interval is the difference in subject resolution (angular resolution) in the restored image. That is, the change interval of the positions in the horizontal and vertical directions of the opening Z161 of the light-shielding film 121b' of each pixel 121a' in FIG. 18 is narrower than the change interval of the positions in the horizontal and vertical directions of the opening Z111 of the light-shielding film 121b of each pixel 121a in FIG. 17. Accordingly, the restored image restored by using the detection signal of each pixel 121a' in FIG. 18 has higher subject resolution and higher image quality than the restored image restored by using the detection signal of each pixel 121a in FIG. 17.

In this manner, by changing the combination of the light-shielding range of the main light-shielding portion and the opening range of the opening, the imaging element 121 including pixels having various angles of view (having various incident angle directivities) may be realized.

Note that, although the example in which the pixels 121a and the pixels 121a' are arranged separately in the range ZA and the range ZB, respectively, is described above, this is for the sake of simplicity, and the pixels 121a corresponding to different angles of view are desirably mixedly arranged in the same region.

Figure 19:
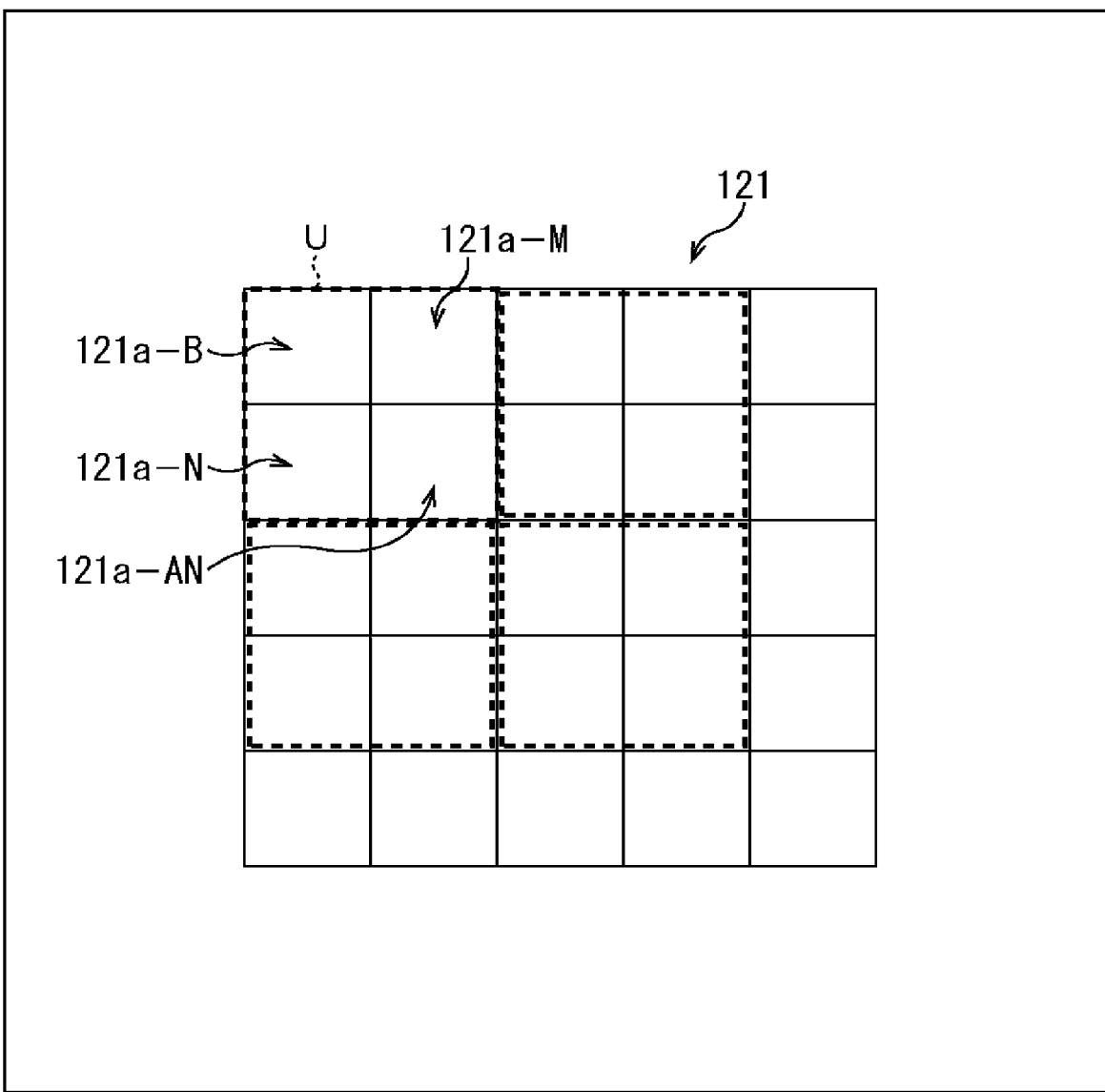
FIG. 19 is a view for illustrating an example of combining pixels of a plurality of angles of view.

For example, as illustrated in FIG. 19, four pixels each including two pixels×two pixels indicated by a dotted line are made one unit U, and each unit U includes a wide-angle pixel 121a-W, a medium-angle pixel 121a-M, a narrow-angle pixel 121a-N, and an extremely narrow-angle pixel 121a-AN.

In this case, for example, in a case where the number of all the pixels 121a is X, it becomes possible to restore the restored image using the detection images of X/4 pixels for each of the four types of view angles. At that time, four types of coefficient set groups different for each angle of view are used, and the restored images having different angles of view are restored by four different simultaneous equations.

Therefore, by restoring the restored image using the detection image obtained from the pixel suitable for imaging the angle of view of the restored image to be restored, it becomes possible to obtain an appropriate restored image corresponding to the four types of angles of view.

Furthermore, it is also possible to interpolate to generate images of the angle of view between the four types of angles of view and the angle of view around the same from the images of the four types of angles of view, and realize pseudo optical zooming by seamlessly generating the images of the various angles of view.

Note that, for example, in a case where the image having the wide angle of view is obtained as the restored image, all the wide-angle pixels may be used, or a part of the wide-angle pixels may be used. Furthermore, for example, in a case where the image having the narrow angle of view is obtained as the restored image, all the narrow-angle pixels may be used, or a part of the narrow-angle pixels may be used.

<Imaging Processing by Imaging Device 101>

Next, imaging processing by the imaging device 101 in FIG. 2 is described with reference to a flowchart in FIG. 20.

At step S1, the imaging element 121 images the subject. Therefore, the detection signal indicating the detection signal level corresponding to the amount of incident light from the subject is output from each pixel 121a of the imaging element 121 having different incident angle directivities, and the imaging element 121 supplies the detection image including the detection signal of each pixel 121a to the restoration unit 122.

At step S2, the restoration unit 122 obtains the coefficient used for the image restoration.

Specifically, the restoration unit 122 sets the distance to the subject surface 31 to be restored, that is, the subject distance. Note that, an arbitrary method may be adopted as a method of setting the subject distance. For example, the restoration unit 122 sets the subject distance input by the user via the input unit 124 or the subject distance detected by the detection unit 125 as the distance to the subject surface 31 to be restored.

Next, the restoration unit 122 reads the coefficient set group associated with the set subject distance from the storage unit 128.

At step S3, the restoration unit 122 restores the image using the detection image and the coefficient. Specifically, the restoration unit 122 uses the detection signal level of each pixel of the detection image and the coefficient set group obtained in the processing at step S2 to create the simultaneous equations described with reference to equations (1) to (3) or equations (4) to (6) described above. Next, the restoration unit 122 calculates the light intensity of each point light source on the subject surface 31 corresponding to the set subject distance by solving the created simultaneous equations. Then, by arranging the pixels having the pixel values according to the calculated light intensities according to the arrangement of the respective point light sources on the subject surface 31, the restoration unit 122 generates the restored image formed as the image of the subject.

At step S4, the imaging device 101 performs various types of processing on the restored image. For example, the restoration unit 122 performs demosaic processing, γ correction, white balance adjustment, conversion processing to a predetermined compression format and the like on the restored image as necessary. Furthermore, the restoration unit 122 supplies the restored image to the display unit 127 and allows the same to display the image, supplies the restored image to the recording/playback unit 129 and allows the same to record the image on the recording medium 130, or outputs the restored image to another device via the communication unit 131 as necessary, for example.

Thereafter, the imaging processing ends.

Note that, in the description above, the example of restoring the restored image from the detection image using the imaging element 121 and the coefficient set group associated with the subject distance is described; however, for example, it is also possible to further prepare the coefficient set group corresponding to the angle of view of the restored image as described above in addition to the subject distance and restore the restored image by using the coefficient set group according to the subject distance and the angle of view. Note that, the resolution with respect to the subject distance and the angle of view depends on the number of prepared coefficient set groups.

Figure 20:
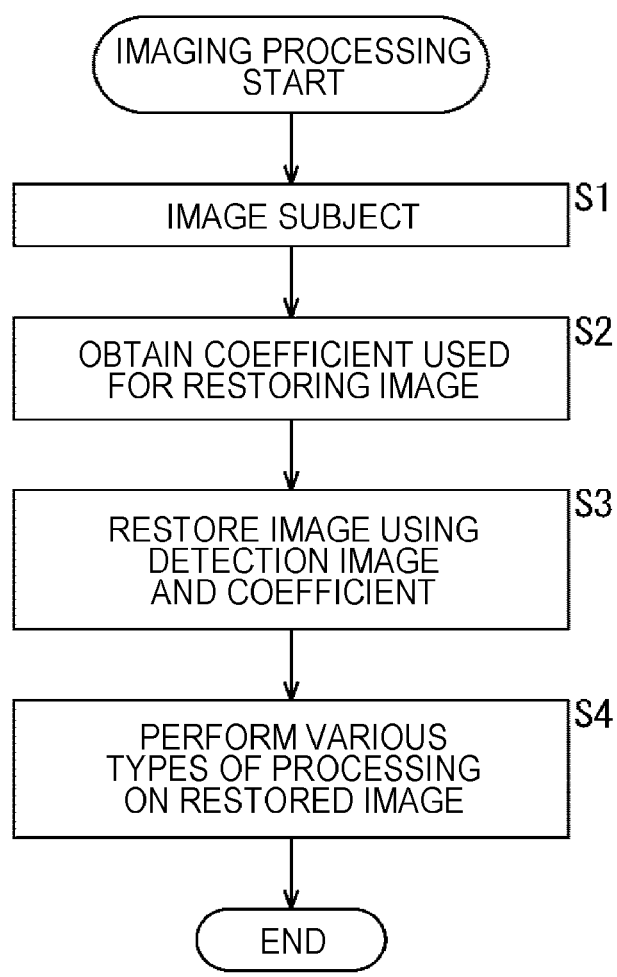
FIG. 20 is a flowchart illustrating imaging processing by the imaging device in FIG. 2.

Furthermore, in the description of the processing using the flowchart in FIG. 20, the example of using the detection signals of all the pixels included in the detection image is described; however, it is also possible to generate the detection image including the detection signal of the pixel having the incident angle directivity corresponding to the specified subject distance and angle of view among the pixels forming the imaging element 121 and restore the restored image by using the same. By such processing, it becomes possible to restore the restored image by the detection image suitable for the subject distance and the angle of view of the restored image to be obtained, and restoration accuracy and image quality of the restored image are improved. That is, in a case where the image corresponding to the specified subject distance and angle of view is the image corresponding to the angle of view SQ1 in FIG. 16, for example, by selecting the pixels 121a having the incident angle directivity corresponding to the angle of view SQ1 and restoring the restored image with the detection image obtained from them, it becomes possible to restore the image of the angle of view SQ1 with high accuracy.

By the processing described above, it becomes possible to realize the imaging device 101 having the imaging element 121 in which each pixel has incident angle directivity as an indispensable component.

As a result, the imaging lens, the pinhole, and the optical filter disclosed in the above-described Patent Document and the like are not necessary, so that the degree of freedom in designing the device may be improved, and an optical element formed separately from the imaging element 121 and assumed to be mounted together with the imaging element 121 in a stage of forming the imaging device becomes not necessary, so that the device may be made compact in the incident angle of the incident light and a manufacturing cost may be decreased. Furthermore, a lens corresponding to an imaging lens for forming an optical image such as a focus lens becomes unnecessary. However, a zoom lens that changes magnification may be provided.

Note that, in the description above, the processing of restoring the restored image corresponding to the predetermined subject distance immediately after the detection image is captured is described; however, for example, it is also possible to restore the restored image by using the detection image at a desired timing after recording the detection image on the recording medium 130 or output the same to another device via the communication unit 131 without performing the restoring processing immediately. In this case, the restoration of the restored image may be performed by the imaging device 101 or another device. In this case, for example, it is possible to obtain the restored image for the subject surface of arbitrary subject distance and angle of view by obtaining the restored image by solving the simultaneous equations created by using the coefficient set group according to arbitrary subject distance and angle of view, thereby realizing refocusing and the like.

For example, in a case where the imaging device including the imaging lens and the conventional imaging element is used, in order to obtain the image with various focal distances and angles of view, it is necessary to image while variously changing the focal distance and angle of view. On the other hand, in the imaging device 101, it is possible to restore the restored image of arbitrary subject distance and angle of view by switching the coefficient set group in this manner, so that processing of repeatedly imaging while variously changing the focal distance (that is, the subject distance) and the angle of view is not necessary.

In this case, for example, the user may also obtain the restored image of the desired subject distance and angle of view while allowing the display unit 127 to display the restored images that are restored while changing the coefficient set groups corresponding to the different subject distances and angles of view.

Note that, in a case of recording the detection image, when the subject distance and angle of view at the time of restoration are determined, the metadata used for restoration may be associated with the detection image. For example, by assigning the metadata to image data including the detection image, assigning the same ID to the detection image and the metadata, or recording the detection image and the metadata on the same recording medium 130, the detection image and the metadata are associated with each other.

Note that, in a case where the same ID is assigned to the detection image and the metadata, it is possible to record the detection image and the metadata on different recording media or individually output them from the imaging device 101.

Furthermore, the metadata may include the coefficient set group used for restoration or not. In the latter case, for example, the subject distance and angle of view at the time of restoration are included in the metadata, and the coefficient set group corresponding to the subject distance and angle of view is obtained from the storage unit 128 and the like at the time of restoration.

Moreover, in a case where the restored image is restored immediately at the time of imaging, for example, an image to be recorded or externally output may be selected from the detection image and the restored image. For example, it is possible to record or externally output both the images or record or externally output only one of the images.

Furthermore, in a case of capturing a moving image also, it is possible to select whether or not to restore the restored image at the time of imaging, or to select the image to be recorded or externally output. For example, it is possible to immediately restore the restored image of each frame, and record or externally output both or one of the restored image and the detection image before restoration while capturing the moving image. In this case, it is also possible to display the restored image of each frame as a through image at the time of imaging. Alternatively, for example, it is possible to record or externally output the detection image of each frame without performing restoration processing at the time of imaging.

Moreover, when capturing the moving image, for example, it is possible to select whether or not to restore the restored image, and select the image to be recorded or externally output for each frame. For example, it is possible to switch whether or not to restore the restored image for each frame. Furthermore, for example, it is possible to individually switch whether or not to record the detection image and whether or not to record the restored image for each frame. Furthermore, for example, it is also possible to record the detection images of all the frames while assigning the metadata to the detection image of a useful frame that may be used later.

Furthermore, it is also possible to realize an autofocus function as is the case with the imaging device using the imaging lens. For example, the autofocus function may be realized by determining the optimum subject distance by a hill-climbing method similar to a contrast auto focus (AF) method on the basis of the restored image.

Moreover, it is possible to generate the restored image using the detection image captured by the imaging element 121 having incident angle directivities in a pixel unit as compared to the imaging device and the like including the optical filter disclosed in above-described Patent Document and the like and the conventional imaging element, so that it becomes possible to realize an increase in pixels or obtain the restored image with high resolution and high angular resolution. In contrast, in the imaging device including the optical filter and the conventional imaging element, it is difficult to realize the high resolution restored image and the like because it is difficult to miniaturize the optical filter even if the pixels are miniaturized.

Furthermore, in the imaging device 101 of the present disclosure, the imaging element 121 is the indispensable configuration, and does not require, for example, the optical filter and the like disclosed in Patent Document and the like described above, so that the optical filter is not bent by heat due to a high-temperature usage environment, and it is possible to realize the imaging device with high environmental resistance.

Moreover, the imaging device 101 of the present disclosure does not require the imaging lens, pinhole, and optical filter disclosed in Patent Document and the like described above, so that it becomes possible to improve the degree of freedom in designing a configuration having an imaging function.

<Method of Reducing Processing Load>

By the way, in a case where the light-shielding range (that is, the incident angle directivity) of the light-shielding film 121b of each pixel 121a of the imaging element 121 has randomness, as disorder of a difference in the light-shielding range is larger, a load of the processing by the restoration unit 122 is larger. Therefore, it is possible to reduce the disorder, thereby reducing the processing road by making a part of the change in the light-shielding range of the light-shielding film 121b of each pixel 121a regular.

For example, the L-shaped light-shielding film 121b obtained by combining the longitudinal band-type and the lateral band-type is formed, and the lateral band-type light-shielding films 121b having the same width are combined in a predetermined column direction and the longitudinal band-type light-shielding films 121b having the same height are combined in a predetermined row direction. Therefore, the light-shielding range of the light-shielding film 121b of each pixel 121a changes randomly in a pixel unit while having regularity in the column direction and the row direction. As a result, a difference in the light-shielding range of the light-shielding film 121b of each pixel 121a, that is, the disorder in the difference of the incident angle directivity may be reduced, and the processing load of the restoration unit 122 may be reduced.

Figure 21:
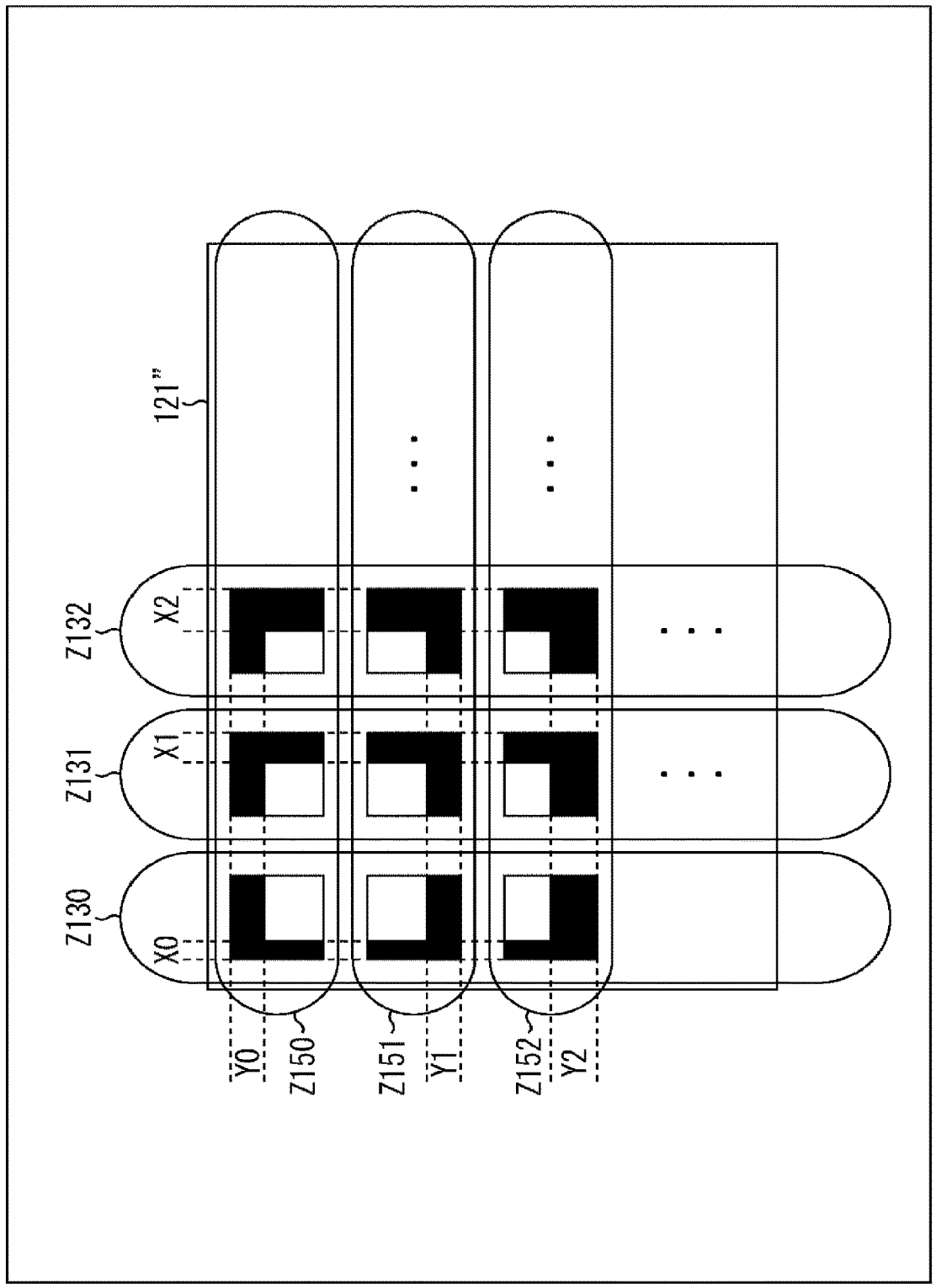
FIG. 21 is a view for illustrating a method of reducing a processing load.

Specifically, for example, as illustrated in an imaging element 121" in FIG. 21, lateral band-type light-shielding films 121b having the same width X0 are used for the pixels in the same column indicated by a range Z130, and the longitudinal band-type light-shielding film 121b having the same height Y0 are used for the pixels in the same row indicated by a range Z150. As a result, for the pixel 121a specified by each row and column, the L-shaped light-shielding film 121b obtained by combining them is used.

Similarly, the lateral band-type light-shielding film 121b having the same width X1 are used for the pixels in the same column indicated by a range Z131 adjacent to the range Z130, and the longitudinal band-type light-shielding film 121b having the same height Y1 are used for the pixels in the same row indicated by a range Z151 adjacent to the range Z150. As a result, for the pixel 121a specified by each row and column, the L-shaped light-shielding film 121b obtained by combining them is used.

Moreover, the lateral band-type light-shielding film 121b having the same width X2 are used for the pixels in the same column indicated by a range Z132 adjacent to the range Z131, and the longitudinal band-type light-shielding film 121b having the same height Y2 are used for the pixels in the same row indicated by a range Z152 adjacent to the range Z151. As a result, for the pixel 121a specified by each row and column, the L-shaped light-shielding film 121b obtained by combining them is used.

By doing so, it is possible to set the range of the light-shielding film to different values in a pixel unit while allowing the width and position in the horizontal direction and the height and the position in the vertical direction of the light-shielding film 121b to have regularity, so that it is possible to control the disorder in the change in the incident angle directivity. As a result, it becomes possible to reduce patterns of the coefficient sets and reduce the processing load of arithmetic processing in the restoration unit 122.

Figure 22:
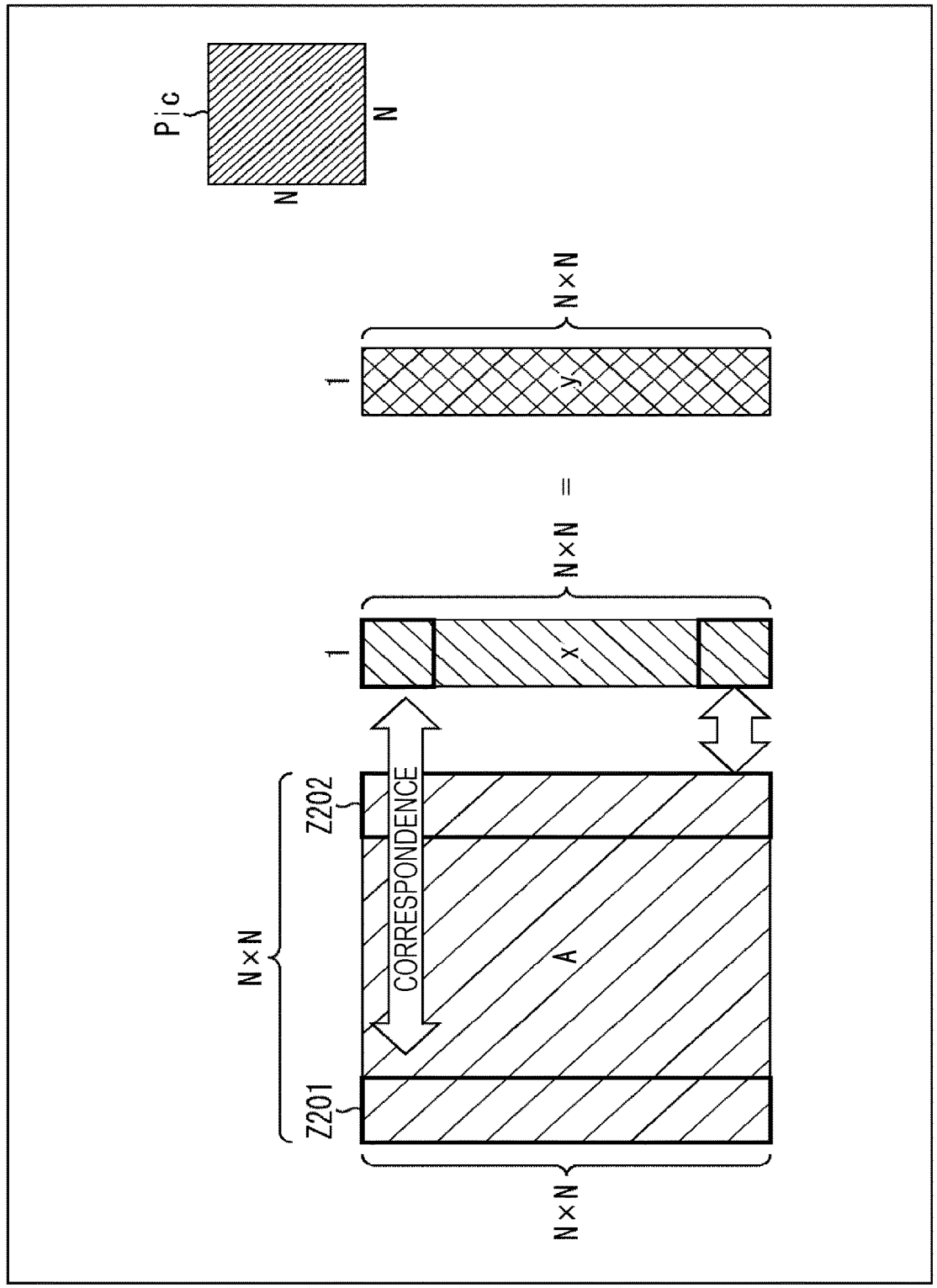
FIG. 22 is a view for illustrating the method of reducing the processing load.

In further detail, as illustrated in an upper right part of FIG. 22, in a case of obtaining a restored image of N×N pixels from a detection image Pic of N pixels×N pixels, a relationship illustrated in a left part of FIG. 22 is established by a vector X having pixel values of the respective pixels of the restored image of (N×N) rows×one column as elements, a vector Y having pixel values of the respective pixels of the detection image of (N×N) rows×one column as elements, and a matrix A of (N×N) rows×(N×N) columns including the coefficient set group.

That is, FIG. 22 illustrates that a result obtained by multiplying the respective elements of the matrix A of (N×N) rows×(N×N) columns including the coefficient set group by the vector X of (N×N) rows×one column representing the restored image is the vector Y of (N×N) rows× one column representing the detection image.

Then, from this relationship, for example, the simultaneous equations corresponding to equations (1) to (3) or equations (4) to (6) described above are formed.

Note that, FIG. 22 illustrates that each element of the first column indicated by a range Z201 of the matrix A corresponds to the element of the first row of the vector X, and each element of the N×N-th column indicated by a range Z202 of the matrix A corresponds to the element of the N×N-th row of the vector X.

Note that, in a case of using the pinhole, and in a case of using a condensing function for allowing the incident light incident in the same direction such as the imaging lens to be incident on both adjacent pixel output units, a relationship between the position of each pixel and the incident angle of the light is uniquely determined, so that the matrix A is a diagonal matrix in which all rightward falling diagonal components are one. On the other hand, in a case where neither the pinhole nor the imaging lens is used as in the imaging device 101 in FIG. 2, the relationship between the position of each pixel and the incident angle of light is not uniquely determined, so that the matrix A is not the diagonal matrix.

In other words, the restored image may be obtained by solving the simultaneous equations based on a determinant illustrated in FIG. 22 and obtaining each element of the vector X.

Figure 23:
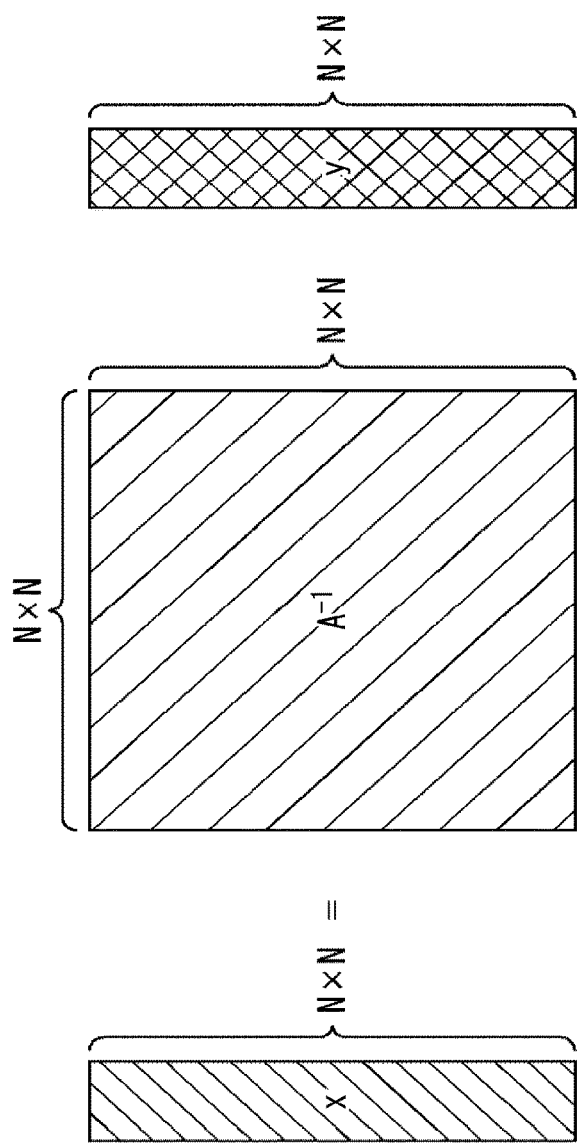
FIG. 23 is a view for illustrating the method of reducing the processing load.

By the way, in general, the determinant in FIG. 22 is transformed as illustrated in FIG. 23 by multiplying both sides by an inverse matrix $A^{-1}$ of the matrix A from the left, and each element of the vector X being the detection image is obtained by multiplying the vector Y of the detection image by an inverse matrix $A^{-1}$ from the left.

However, in reality, there is a case where the matrix A cannot be obtained correctly, the matrix A cannot be measured correctly, a basis vector of the matrix A nearly linearly dependent and it is not possible to solve, and each element of the detection image includes noise. Then, for any of these reasons or a combination thereof, the simultaneous equations might not be solved.

Therefore, for example, considering a robust configuration with respect to various errors, following equation (7) using the concept of the regularized least-square method is used.

[Mathematical Expression 1]

$$\hat{x} + \min \|A\hat{x} - y\|^2 + \|\gamma \hat{x}\|^2 \qquad (7)$$

Here, x with "^" at the top in equation (7) represents the vector X, A represents the matrix A, Y represents the vector Y, γ represents a parameter, ‖A‖ represents a L2 norm (square-root of sum root squares). Here, a first term on the right side is a norm when minimizing both sides in FIG. 22, and a second term on the right side is a regularization term.

When this equation (7) is solved for x, following equation (8) is obtained.

[Mathematical Expression 2]

$$\hat{x} = (A^t A + \gamma I)^{-1} A^t y \qquad (8)$$

Here, $A^t$ represents a transposed matrix of the matrix A, and I represents a unit matrix.

However, since the matrix A has an enormous size, a calculation amount and a required memory amount are large.

Figure 24:
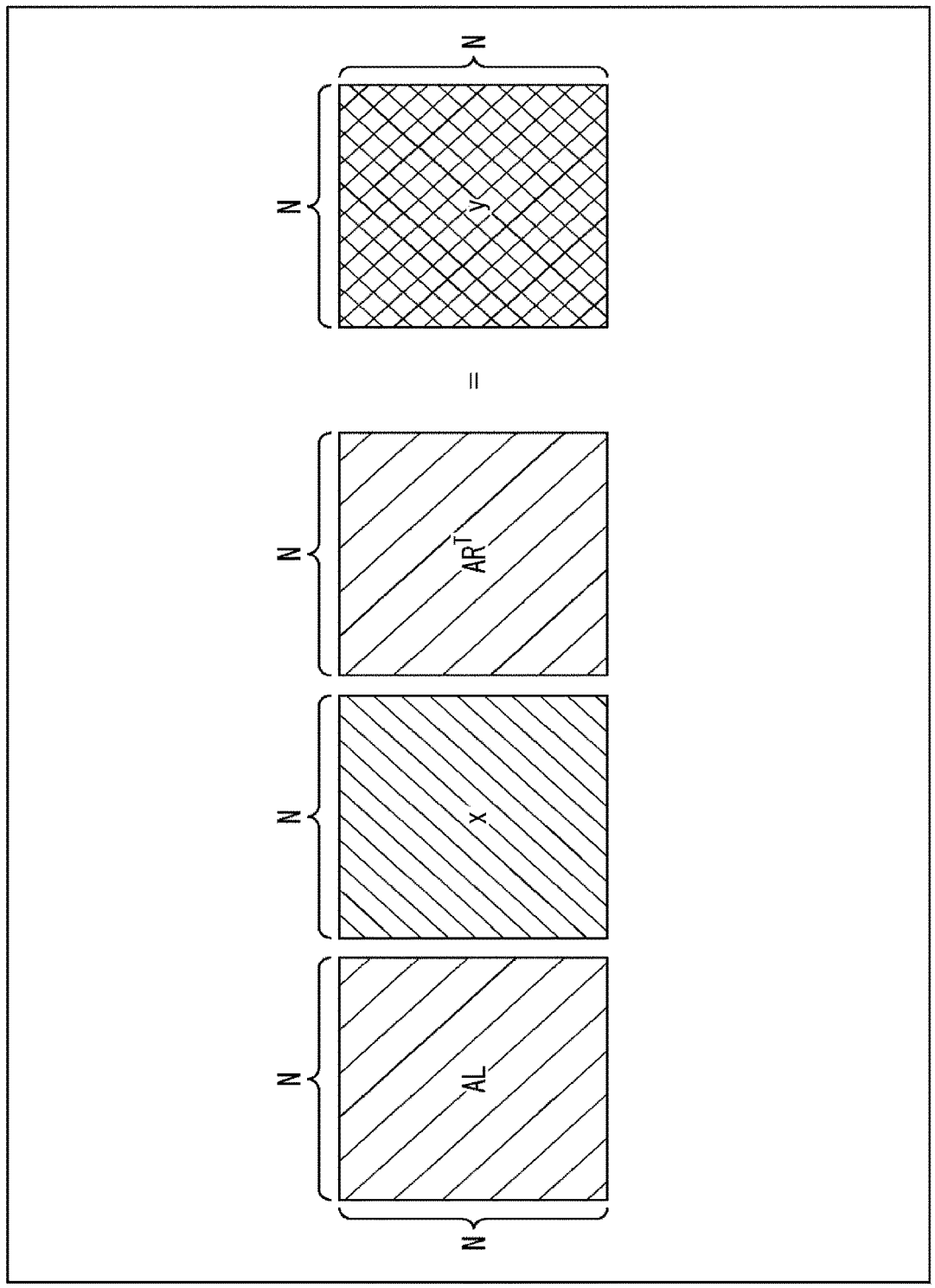
FIG. 24 is a view for illustrating the method of reducing the processing load.

Therefore, for example, as illustrated in FIG. 24, the matrix A is decomposed into a matrix AL of N rows×N columns and a matrix $AR^T$ of N rows×N columns, and they are multiplied from former and latter stages of the matrix X of N rows×N columns representing the restored image, and the matrix Y of N rows×N columns representing the detection image is obtained as a result. Therefore, for the matrix A of the number of elements (N×N)×(N×N), the matrices AL and $AR^T$ having the number of elements (N×N) are obtained, and the number of elements in each matrix becomes 1/(N× N). As a result, a calculation amount and the required memory amount may be reduced.

The determinant illustrated in FIG. 24 is realized, for example, by making the matrix in parentheses in equation (8) the matrix AL and making the inverse matrix of the transposed matrix of the matrix A the matrix $AR^T$.

Figure 25:
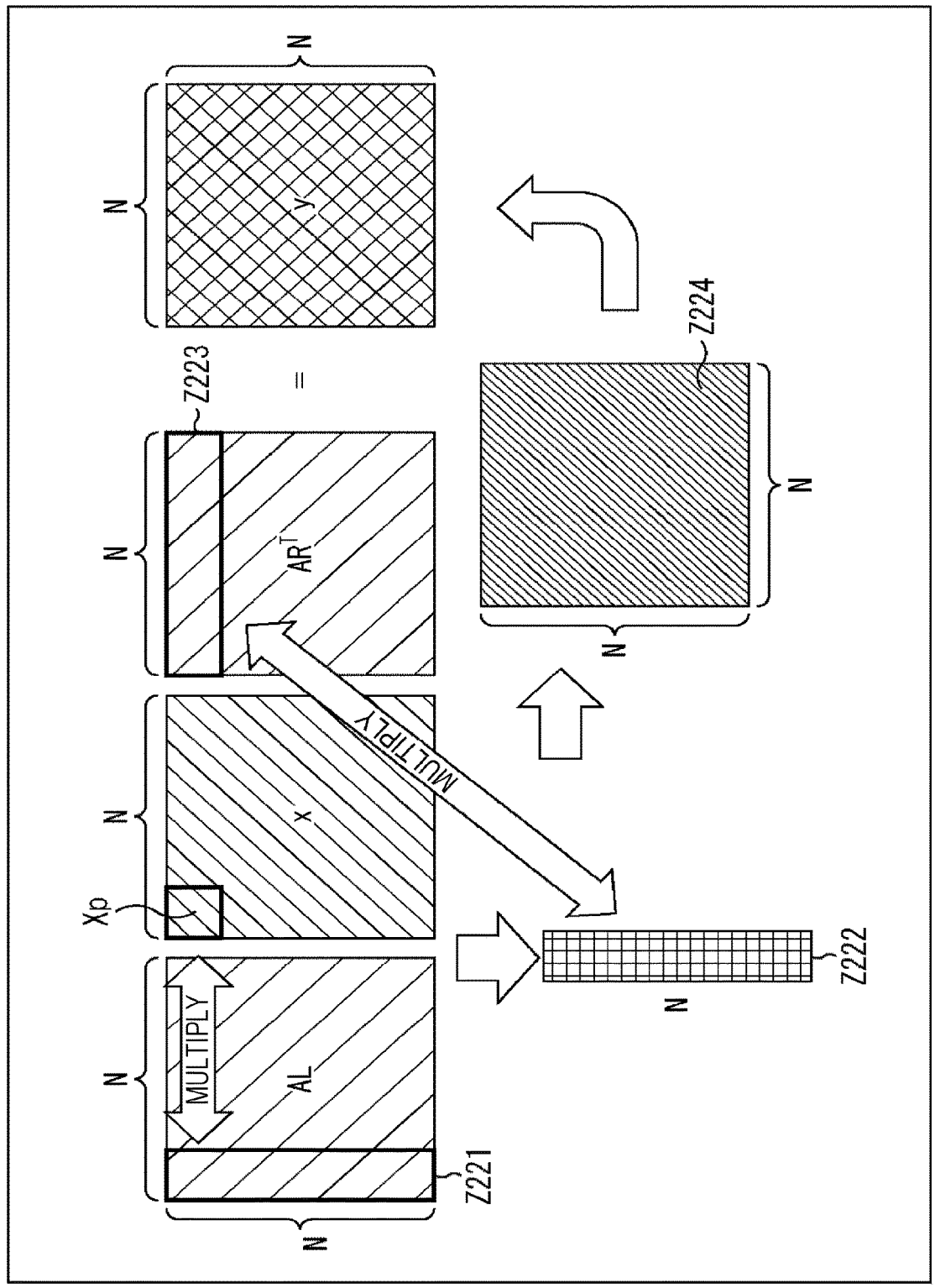
FIG. 25 is a view for illustrating the method of reducing the processing load.

In the calculation illustrated in FIG. 24, as illustrated in FIG. 25, an element group Z222 is obtained by multiplying an element of interest Xp in the matrix X by each element group Z221 of the corresponding column of the matrix AL. Moreover, a two-dimensional response Z224 corresponding to the element of interest Xp is obtained by multiplying the element group Z222 by the elements in the row corresponding to the element of interest Xp of the matrix $AR^T$. Then, the matrix Y is obtained by integrating the two-dimensional responses Z224 corresponding to all the elements of the matrix X.

Therefore, for example, in the element group Z221 of each column of the matrix AL, a coefficient corresponding to the incident angle directivity of the lateral-band type pixel 121a set to have the same width for each column of the imaging elements 121 illustrated in FIG. 21 is used.

Similarly, for example, in the element group Z223 of each row of the matrix $AR^T$, a coefficient corresponding to the incident angle directivity of the longitudinal-band type pixel 121a set to have the same height for each row of the imaging elements 121 illustrated in FIG. 21 is used.

As a result, since it becomes possible to reduce the matrix used when restoring the restored image on the basis of the detection image, the calculation amount may be reduced, a processing speed may be improved, and power consumption for the calculation may be reduced.

Furthermore, since the matrix may be reduced, a capacity of the memory used for the calculation may be reduced, and a device cost may be reduced.

Note that, although FIG. 21 illustrates the example of changing the light-shielding range (light-receiving range) in a pixel unit while providing predetermined regularity in the horizontal direction and the vertical direction, in the present disclosure, the light-shielding range (light-receiving range) not completely randomly set in a pixel unit but randomly set to a certain degree in this manner is also considered to be randomly set. In other words, in the present disclosure, not only a case where the light-shielding range (light-receiving range) is set completely at random in a unit of pixel, but also a case at random to a certain degree (for example, a case where a part of all the pixels has a range with regularity but other range is at random), or a case apparently not regular to a certain degree (a case of arrangement in which it is not possible to confirm arrangement according to the regularity as described with reference to FIG. 21 among all the pixels) are also considered to be random.

3. Embodiment

Next, an embodiment of the present disclosure is described with reference to FIGS. 26 to 35.

As described above, an imaging element 121 using a pixel having incident angle directivity does not require an imaging lens, an optical filter and the like, so that a degree of freedom in arrangement of respective pixels 121a is high.

Therefore, in this embodiment, a subject is imaged by a plurality of imaging devices including the imaging element having the incident angle directivity, and a restored image is restored using a detection signal obtained by each imaging device.

<Configuration Example of Imaging System 301>

Figure 26:
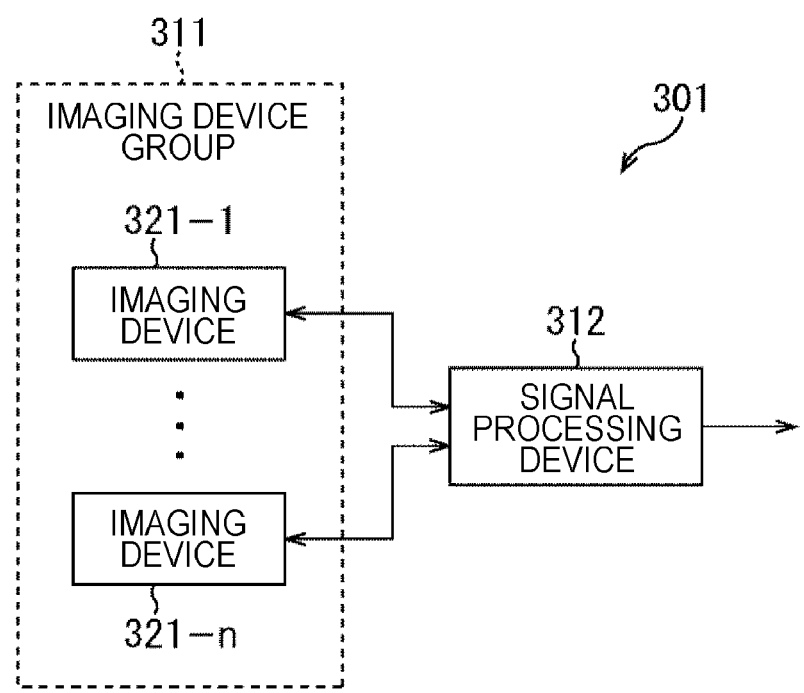
FIG. 26 is a block diagram illustrating a configuration example of an imaging system to which the technology of the present disclosure is applied.

FIG. 26 is a block diagram illustrating a configuration example of an imaging system 301 according to the embodiment of the present disclosure.

The imaging system 301 includes an imaging device group 311 and a signal processing device 312 configured as separate casings.

The imaging device group 311 includes two or more n imaging devices 321-1 to 321-n. Note that, hereinafter, in a case where it is not necessary to distinguish the imaging devices 321-1 to 321-n from one another, they are simply referred to as the imaging devices 321.

Each imaging device 321 is installed in predetermined position and orientation using, a jig and the like, for example. Alternatively, each imaging device 321 may be appropriately installed, and the position and orientation of each imaging device 321 may be detected by a predetermined method. Furthermore, each imaging device 321 includes the imaging element 121 having the incident angle directivity described above, generates an image file including a detection signal set including a detection signal output from each pixel 121a of each imaging element 121, and transmits the same to the signal processing device 312.

Here, the image file is a data set that includes image data and includes metadata corresponding to the image data as necessary. The image data includes, for example, at least one of the detection signal set, a detection image, or the restored image. The metadata includes, for example, an ID for identifying each imaging device 321, a coefficient set group corresponding to the image data and the like.

The signal processing device 312 controls imaging by each imaging device 321, obtains the image file from each imaging device 321, and performs restoration processing and the like of the restored image using the obtained image file.

<Configuration Example of Imaging Device 321>

Figure 27:
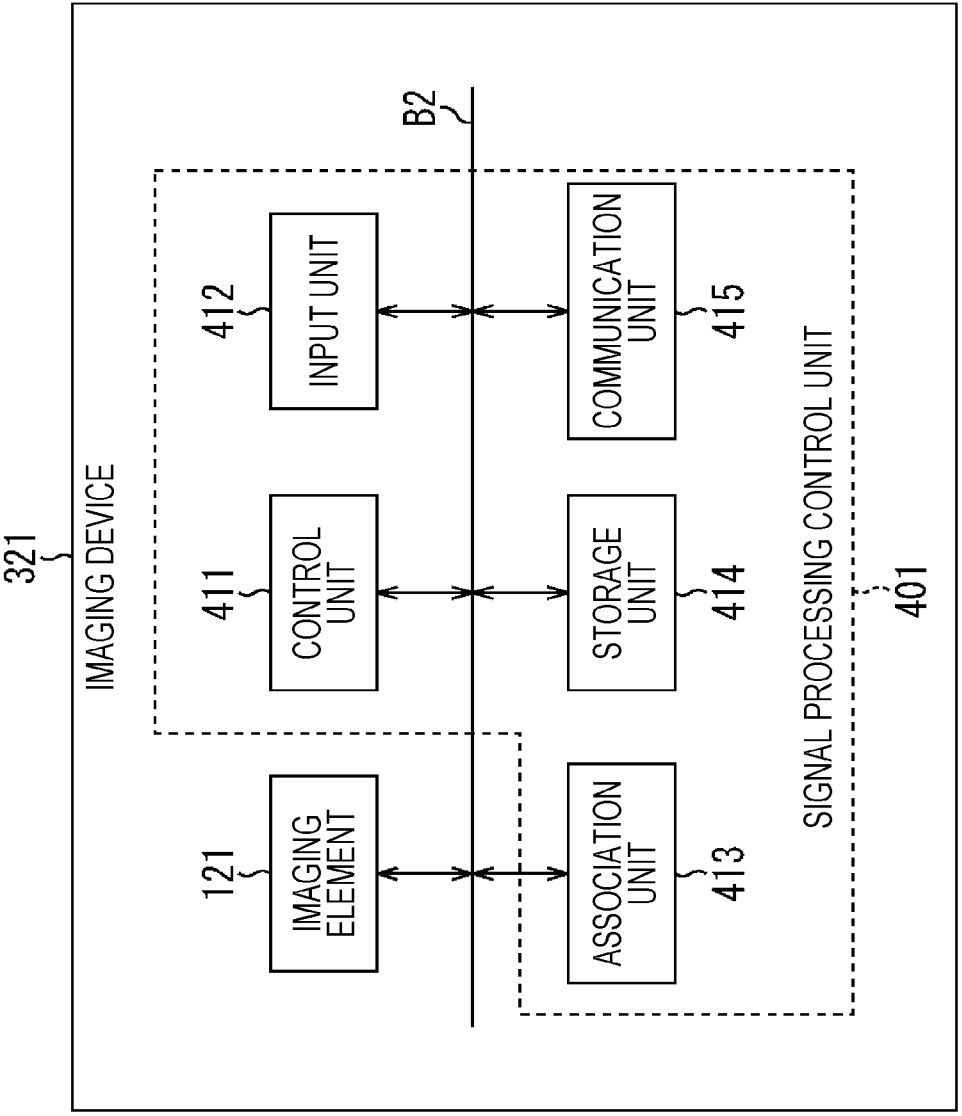
FIG. 27 is a view illustrating a configuration example of an imaging device in FIG. 26.

FIG. 27 is a block diagram illustrating a configuration example of the imaging device 321 in FIG. 26. Note that, in the drawing, a portion corresponding to that of the imaging device 101 in FIG. 2 is assigned with the same reference sign, and the description thereof is omitted as appropriate.

The imaging device 321 includes an imaging element 121, a control unit 411, an association unit 413, a storage unit 414, and a communication unit 414.

Furthermore, the control unit 411, the association unit 413, the storage unit 414, and the communication unit 414 form a signal processing control unit 401. Note that, the imaging device 321 does not include an imaging lens.

Furthermore, the imaging element 121, the control unit 411, the association unit 413, the storage unit 414, and the communication unit 414 are connected to one another via a bus B2, and perform transmission, reception and the like of data via the bus B2. Note that, hereinafter, in order to simplify the description, description of the bus B2 in a case where each unit of the imaging device 321 performs the transmission, reception and the like of the data via the bus B2 is omitted.

The imaging element 121 outputs the detection signal set including the detection signal output from each pixel 121a to the bus B2.

The control unit 411 includes, for example, various processors and controls each unit of the imaging device 321.

The input unit 412 includes an input device (for example, a key, a switch, a button, a dial, a touch panel, a remote controller and the like) for operating the imaging device 321, inputting data used for processing and the like. The input unit 412 outputs an operation signal, the input data and the like to the bus B2.

The association unit 413 associates the detection signal set obtained by the imaging element 121 with the metadata corresponding to the detection signal set in cooperation with an association unit 504 (FIG. 29) of the signal processing device 312 or alone.

The storage unit 414 includes one or more storage devices such as a read only memory (ROM), a random access memory (RAM), and a flash memory, and stores, for example, programs, data and the like used for processing of the imaging device 321. The storage unit 414 stores, for example, the ID for uniquely identifying the imaging device 321.

The communication unit 415 communicates with other devices (for example, other imaging device 321, signal processing device 312 and the like) by a predetermined communication method. Note that, the communication method of the communication unit 415 may be wired or wireless. Furthermore, the communication unit 415 may support a plurality of communication methods.

<Example of Pattern of Light-Shielding Film 121*b* of Each Imaging Element 121>

Figure 28:
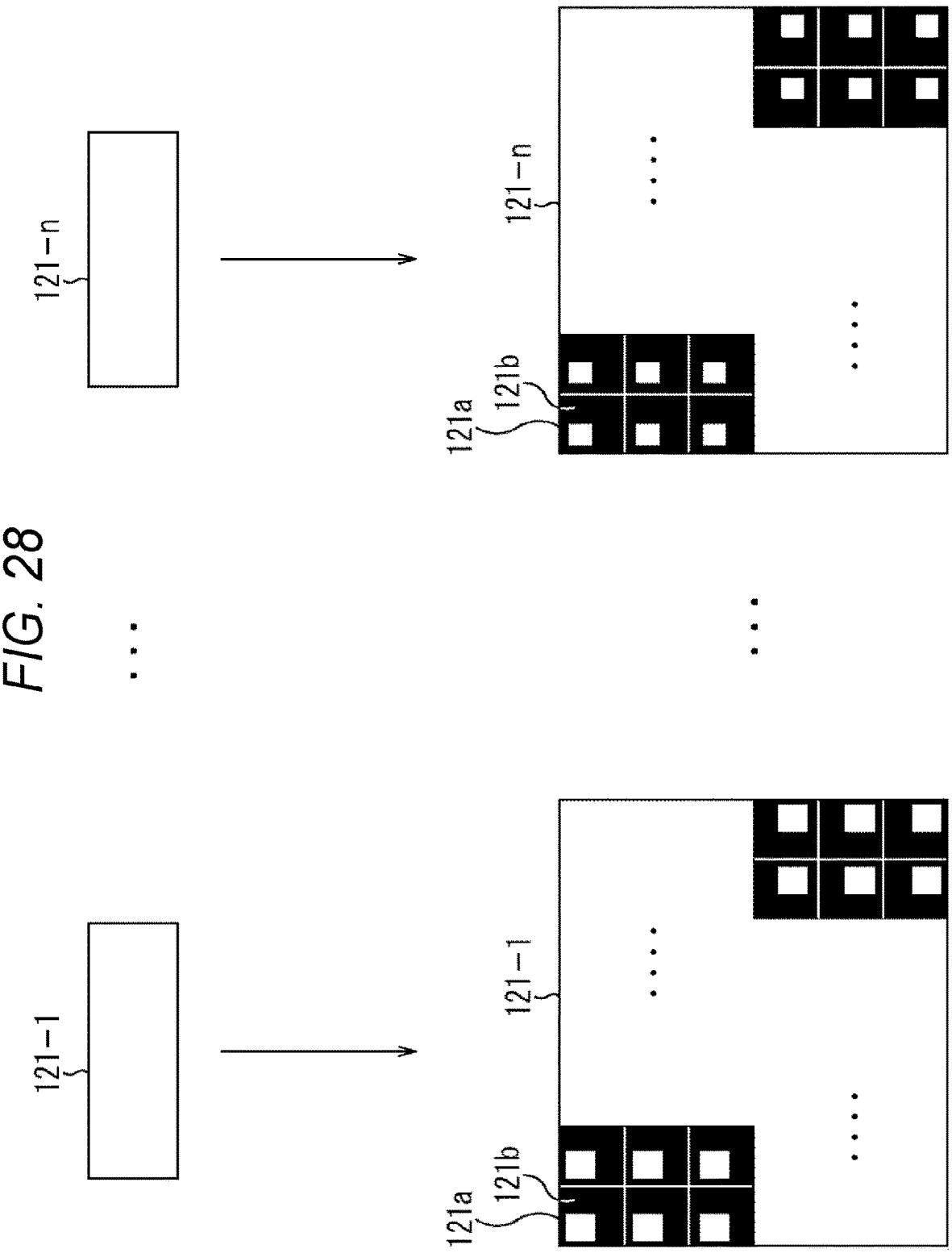
FIG. 28 is a view illustrating a configuration example of a pixel array unit of an imaging element of each imaging device in FIG. 26.

FIG. 28 illustrates an example of a pattern of a light-shielding film 121*b* in a pixel array unit of imaging elements 121-1 to 121-*n* of imaging devices 321-1 to 321-*n*, respectively.

In this example, in each pixel 121*a*, the light-shielding film 121*b* is arranged so as to surround four sides, and a rectangular opening is provided in the pixel 121*a*. The opening is set to have the same size in all the pixels 121*a* in the same imaging element 121, and is set to have different sizes between the pixels 121*a* of different imaging elements 121. Furthermore, positions of the openings of the respective pixels 121*a* in the same imaging element 121 are all different. Accordingly, at least one of the size or position of the openings is different among all the pixels 121*a* of the imaging elements 121-1 to 121-*n*, and the incident angle directivities of all the pixels 121*a* are different from each other. Then, imaging is performed by a plurality of imaging devices 321 having the different incident angle directivities. Therefore, the number of equations forming simultaneous equations used to restore the restored image may be increased, and as a result, the number of pixels of the restored image may be increased, so that resolution of the restored image is improved.

Note that, the incident angle directivities of all the pixels 121*a* are not necessarily different, and some of them may be the same. However, as the number of pixels 121*a* with the same incident angle directivity is smaller, the number of equations forming the simultaneous equations used to restore the restored image may be increased, and the number of pixels of the restored image may be increased, and as a result, the resolution of the restored image is improved.

<Configuration Example of Signal Processing Device 312>

Figure 29:
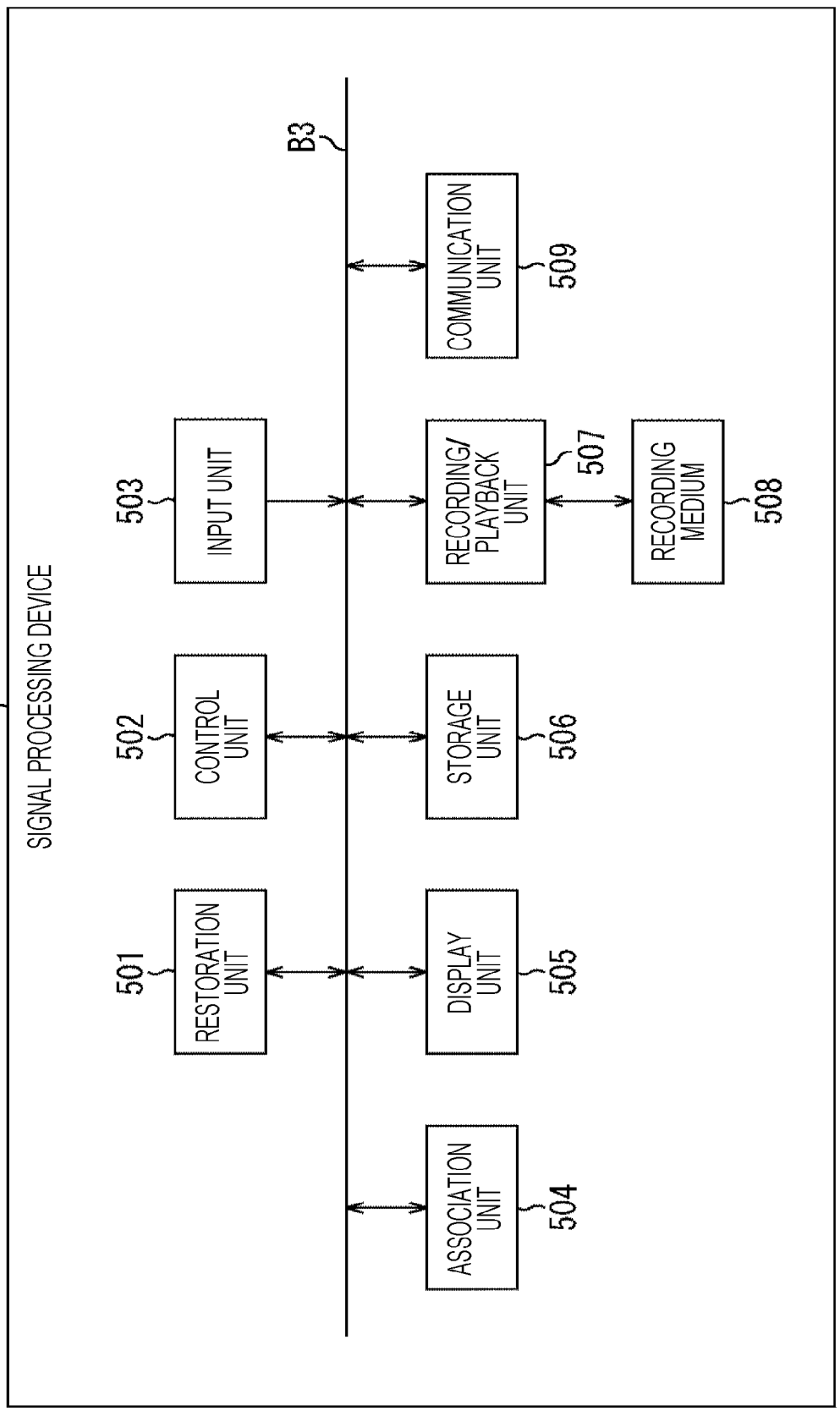
FIG. 29 is a view illustrating a configuration example of a signal processing device in FIG. 26.

FIG. 29 is a block diagram illustrating a configuration example of the signal processing device 312 in FIG. 26. The signal processing device 312 includes a restoration unit 501, a control unit 502, an input unit 503, an association unit 504, a display unit 505, a storage unit 506, a recording/playback unit 507, a recording medium 508, and a communication unit 509.

The restoration unit 501, the control unit 502, the input unit 503, the display unit 505, the storage unit 506, the recording/playback unit 507, and the communication unit 509 are connected to one another via a bus B3, and perform transmission, reception and the like of data via the bus B3. Note that, hereinafter, in order to simplify the description, description of the bus B3 in a case where each unit of the signal processing device 312 performs the transmission, reception and the like of the data via the bus B3 is omitted.

The restoration unit 501 performs the restoration processing and the like of the restored image by processing similar to that of the restoration unit 122 of the imaging device 101 in FIG. 2 by using the detection signal set included in the image file received from each imaging device 321. The restoration unit 501 outputs the restored image to the bus B3.

The control unit 502 includes, for example, various processors and controls each unit of the signal processing device 312.

The input unit 503 includes an input device (for example, a key, a switch, a button, a dial, a touch panel, a remote controller and the like) for operating the signal processing device 312, inputting data used for processing and the like. The input unit 503 outputs an operation signal, the input data and the like to the bus B3.

The association unit 504 associates the detection signal set obtained from each imaging device 321 with the metadata corresponding to each detection signal set in cooperation with the association unit 413 of the imaging device 321 or alone.

The display unit 505 includes a display, for example, and displays various types of information (for example, the restored image and the like). Note that, the display unit 505 may include an audio output unit such as a speaker to output audio.

The storage unit 506 includes one or more storage devices such as a ROM, a RAM, and a flash memory, and stores, for example, programs and data used for processing of the signal processing device 312.

For example, the storage unit 506 stores installation information regarding an installation state of each imaging device 321. The installation information includes, for example, information regarding a position and orientation of a light-receiving surface of the imaging element 121 of each imaging device 321.

Note that, for example, the installation information is created when the imaging device 321 is installed and the like, and stored in the storage unit 506. Alternatively, for example, each imaging device 321 may detect its own installation state using a position sensor such as a global navigation satellite system (GNSS), an orientation sensor and the like and transmit a detection result to the signal processing device 312, and the signal processing device 312 may generate the installation information on the basis of the information received from each imaging device 321. Alternatively, for example, the signal processing device 312 or another device may detect the installation state of each imaging device 321 on the basis of an image obtained by imaging each imaging device 321 and the like, and generate the installation information on the basis of a detection result.

Furthermore, the storage unit 506 stores, for example, a coefficient set group corresponding to each imaging element 121 of each imaging device 321. Note that, a method of setting the coefficient corresponding to each imaging element 121 of each imaging device 321 is described later with reference to FIGS. 30 to 33.

The recording/playback unit 507 records the data on the recording medium 508 and plays back (reads out) the data recorded on the recording medium 508. For example, the recording/playback unit 507 records the restored image on the recording medium 508 or reads out the same from the recording medium 508. Furthermore, for example, the recording/playback unit 507 records the detection signal set and the corresponding metadata on the recording medium 508 or reads out the same from the recording medium 508.

The recording medium 508 includes, for example, any one of a HDD, an SSD, a magnetic disk, an optical disk, a magneto-optical disk, a semiconductor memory or the like, a combination thereof or the like.

The communication unit 509 communicates with another device (for example, each imaging device 321 and the like) by a predetermined communication method. Note that, the communication method of the communication unit 509 may be wired or wireless. Furthermore, the communication unit 509 may support a plurality of communication methods.

<Method of Setting Coefficient Corresponding to Each Imaging Element 121 of Each Imaging Device 321>

Next, with reference to FIGS. 30 to 33, the method of setting the coefficient corresponding to each imaging element 121 of each imaging device 321 is described.

Figure 30:
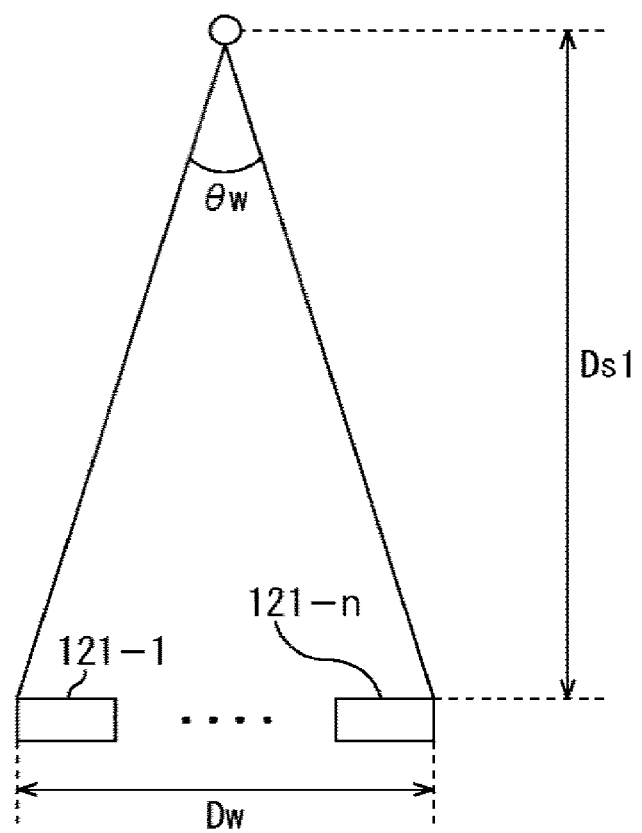
FIG. 30 is a view for illustrating an example of definition of infinity.

Here, first, an example of definition of infinity is described with reference to FIG. 30.

In this example, the imaging elements 121-1 to 121-n are arranged such that the light-receiving surfaces thereof are arranged in the same straight line in the same plane. Furthermore, a point light source P of the subject is present at a position away from the center of a column of the light-receiving surfaces of the respective imaging elements 121 by a distance Ds1. Note that, hereinafter, a distance from a left end of the light-receiving surface of the imaging element 121-1 to a right end of the light-receiving surface of the imaging element 121-n in the drawing is set to Dw.

In this case, an angle θw indicating a range of incident light incident on each imaging element 121 out of the incident light emitted from the point light source P is expressed by following equation (9).

$$\theta w = 2 \times a\, \tan(Dw/2Ds1) \quad (9)$$

Here, assuming that the number of pixels of the restored image to be restored using the detection signal of the pixel 121a of each imaging element 121 is 1,000 pixels vertically×1,000 pixels horizontally, and an angle of view of the restored image is ±20 degrees, angular resolution between the adjacent pixels of the restored image is 0.04 degrees. In this case, the distance Ds1 at which the angle θw in equation (9) is 0.04 degrees which is the angular resolution between the adjacent pixels of the restored image or smaller may be regarded as infinity.

Therefore, if the angular resolution between the pixels of the restored image is set to θr, the point light source P may be regarded to be present at infinity if following equation (10) is satisfied.

$$\theta r \geq 2 \times a\, \tan(Dw/2Ds1) \quad (10)$$

When equation (10) is solved for the distance Ds1, following equation (11) is obtained.

$$Ds1 \geq Dw/(2 \times \tan(\theta r/2)) \quad (11)$$

Furthermore, in a case where the subject is present at infinity, the incident light from each point light source of the subject may be regarded as parallel light, and the incident angle of the incident light from each point light source on each pixel 121a of each imaging element 121 is the same.

Figure 31:
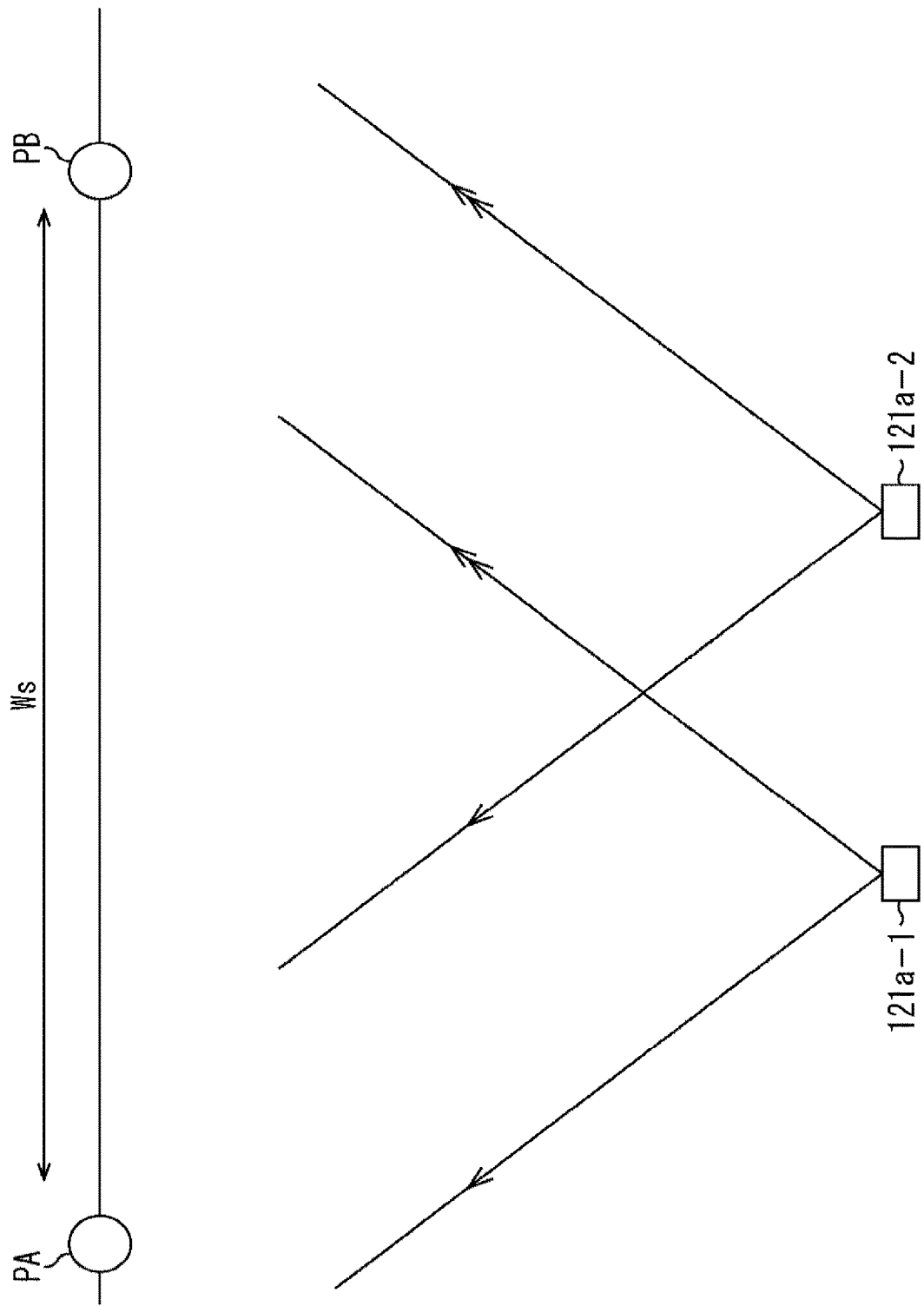
FIG. 31 is a view illustrating an example of an incident angle of incident light from a point light source present at infinity.

For example, as illustrated in FIG. 31, the incident light from a point light source PA present at infinity with respect to the pixel 121a-1 and the pixel 121a-2 located at distant positions may be regarded as parallel light, and the incident angle is the same on the pixels 121a-1 and 121a-2. Similarly, the incident light from a point light source PB present at infinity with respect to the pixel 121a-1 and the pixel 121a-2 may be regarded as parallel light, and the incident angle is the same on the pixels 121a-1 and 121a-2.

Therefore, the incident angle of the incident light from each point light source of the subject present at infinity does not change depending on the position of (the imaging element 121 of) each imaging device 321.

Note that, a range Ws (angle of view) between the point light source PA and the point light source PB the incident light from which the pixel 121a-1 and the pixel 121a-2 may receive is determined by a light-shielding range of each pixel 121a and the like as described above with reference to FIG. 15.

Figure 32:
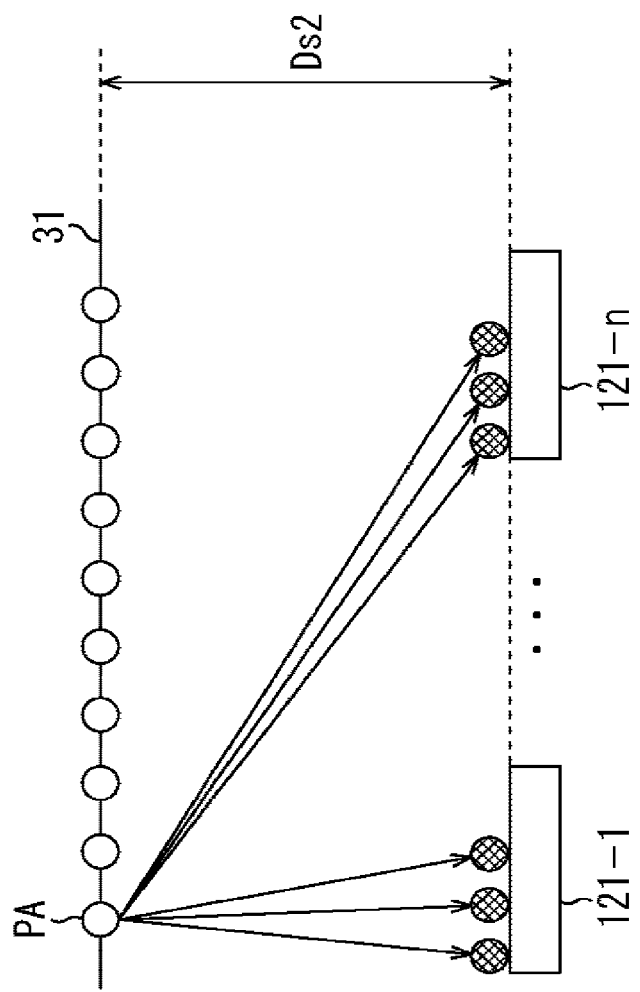
FIG. 32 is a view illustrating an example of the incident angle of the incident light from the point light source present at a distance closer than infinity.

In contrast, as illustrated in FIG. 32, the incident angle of the incident light from the point light source PA on a subject surface 31 present at a distance closer than infinity (distance less than infinity) is different depending on the position of the imaging element 121 of each imaging device 321. More precisely, the incident angle of the incident light from the point light source PA differs depending on the position of each pixel 121a of each imaging element 121. Specifically, an incident angle θ1 of the incident light incident on each pixel 121a from the point light source PA is expressed by following equation (12).

$$\theta 1 = a\, \tan((Xa-Xp)/Ds2) \quad (12)$$

Here, Ds2 represents a distance between the subject surface 31 and the light-receiving surface of each imaging element 121. Xa represents the position of the point light source PA on the subject surface 31, Xp represents the position of the pixel 121a on a plane parallel to the subject surface 31, and Xa-Xp represents a distance between the point light source PA and the pixel 121a in a direction parallel to the subject surface 31.

Furthermore, in FIG. 32 and FIG. 33 described later, white circles on the subject surface 31 schematically indicate the positions of the point light sources, and shaded circles on the light-receiving surfaces of the imaging element 121-1 and the imaging element 121-n schematically indicate the positions of the pixels 121a.

As expressed in equation (12), the incident angle θ1 varies depending on the subject distance Ds2 and relative positions (Xa-Xp) between the point light source PA and the pixel 121a. Therefore, the incident angle from each point light source of the subject present at the distance closer than infinity varies depending on the subject distance and the position (of the imaging element 121) of the imaging device 321.

Furthermore, in a case where the subject is present at infinity and in a case where this is present at the distance closer than infinity, the incident angle of the incident light from the subject varies depending on the orientation of the imaging device 321, more precisely, the orientation of the light-receiving surface of the imaging element 121 of the imaging device 321 with respect to the subject.

Figure 33:
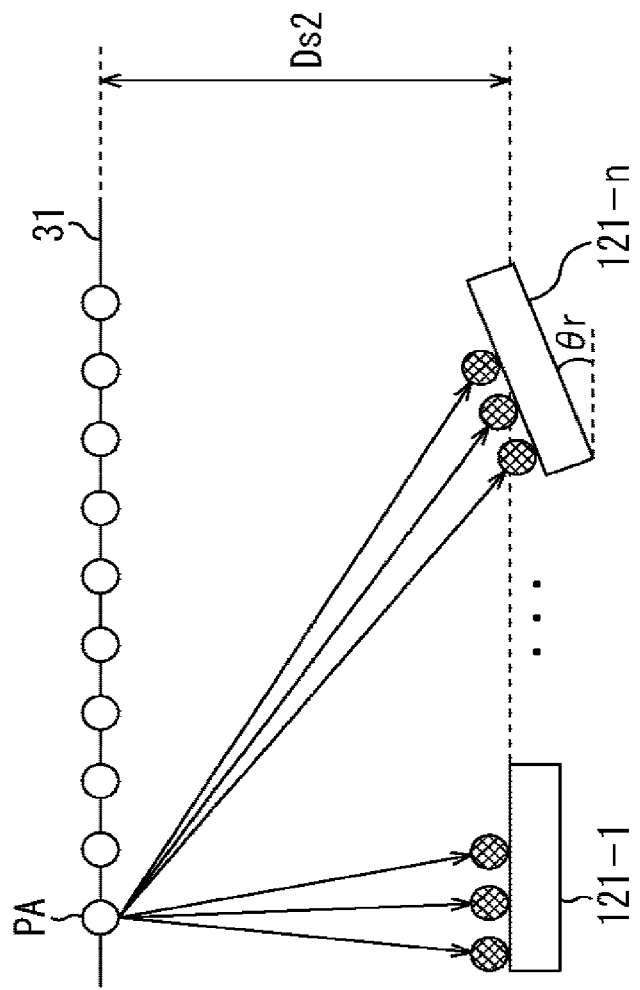
FIG. 33 is a view illustrating an example of the incident angle of the incident light in a case where orientation of the imaging element changes.

For example, as illustrated in FIG. 33, in a case where the orientation of the light-receiving surface of the imaging element 121-n is inclined by the angle θr with respect to the subject surface 31, the incident angle θ2 of the incident light from the point light source PA on each pixel 121a of the imaging element 121-n is expressed by following equation (13).

$$\theta 2 = a\, \tan((Xa-Xp)/Ds2) + \theta r \quad (13)$$

That is, the incident angle θ2 is an angle obtained by adding the inclination θr of the light-receiving surface of the imaging element 121-*n* with respect to the subject surface 31 to the incident angle θ1 of equation (12). This is similar also in a case where the subject is present at infinity.

As described above, the coefficient set group corresponding to each imaging element 121 of each imaging device 321 with respect to the subject present at infinity varies depending on the orientation of the light-receiving surface of the imaging element 121 with respect to the subject surface to be restored. In contrast, the coefficient set group corresponding to each imaging element 121 of each imaging device 321 with respect to the subject present at the distance closer from infinity varies depending on the subject distance from the subject surface to be restored and the position and orientation of the light-receiving surface of each imaging element 121.

Therefore, in a case where the position and orientation of each imaging device 321 are fixed, the coefficient set group corresponding to each imaging element 121 of each imaging device 321 is set for each combination of the subject distance of the subject surface to be restored and the orientation of the subject surface (hereinafter, referred to as a subject direction). Then, for example, the coefficient set group corresponding to each imaging element 121 is prepared for each combination of the subject distance and subject direction to be stored in the storage unit 506.

Note that, hereinafter, a case where the position and orientation of each imaging device 321 are fixed is described, and a case where the position and orientation of each imaging device 321 are variable is described later.

<Processing of Imaging System 301>

Next, processing of the imaging system 301 is described with reference to FIGS. 34 and 35.

<Processing of Signal Processing Device 312>

First, processing of the signal processing device 312 is described with reference to a flowchart in FIG. 34.

At step S101, the signal processing device 312 transmits an imaging command. Specifically, the control unit 502 generates the imaging command and transmits the same to each imaging device 321 via the communication unit 509.

Each imaging device 321 receives the imaging command at step S151 in FIG. 35 to be described later and transmits the image file at step S153.

Note that, each image file includes, for example, the ID for identifying each imaging device 321 and the detection signal set obtained by the imaging element 121 of each imaging device 321.

At step S102, the communication unit 509 receives the image file transmitted from each imaging device 321. The communication unit 509 supplies the received image file to the restoration unit 501.

At step S103, the restoration unit 501 obtains a coefficient used for image restoration. Specifically, the restoration unit 501 sets a combination of the distance to the subject surface 31 to be restored (subject distance) and orientation (subject direction). Note that, an arbitrary method may be adopted as a method of setting the combination of the subject distance and subject direction. For example, the restoration unit 501 sets the subject distance and subject direction input by a user via the input unit 503 as the combination of the subject distance and subject direction of the subject surface 31 to be restored.

Next, the restoration unit 501 reads out the coefficient set group associated with the set combination of the subject distance and subject direction from the storage unit 506.

At step S104, the restoration unit 501 restores one image using the detection signal set and the coefficient. That is, the restoration unit 501 restores one restored image by using one simultaneous equation using a plurality of detection signal sets included in the image file received from each imaging device 321 and the coefficient set group obtained in the processing at step S103 by the processing similar to that by the restoration unit 122 of the imaging device 101 at step S3 in FIG. 20.

At step S105, the signal processing device 312 performs various types of processing on the restored image. That is, the signal processing device 312 performs various types of processing on the restored image by the processing similar to that of the imaging device 101 at step S4 in FIG. 20.

Thereafter, the processing of the signal processing device 312 ends.

Figure 34:
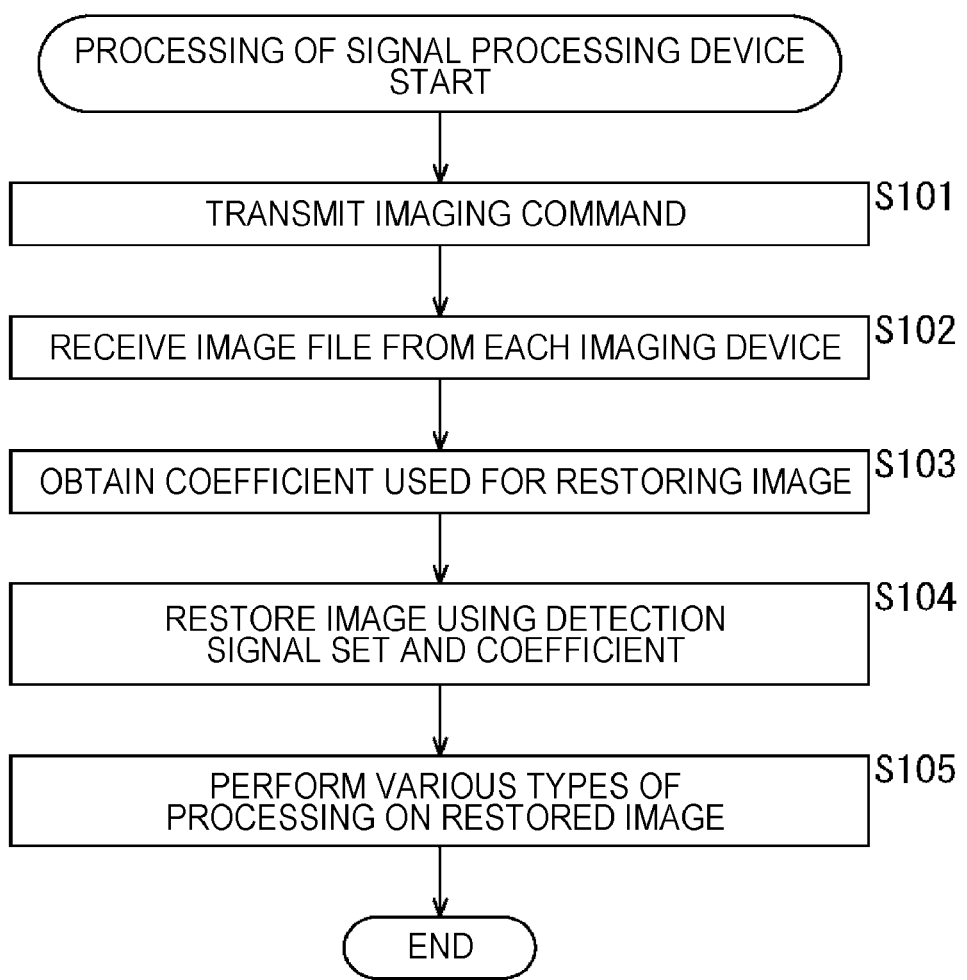
FIG. 34 is a flowchart for illustrating processing executed by the signal processing device in FIG. 26.
Figure 35:
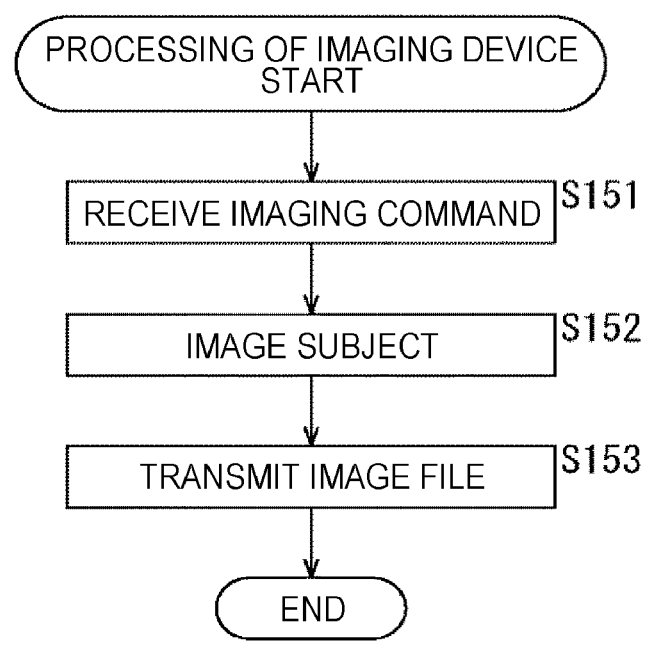
FIG. 35 is a flowchart for illustrating processing executed by the imaging device in FIG. 26.

Next, with reference to a flowchart in FIG. 35, processing executed by each imaging device 321 corresponding to the processing of the signal processing device 312 in FIG. 34 is described.

At step S151, the communication unit 415 receives the imaging command transmitted from the signal processing device 312 at step S101 in FIG. 34. The communication unit 415 supplies the received imaging command to the control unit 411.

At step S152, the imaging element 121 images the subject as in the processing at step S1 in FIG. 20. The imaging element 121 supplies the detection signal set including the detection signals of the respective pixels 121*a* to the association unit 413.

At step S153, the imaging device 321 transmits the image file. For example, the association unit 413 generates the image file including the ID of the imaging device 321 and the detection signal set obtained from the imaging element 121. Therefore, the detection signal set and the ID of the imaging device 321 are associated with each other. The association unit 413 transmits the generated image file to the signal processing device 312 via the communication unit 415.

Thereafter, the processing of the imaging device 321 ends.

In the above-described manner, it is possible to image by a plurality of imaging devices 321 in a shared manner, and restore the restored image using the detection signal set obtained by each imaging device 321.

As a result, it is possible to increase the number of pixels of the restored image and to improve an image quality of the restored image, more specifically, resolution of the restored image as compared with a case where imaging is performed by only one imaging device 321.

Furthermore, the number of pixels of each imaging element 121 of each imaging device 321 may be reduced to reduce a size. Alternatively, for example, by increasing the number of imaging devices 321 without increasing the number of pixels of each imaging element 121 of each imaging device 321, it is possible to increase the number of pixels of the restored image. Therefore, for example, introduction of a new manufacturing device and the like associated with an increase in size of the imaging element 121 is not required, and a manufacturing cost may be reduced. Furthermore, each imaging device 321 may be made compact, a degree of freedom of arrangement of each imaging device 321 is improved, and an application range of the imaging device 321 may be expanded in the field of Internet of things (IoT) and the like, for example.

Note that, for example, it is possible to further prepare the coefficient set group corresponding to the angle of view of the restored image as described above in addition to the subject distance and the subject direction and restore the restored image by further using the coefficient set group according to the angle of view.

4. Variation

Hereinafter, a variation of the embodiments of the present disclosure described above is described.

<Variation Regarding Pattern of Light-Shielding Film 121b of Each Imaging Element 121>

Figure 36:
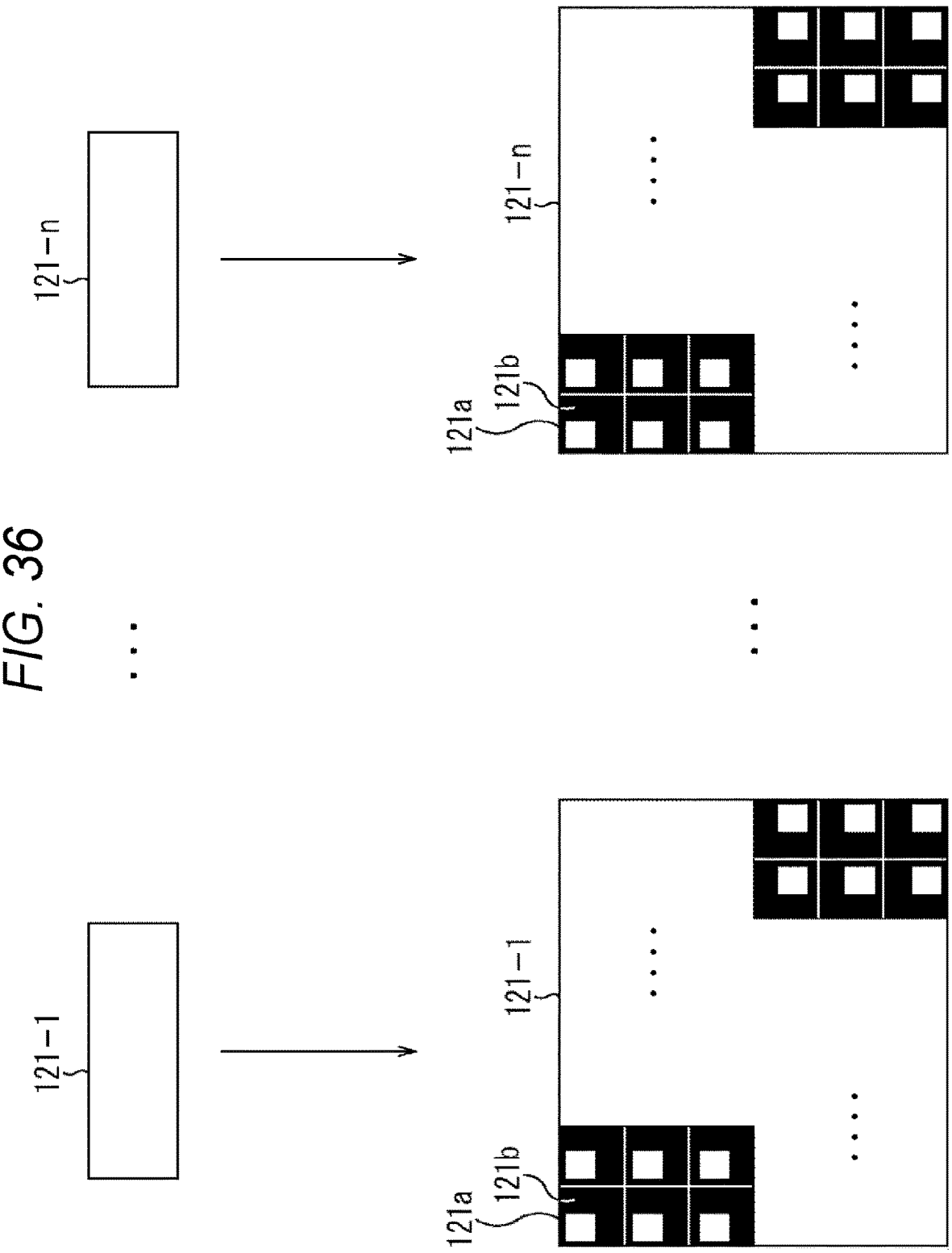
FIG. 36 is a view illustrating a variation of the pixel array unit of the imaging element of each imaging device in FIG. 26.

Although the example in which the pattern of the light-shielding film 121b of the imaging element 121 of each imaging device 321 is different is illustrated in FIG. 28, for example, as illustrated in FIG. 36, it is also possible to use the same imaging element 121 for each imaging device 321 to make the pattern of the light-shielding film 121b of each imaging element 121 the same. In this case, imaging is performed by a plurality of imaging devices 321 having the same incident angle directivity.

In this case, the coefficient set group corresponding to each of all the imaging elements 121 is the same for a subject present at infinity. Therefore, equations forming simultaneous equations used to restore a restored image overlap, and the number of equations cannot be increased, so that it is not possible to increase the number of pixels of the restored image. However, it is assumed that a detection signal level is different between pixels 121a at the same position of each imaging element 121 due to an effect of noise and the like. As a result, in equations corresponding to the pixels 121a at the same position of each imaging element 121 (for example, equations (1) to (6) described above), even if right sides overlap, a detection signal levels on left sides are different. Then, by solving the simultaneous equations using the equations in which the right sides overlap, it is possible to inhibit variation in the detection signal level of each pixel 121a due to noise and the like. As a result, noise tolerance of the restored image is improved and the image quality is improved.

On the other hand, as for the subject present at a distance closer than infinity, an incident angle of incident light from the subject on each imaging element 121 is different, so that the coefficient set group corresponding to each imaging element 121 is different. Therefore, the number of equations forming the simultaneous equations used to restore the restored image increases, so that it is possible to increase the number of pixels of the restored image.

Note that, for example, the incident angle directivity of some of the imaging elements 121 out of a plurality of imaging elements 121 may be made the same, and some of the imaging elements 121 may have different incident angle directivities.

<Variation Regarding Coefficient>

Furthermore, for example, in a case where a position and orientation of each imaging device 321 are variable, as described above with reference to FIGS. 32 and 33, the coefficient set group corresponding to each imaging element 121 vary depending on the position and orientation of the imaging device 321, more precisely, a position and orientation of a light-receiving surface of the imaging element 121 of the imaging device 321 in addition to the subject distance and subject direction. Therefore, in a case where the position and orientation of each imaging device 321 are variable, for example, it is possible to prepare the coefficient set group corresponding to each imaging element 121 for each combination of a subject distance and a subject direction, and the position and orientation of the imaging element 121 of each imaging device 321. Then, for example, a restoration unit 501 may read out the coefficient set group corresponding to the imaging element 121 of each imaging device 321 from a storage unit 506 on the basis of the set subject distance and subject direction, and the position and orientation of the imaging element 121 of each imaging device 321, and restore the restored image using the read coefficient set group.

Alternatively, for example, it is possible that the restoration unit 501 calculates the coefficient corresponding to each pixel 121a of the imaging element 121 of the imaging device 321 by using the characteristics of the weights Wx and Wy described above with reference to FIG. 9 and the like on the basis of the subject distance and subject direction, and the position and orientation of the imaging element 121 of each imaging device 321 without preparing in advance the coefficient set group for each combination described above.

Note that, for example, each imaging device 321 may detect an installation state including the position and orientation at the time of imaging of each imaging device 321 and include metadata including a detection result in an image file to transmit to a signal processing device 312. Alternatively, for example, the signal processing device 312 or another device may detect the installation state of each imaging device 321 on the basis of an image obtained by imaging each imaging device 321 and the like.

Furthermore, for example, in a case where the subject distance, subject direction, and an angle of view at the time of restoration are determined, each imaging device 321 may include the metadata including the coefficient set group corresponding to the subject distance, subject direction, and angle of view in the image file to transmit to the signal processing device 312.

<Variation Regarding System Configuration>

Next, a variation regarding a system configuration is described with reference to FIGS. 37 to 39.

Figure 37:
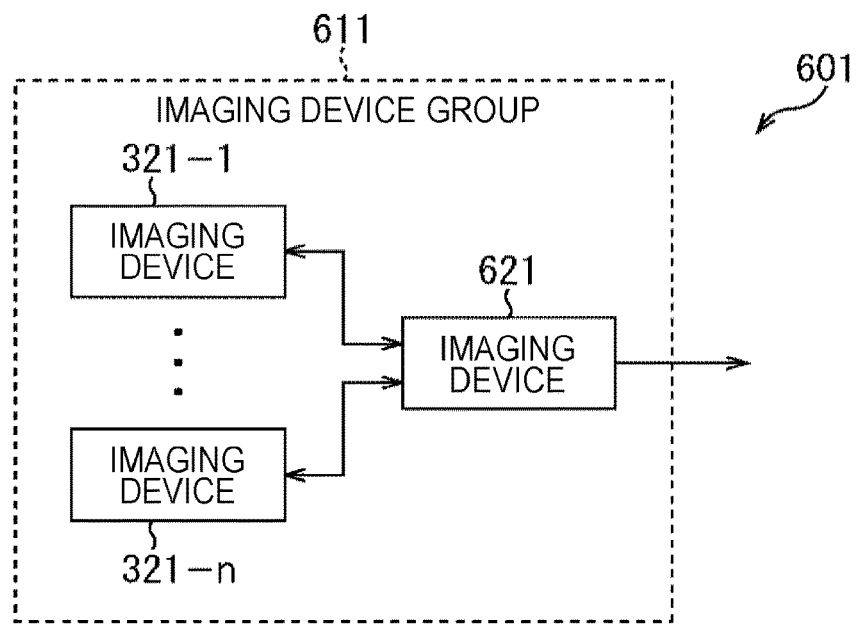
FIG. 37 is a block diagram illustrating a first variation of an imaging system to which the technology of the present disclosure is applied.

FIG. 37 illustrates a configuration example of an imaging system 601 that is a first variation of an imaging system. Note that, in the drawing, a portion corresponding to that of the imaging system 301 in FIG. 26 is assigned with the same reference sign, and the description thereof is omitted as appropriate.

The imaging system 601 is different from the imaging system 301 in FIG. 26 in that an imaging device group 611 is provided in place of the imaging device group 311 and the signal processing device 312 is deleted. The imaging device group 611 is different from the imaging device group 311 in that an imaging device 621 is added.

The imaging device 621 has a configuration similar to that of the imaging device 101 in FIG. 2, for example. Then, the imaging device 621 transmits the imaging command to each imaging device 321 as is the case with the signal processing device 312 in FIG. 26 to control imaging of the subject by each imaging device 321 and images the subject by itself, too. Then, the imaging device 621 receives the image file from each imaging device 321 and restores one restored image by using the detection signal set included in the received image file and the detection signal set obtained by imaging by itself.

Note that, in the imaging system 601, the number of imaging devices 321 may be one.

Figure 38:
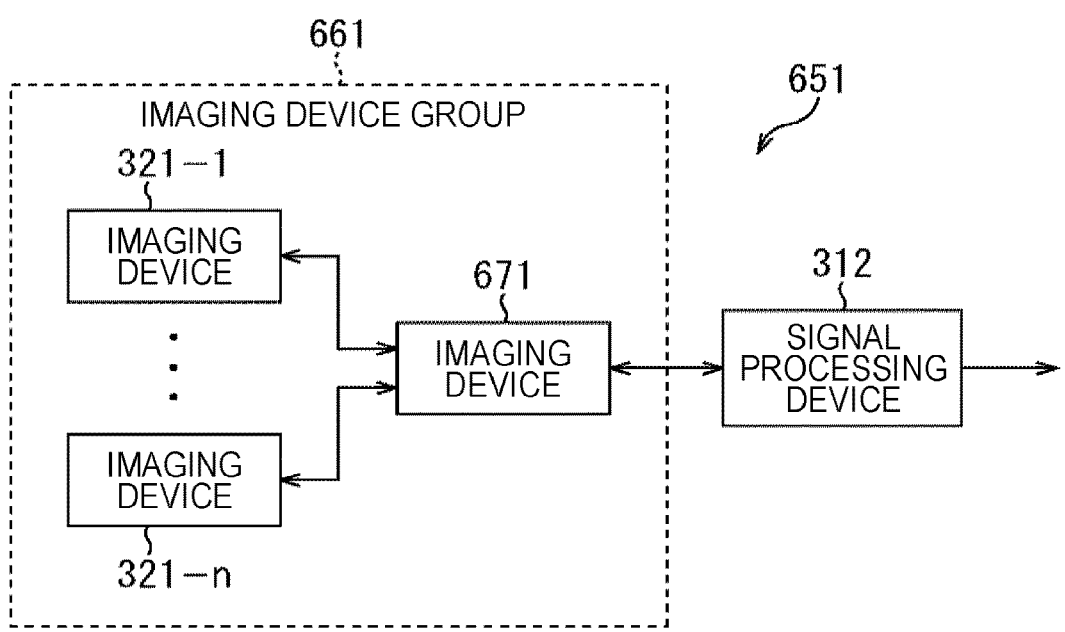
FIG. 38 is a block diagram illustrating a second variation of an imaging system to which the technology of the present disclosure is applied.

FIG. 38 illustrates a configuration example of an imaging system 651 that is a second variation of the imaging system. Note that, in the drawing, a portion corresponding to that of the imaging system 301 in FIG. 26 is assigned with the same reference sign, and the description thereof is omitted as appropriate.

The imaging system 651 is different from the imaging system 301 in FIG. 26 in that an imaging device group 661 is provided in place of the imaging device group 311. The imaging device group 661 is different from the imaging device group 311 in that an imaging device 671 is added.

The imaging device 671 has a configuration similar to that of the imaging device 321 in FIG. 27, for example. Then, the imaging device 671 transmits the imaging command to each imaging device 321 as is the case with the signal processing device 312 in FIG. 26 to control imaging of the subject by each imaging device 321, and images the subject by itself, too. Then, the imaging device 621 receives the image file from each imaging device 321 and transmits the image file received from each imaging device 321 and the image file including the detection signal set obtained by imaging by itself to the signal processing device 312. That is, the imaging device 621 plays a role of relaying the image file from each imaging device 321 to the signal processing device 312.

The signal processing device 312 restores the restored image using the detection signal data included in each received image file.

Note that, in the imaging system 651, the number of imaging devices 321 may be one.

Furthermore, in the above description, the example in which each imaging device 321 images in synchronization according to an external command in the imaging system 301, the imaging system 601, and the imaging system 651 is described; however, it is also possible that the respective imaging devices 321 communicate with each other to image in synchronization or each imaging device 321 separately image out of synchronization, for example.

Moreover, in the above description, the example in which the respective imaging elements 121 are provided in different imaging devices is described; however, for example, a plurality of imaging elements 121 may be provided in one imaging device.

Figure 39:
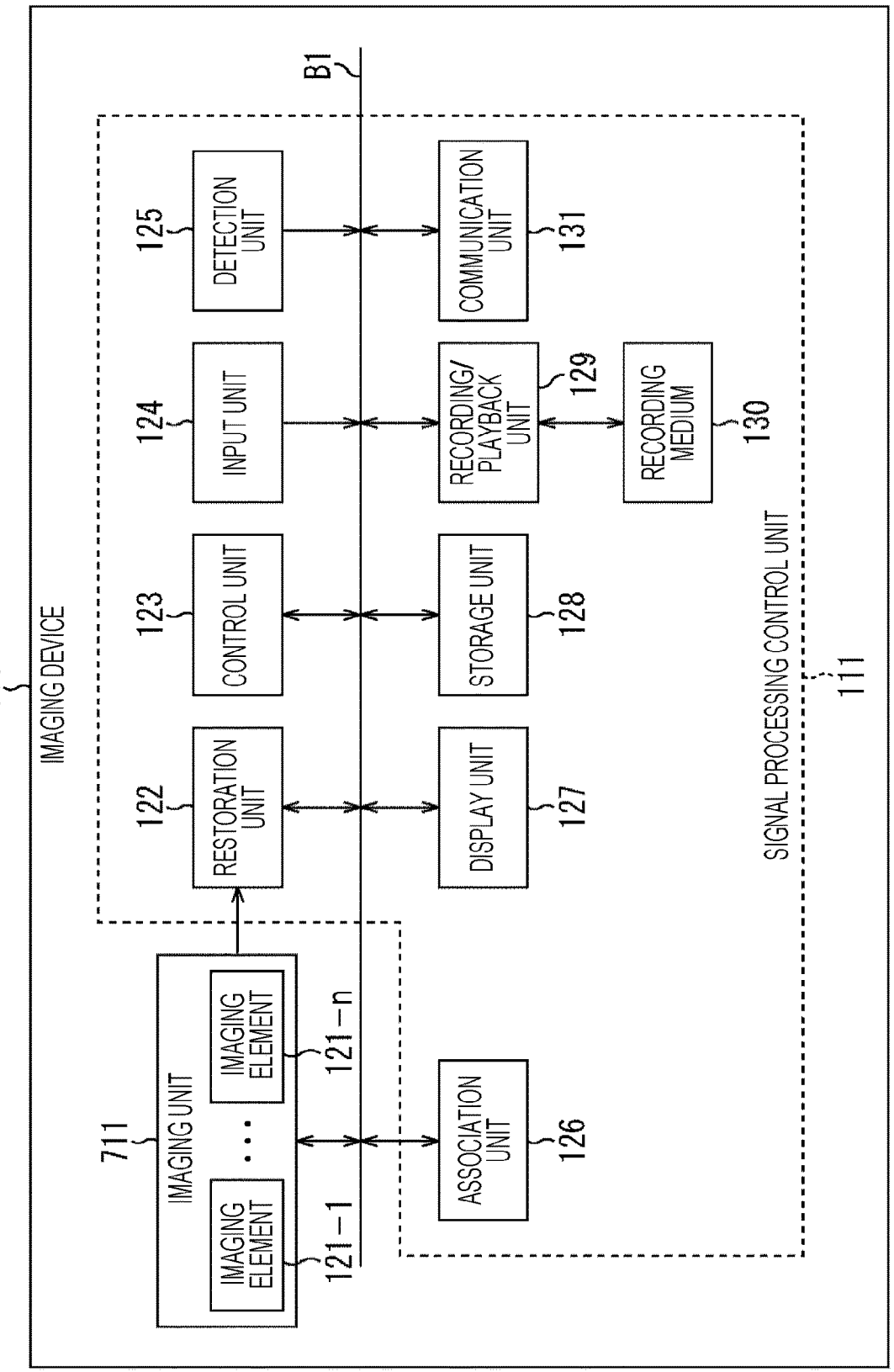
FIG. 39 is a block diagram illustrating a variation of an imaging device to which the technology of the present disclosure is applied.

FIG. 39 illustrates a configuration example of an imaging device 701 provided with a plurality of imaging elements 121. Note that, in the drawing, a portion corresponding to that of the imaging device 101 in FIG. 2 is assigned with the same reference sign, and the description thereof is omitted as appropriate.

The imaging device 701 is different from the imaging device 101 in FIG. 2 in including an imaging unit 711 including two or more n imaging elements 121-1 to 121-$n$.

Each imaging element 121 supplies the detection signal set obtained by imaging the subject to the restoration unit 122 or outputs the same to a bus B1.

The restoration unit 122 restores the restored image using the detection signal set obtained from each imaging element 121.

Note that, each imaging element 121 is installed in a casing of the imaging device 701.

Furthermore, for example, the imaging devices 321-1 to 321-$n$ in FIG. 26, FIG. 37, or FIG. 38, the imaging device 621 in FIG. 37, and the imaging device 671 in FIG. 38 may be provided with a plurality of imaging elements 121.

Moreover, although the example of restoring the restored image using a plurality of detection signal sets obtained by imaging using a plurality of imaging elements 121 having different installation states is described in the description above, it is also possible, for example, to restore the restored image using a plurality of detection signal sets obtained by imaging by the same imaging element 121 in a plurality of installation states in which at least one of the position or orientation with respect to the subject is different.

For example, it is possible to restore the restored image by using a plurality of detection signal sets obtained by the imaging element 121 or the imaging device including the imaging element 121 imaging the same subject while moving.

Alternatively, for example, it is also possible to restore the restored image by using a plurality of detection signal sets obtained by the imaging element 121 or the imaging device including the imaging element 121 imaging in the same position while changing the orientation with respect to the subject.

Alternatively, for example, it is also possible to restore the restored image by using a plurality of detection signal sets obtained by the imaging element 121 or the imaging device including the imaging element 121 imaging while changing the distance from the subject.

Furthermore, it is possible that, at the time of imaging, association of each detection signal set with the metadata corresponding to each detection signal set is performed, and the restored image is restored using each detection signal set at a desired timing after imaging.

Note that, a method of associating the detection signal set with the metadata is not especially limited as long as a correspondence relationship between them may be specified. For example, by putting the detection signal set and the metadata in the same image file, assigning the same ID to the detection signal set and the metadata, or recording the detection signal set and the metadata on the same recording medium, the detection signal set and the metadata are associated with each other.

Note that, the detection signal set and the metadata may be recorded by each imaging device that images the subject, or may be recorded by the signal processing device or the imaging device that restores the image. In a case where the detection signal set and metadata are recorded by each imaging device that images the subject, for example, the recorded detection signal set and metadata are supplied to the signal processing device or imaging device that restores the image via a recording medium.

Furthermore, the metadata may include the coefficient set group used for restoration or not. In the latter case, for example, one or more of the subject distance, the subject direction, and the angle of view at the time of restoration, and the installation state of the imaging device or imaging element at the time of imaging are included in the metadata.

Moreover, for example, the user may transmit the imaging command to each imaging device 321 using a remote controller and the like.

Furthermore, for example, in a case where each imaging device 321 captures a still image of the subject that does not move, each imaging device 321 may image at an arbitrary timing without using the imaging command, or an input unit 124 of each imaging device 321 may generate the imaging command separately to supply to a control unit 123 of the same device.

<Variation Regarding Imaging Element 121>

For example, a shape other than the above-described lateral band-type, longitudinal band-type, L-shaped type, and type provided with a rectangular opening may be adopted as the shape of the light-shielding film 121*b* of each pixel 121*a*.

Furthermore, for example, in the imaging element 121 described above with reference to FIG. 5, the example in which four photodiodes 121*f* of two rows×two columns are provided in one pixel 121*a* is illustrated, but the number and arrangement of the photodiodes 121*f* are not limited to this example.

Figure 40:
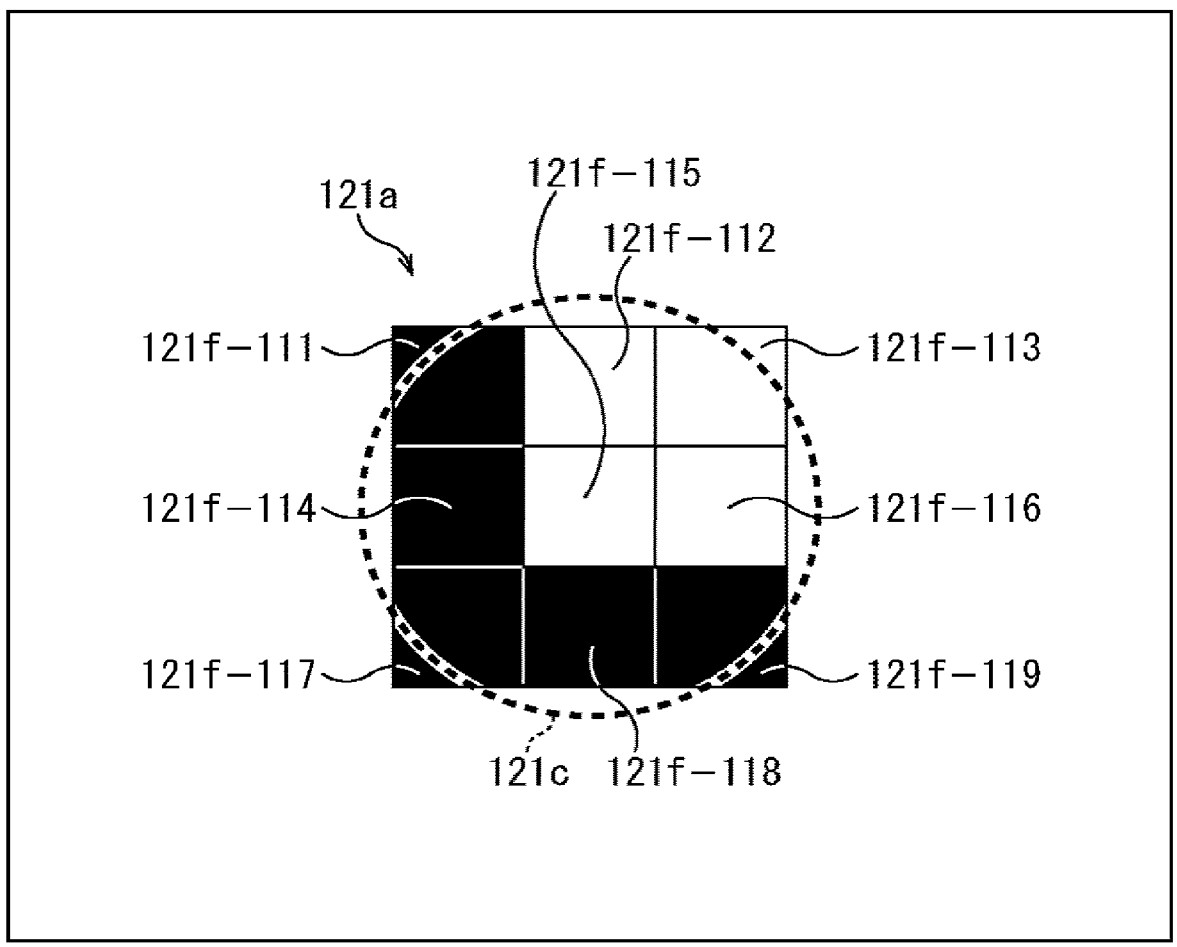
FIG. 40 is a view illustrating a variation of the imaging element in FIG. 5.

For example, as illustrated in FIG. 40, in one pixel 121*a*, nine photodiodes 121*f*-111 to 121*f*-119 arranged in three rows×three columns may be provided for one on-chip lens 121*c*. That is, one pixel output unit may include the nine photodiodes 121*f*.

Then, for example, by not reading out the signals of the five pixels of the photodiodes 121*f*-111, 121*f*-114, and 121*f*-117 to 121*f*-119, an incident angle characteristic similar to that of the pixel 121*a* including the L-shaped light-shielding film 121*b* in which the light-shielding film 121*b* is set in a range of the photodiodes 121*f*-111, 121*f*-114, and 121*f*-117 to 121*f*-119 may be substantially obtained.

In this manner, it is possible to obtain the incident angle characteristic similar to that in a case where the light-shielding film 121*b* is provided without providing the light-shielding film 121*b*. Furthermore, by switching a pattern of the photodiodes 121*f* from which no signal is read out, incident angle directivity may be changed as in a case where the position and range light-shielded by the light-shielding film 121*b* are changed.

Furthermore, in the above description, the example in which one pixel 121*a* forms one pixel output unit is illustrated; however, it is also possible that a plurality of pixels 121*a* forms one pixel output unit.

Figure 41:
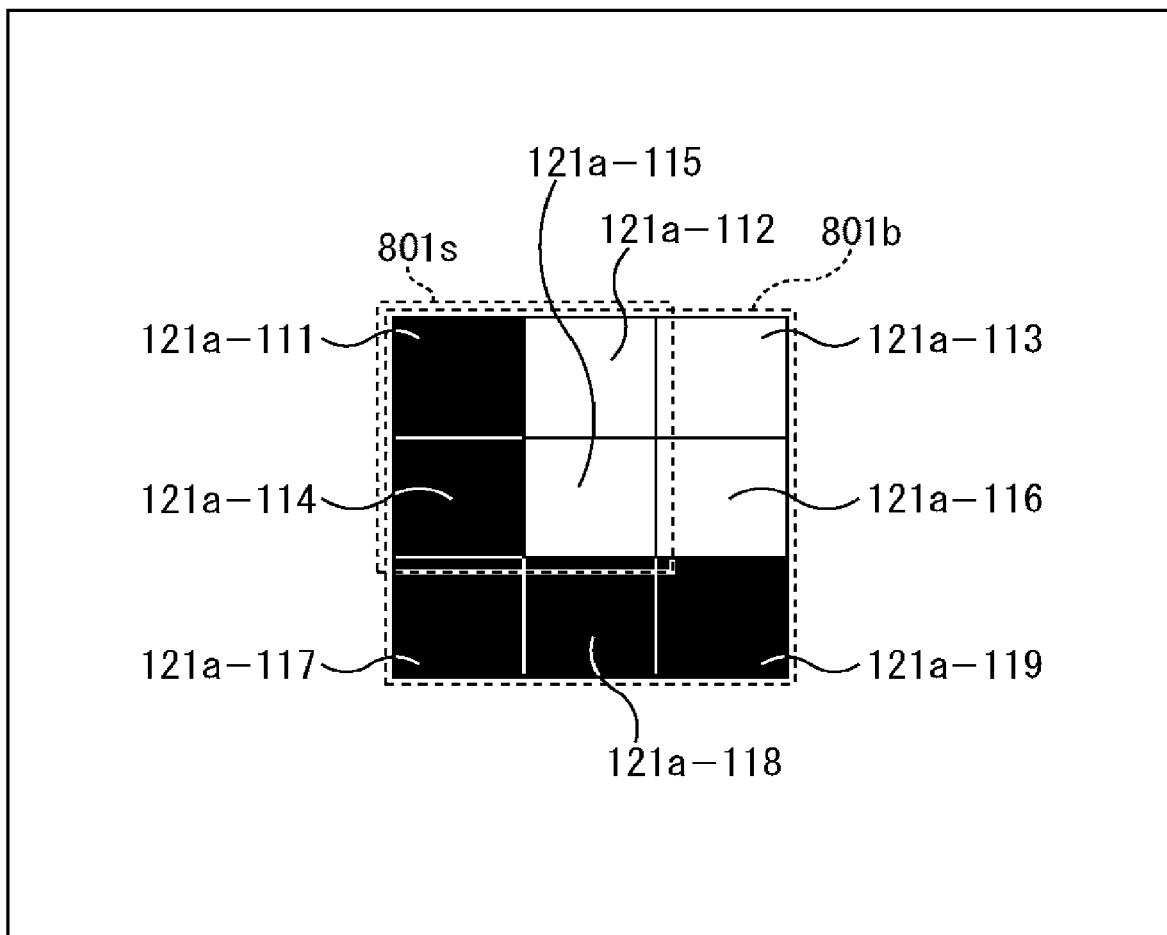
FIG. 41 is a view for illustrating a variation of a pixel output unit.

For example, as illustrated in FIG. 41, the pixels 121*a*-111 to 121*a*-119 arranged in three rows×three columns may form one pixel output unit 801*b*. Note that, each of the pixels 121*a*-111 to 121*a*-119 includes, for example, one photodiode and does not include the on-chip lens.

For example, by adding a pixel signal from each pixel 121*a*, the detection signal of one pixel of a detection image may be generated, and by stopping or not adding an output of pixel signals from some pixels 121*a*, the incident angle directivity of a pixel output unit 801*b* may be realized. For example, by adding the pixel signals of the pixels 121*a*-112, 121*a*-113, 121*a*-115, and 121*a*-116 to generate the detection signal, the incident angle directivity similar to that in a case of providing the L-shaped light-shielding film 121*b* in a range of the pixels 121*a*-111, 121*a*-114, and 121*a*-117 to 121*a*-119 may be obtained.

Furthermore, by switching the pattern of the pixel 121*a* the pixel signal of which is added to the detection signal, the incident angle directivity may be set to a different value as in a case where the position and range light-shielding by the light-shielding film 121*b* are changed.

Moreover, in this case, for example, it is possible to change the range of the pixel output unit by changing a combination of the pixels 121*a*. For example, the pixels 121*a* of two rows×two columns including the pixels 121*a*-111, 121*a*-112, 121*a*-114, and 121*a*-115 may form a pixel output unit 801*s*.

Furthermore, for example, by recording the pixel signals of all the pixels 121*a* and later setting the combination of the pixels 121*a*, it is possible to set the range of the pixel output unit later. Moreover, by selecting the pixel 121*a* the pixel signal of which is added to the detection signal out of the pixels 121*a* in the set pixel output unit, the incident angle directivity of the pixel output unit may be set later.

Figure 42:
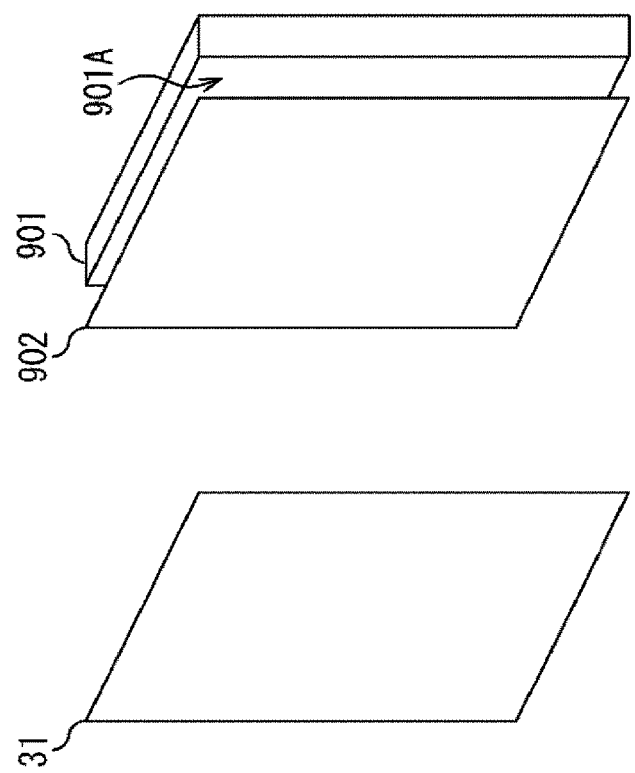
FIG. 42 is a view illustrating a variation of an imaging element.

Furthermore, although the example of providing the different incident angle directivities to the respective pixels by using the light-shielding film 121*b* as a modulation element and changing the combination of the photodiodes contributing to the output is illustrated in FIG. 4, in the present disclosure, it is also possible to provide the incident angle directivity to each pixel by using an optical filter 902 covering a light-receiving surface of an imaging element 901 as the modulation element as illustrated in FIG. 42, for example.

Specifically, the optical filter 902 is arranged so as to cover an entire surface of a light-receiving surface 901A at a predetermined interval from the light-receiving surface 901A of the imaging element 901. Light from a subject surface 31 is modulated by the optical filter 902 to be incident on the light-receiving surface 901A of the imaging element 901.

Figure 43:
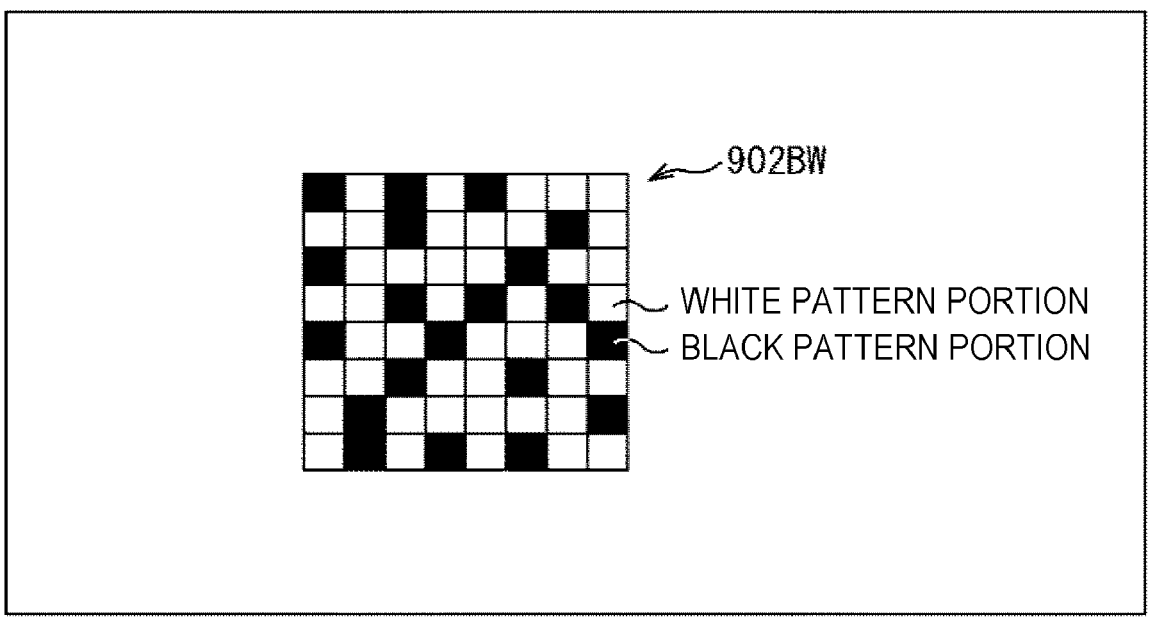
FIG. 43 is a view illustrating a variation of the imaging element.

For example, as the optical filter 902, an optical filter 902BW having a black and white lattice pattern illustrated in FIG. 43 may be used. In the optical filter 902BW, a white pattern portion that transmits light and a black pattern portion that blocks light are randomly arranged. A size of each pattern is set independently of a pixel size of the imaging element 901.

Figure 44:
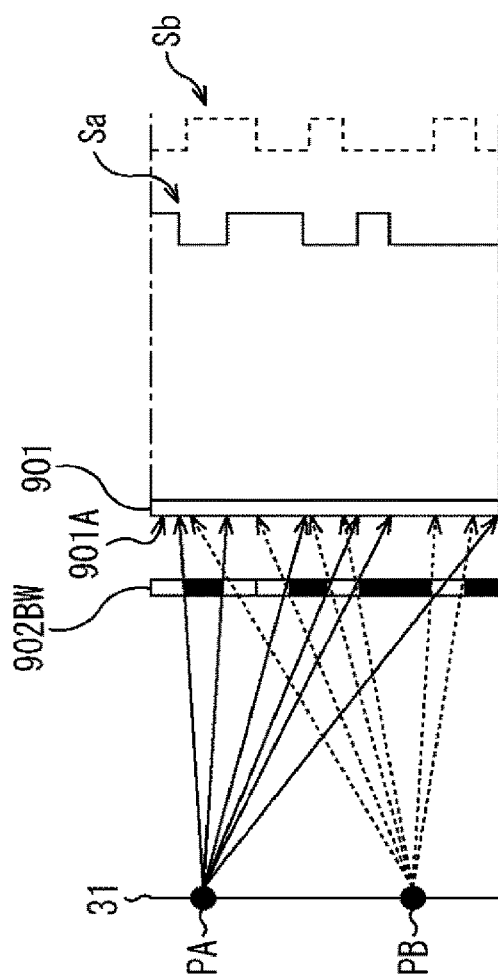
FIG. 44 is a view illustrating a variation of the imaging element.

FIG. 44 illustrates a light-receiving sensitivity characteristic of the imaging element 901 to light from a point light source PA and light from a point light source PB on the subject surface 31 in a case where the optical filter 902BW is used. The light from the point light source PA and the light from the point light source PB are modulated by the optical filter 902BW to be incident on the light-receiving surface 901A of the imaging element 901.

For example, the light-receiving sensitivity characteristic of the imaging element 901 to the light from the point light source PA is as a waveform Sa. That is, since a shadow is generated by the black pattern portion of the optical filter 902BW, a shaded pattern is generated in an image on the light-receiving surface 901A for the light from the point light source PA. Similarly, the light-receiving sensitivity characteristic of the imaging element 901 to the light from the point light source PB is as a waveform Sb. That is, since a shadow is generated by the black pattern portion of the optical filter 902BW, a shaded pattern is generated in an image on the light-receiving surface 901A for the light from the point light source PB.

Note that, the light from the point light source PA and the light from the point light source PB have different incident angles with respect to each white pattern portion of the optical filter 902BW, so that there is a shift in appearance of the shaded pattern on the light-receiving surface. Therefore, each pixel of the imaging element 901 has the incident angle directivity to each point light source on the subject surface 31.

This method is disclosed in detail, for example, in Non-Patent Document 1 described above.

Figure 45:
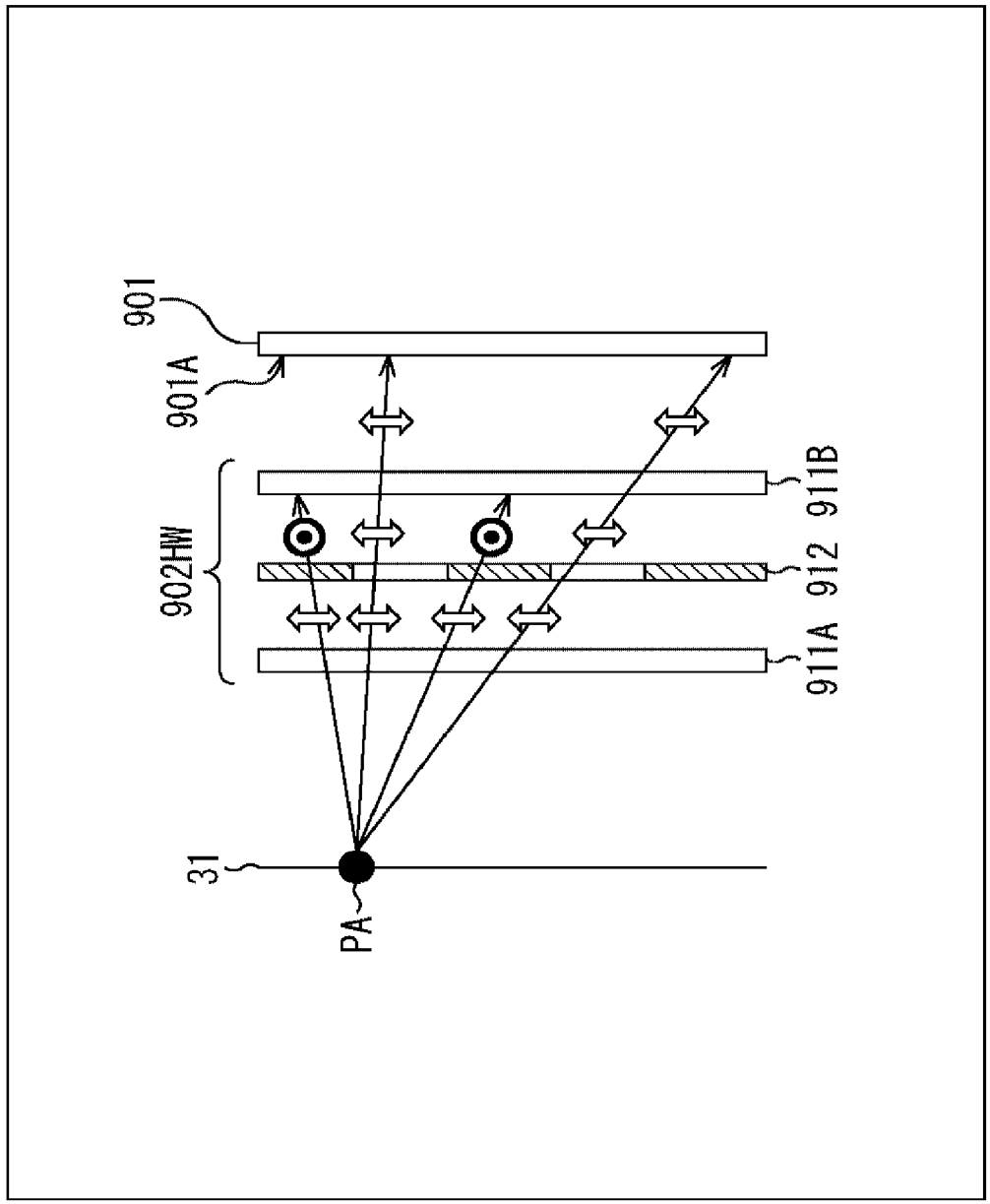
FIG. 45 is a view illustrating a variation of the imaging element.

Note that, an optical filter 902HW in FIG. 45 may be used in place of the black pattern portion of the optical filter 902BW. The optical filter 902HW includes linear polarizing elements 911A and 911B having the same polarizing direction, and a half-wavelength plate 912, and the half-wavelength plate 912 is interposed between the linear polarizing elements 911A and 911B. The half-wavelength plate 912 includes a polarizing portion indicated by oblique lines in place of the black pattern portion of the optical filter 902BW, and the white pattern portion and the polarizing portion are randomly arranged.

The linear polarizing element 911A transmits only light in a predetermined polarizing direction out of substantially non-polarized light emitted from the point light source PA. Hereinafter, it is assumed that the linear polarizing element 911A transmits only light the polarizing direction of which is parallel to the drawing. Out of polarized light transmitted through the linear polarizing element 911A, the polarized light transmitted through the polarizing portion of the half-wavelength plate 912 is such that a polarizing surface is rotated and the polarizing direction changes in a direction perpendicular to the drawing. On the other hand, out of the polarized light transmitted through the linear polarizing element 911A, the polarized light transmitted through the white pattern portion of the half-wavelength plate 912 is such that the polarizing direction remains unchanged from the direction parallel to the drawing. Then, the linear polarizing element 911B transmits the polarized light transmitted through the white pattern portion and hardly transmits the polarized light transmitted through the polarizing portion. Accordingly, an amount of polarized light transmitted through the polarizing portion is reduced as compared to the polarized light transmitted through the white pattern portion. Therefore, a shaded pattern substantially similar to that in a case of using the optical filter BW is generated on the light-receiving surface 901A of the imaging element 901.

Figure 46:
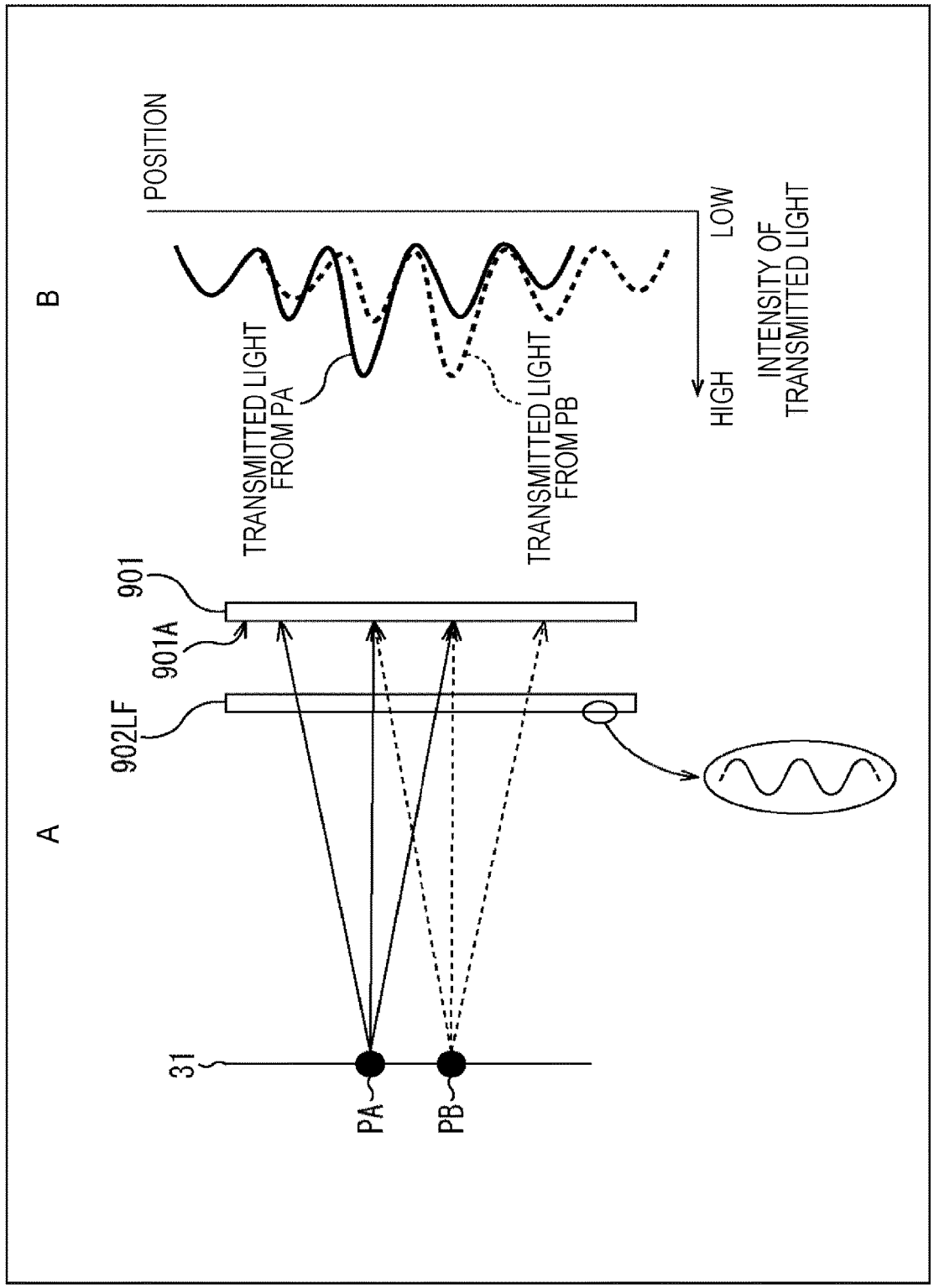
FIG. 46 is a view illustrating a variation of the imaging element.

Furthermore, as illustrated in A of FIG. 46, an optical interference mask may be used as an optical filter 902LF. The light emitted from the point light source PA and the light emitted from the point light source PB of the subject surface 31 are emitted to the light-receiving surface 901A of the imaging element 901 via the optical filter 902LF. As illustrated in an enlarged view in a lower portion in A of FIG. 46, for example, a light incident surface of the optical filter 902LF includes irregularities of about a wavelength. Furthermore, in the optical filter 902LF, transmission of light having a specific wavelength emitted in the vertical direction is the maximum. When a change in incident angle (inclination with respect to the vertical direction) of the light beams having the specific wavelength emitted from the point light sources PA and PB of the subject surface 31 on the optical filter 902LF increases, an optical path length changes. Here, when the optical path length is an odd multiple of the half wavelength, the light beams weaken each other, and when this is an even multiple of the half wavelength, the light beams strengthen each other. That is, intensities of the transmitted light beams having the specific wavelength emitted from the point light sources PA and PB and transmitted through the optical filter 902LF are modulated according to the incident angle with respect to the optical filter 902LF to be incident on the light-receiving surface 901A of the imaging element 901 as illustrated in B of FIG. 46. Therefore, the detection signal output from each pixel output unit of the imaging element 901 is a signal obtained by combining the modulated light intensities of the point light sources for each pixel output unit.

This method is disclosed in detail, for example, in Patent Document 1 described above.

Note that, in the methods of Patent Document 1 and Non-Patent Document 1, it is not possible to independently set the incident angle directivity in a pixel 121a unit without affecting adjacent pixels as the imaging element 121 using the pixel 121a in FIG. 4 or the pixel 121a in FIG. 5 described above. Therefore, for example, when the pattern of the optical filter 902BW or the pattern of a diffraction grating of the optical filter 902LF is different, the incident angle directivities of at least a plurality of adjacent pixels of the imaging element 901 are different from each other. Furthermore, the pixels 121a located at close positions have incident angle directivities close to each other.

<Other Variations>

Furthermore, the present disclosure is also applicable to the imaging device and imaging element that image light of a wavelength other than visible light such as infrared light. In this case, the restored image is not the image in which the user may visually recognize the subject but the image in which the user cannot visually recognize the subject. Also in this case, by using the present technology, the image quality of the restored image is improved for an image processing device and the like capable of recognizing the subject. Note that, since it is difficult for a normal imaging lens to transmit far-infrared light, the present technology is effective in a case of imaging the far-infrared light, for example. Therefore, the restored image may be a far-infrared light image, and may be a visible light image or a non-visible light image in addition to the far-infrared light image.

Moreover, for example, by applying machine learning such as deep learning, it is also possible to perform image recognition and the like using the detection image before restoration without using the restored image after the restoration. In this case also, accuracy of image recognition using the detection image before the restoration is improved by using the present technology. In other words, the image quality of the detection image before the restoration is improved.

5. Other

The above-described series of processes may be executed by hardware or may be executed by software. In a case where a series of processes is executed by the software, a program which forms the software is installed on a computer. Here, the computer includes a computer (for example, the control unit 123 and the like) incorporated in dedicated hardware, for example.

The program executed by the computer may be recorded in a recording medium (for example, the recording medium 130 and the like) as a package medium and the like to be provided, for example. Furthermore, the program may be provided by means of a wired or wireless transmission medium such as a local area network, the Internet, and digital broadcasting.

Note that, the program executed by the computer may be the program of which processes are performed in chronological order in the order described in this specification or may be the program of which processes are performed in parallel or at required timing such as when a call is issued.

Furthermore, the embodiment of the present technology is not limited to the above-described embodiments and various modifications may be made without departing from the gist of the present technology.

For example, the present technology may be configured as cloud computing in which a function is shared by a plurality of devices through the network to process together.

Moreover, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Note that, the present disclosure may also have the following configuration.

(1)

A signal processing device including:

a restoration unit that restores one restored image by using a plurality of detection signal sets obtained by an imaging element in a plurality of states in which at least one of a position or orientation with respect to a subject is different, the imaging element that includes a plurality of pixel output units that receives incident light from the subject incident without an intervention of an imaging lens or a pinhole and each outputs one detection signal indicating an output pixel value modulated by an incident angle of the incident light, and outputs a detection signal set including a plurality of detection signals output from the plurality of pixel output units.

(2)

The signal processing device according to (1) described above, in which the plurality of detection signal sets is obtained by a plurality of imaging elements.

(3)

The signal processing device according to (2) described above, in which the restoration unit restores the one restored image by using the plurality of detection signal sets and a coefficient set group selected on the basis of a distance between each of the plurality of imaging elements and the subject.

(4)

The signal processing device according to (3) described above, in which, in a case where the distance between each of the imaging elements and the subject is shorter than a predetermined distance, the restoration unit restores the one restored image by using a coefficient set group selected on the basis of both the distance and a position of each of the imaging elements with respect to the subject, and the plurality of detection signal sets.

(5)

The signal processing device according to (3) described above, in which the restoration unit restores the one restored image by using a coefficient set group selected on the basis of the distance, the position, and orientation of each of the imaging elements with respect to the subject, and the plurality of detection signal sets.

(6)

The signal processing device according to any one of (3) to (5) described above, in which the restoration unit restores the one restored image by using one simultaneous equation using the plurality of detection signal sets and the coefficient set group.

(7)

The signal processing device according to any one of (2) to (6) described above, further including: at least a part of the imaging elements out of the plurality of imaging elements.

(8)

The signal processing device according to (7) described above, in which the restoration unit restores the one restored image by using a detection signal set obtained by the at least a part of the imaging elements included in the signal processing device, and a detection signal set obtained by an imaging element different from the imaging element included in the signal processing device.

(9)

The signal processing device according to (7) or (8) described above, in which at least a part of the pixel output units of the at least a part of the imaging elements has incident angle directivity indicating directivity to the incident angle of the incident light from the subject.

(10)

The signal processing device according to (9) described above, in which incident angle directivities of two or more imaging elements out of the plurality of imaging elements are different from each other.

(11)

The signal processing device according to (9) or (10) described above, in which incident angle directivities of two or more imaging elements out of the plurality of imaging elements are same.

(12)

The signal processing device according to (1) described above, in which the plurality of detection signal sets is obtained in each of the states by one imaging element.

(13)

The signal processing device according to (12) described above, further including:

the imaging element.

(14)

The signal processing device according to (13) described above, in which at least a part of the pixel output units of the imaging element has incident angle directivity indicating directivity to the incident angle of the incident light.

(15)

The signal processing device according to (13) or (14) described above, in which the plurality of pixel output units of the imaging element has a configuration capable of independently setting incident angle directivity indicating directivity to the incident angle of the incident light.

(16)

An imaging device including:

one or more imaging elements that includes a plurality of pixel output units that receives incident light from a subject incident without an intervention of an imaging lens or a pinhole and each outputs one detection signal indicating an output pixel value modulated by an incident angle of the incident light, and outputs a detection signal set including a plurality of detection signals output from the plurality of pixel output units; and an association unit that associates the detection signal set with metadata used for restoring a restored image using the detection signal set.

(17)

The imaging device according to (16) described above, in which the metadata includes at least one of a distance between the imaging element and the subject, a position of the imaging element with respect to the subject, or orientation of the imaging element with respect to the subject.

(18)

The imaging device according to (16) or (17) described above, in which the association unit associates a plurality of detection signal sets obtained by a plurality of imaging elements including the one or more imaging elements and the metadata used for restoring the restored image using the plurality of detection signal sets.

(19)

The imaging device according to any one of (16) to (18) described above, in which the plurality of imaging elements includes an imaging element provided in another imaging device.

(20)

The imaging device according to any one of (16) to (19) described above, in which at least a part of the pixel output units of the plurality of imaging elements has incident angle directivity indicating directivity to the incident angle of the incident light from the subject.

(21)

The imaging device according to any one of (16) to (20), further including:

a communication unit that transmits the detection signal set.

(22)

The imaging device according to (21) described above, in which the communication unit transmits the metadata associated with the detection signal set.

(23)

The imaging device according to any one of (16) to (22) described above, in which the plurality of pixel output units has a configuration capable of independently setting incident angle directivity indicating directivity to the incident angle of the incident light from the subject.

Note that, the effects described in this specification are illustrative only and are not limitative; there may also be another effect.

REFERENCE SIGNS LIST

101 Imaging device
111 Signal processing control unit
121 Imaging element
121a, 121a' Pixel
121aA Pixel for restoration
121aB Pixel for exposure
121A Light-receiving surface
121b Light-shielding film
121c On-chip lens
121e, 121f Photodiode
122 Restoration unit
123 Control unit
125 Detection unit
126 Association unit
301 Imaging system
311 Imaging device group
312 Signal processing device
321-1 to 321-n Imaging device
401 Signal processing control unit
411 Control unit
413 Association unit
501 Restoration unit
502 Control unit
504 Association unit
601 Imaging system
611 Imaging device group
621 Imaging device
651 Imaging system
661 Imaging device group
671 Imaging device
701 Imaging device
711 Imaging unit
801b, 801s Pixel output unit
901 Imaging element
901A Light-receiving surface
902, 902BW, 902F Optical filter

The invention claimed is:

1. A signal processing device comprising:

processing circuitry configured to restore an image by using a plurality of detection signal sets obtained by an imaging element in a plurality of states in which at least one of a position or orientation with respect to a subject is different; and the imaging element including a plurality of pixel output units, receiving incident light from the subject incident without an intervention of both an imaging lens and a pinhole, generating a detection signal indicating an output pixel value modulated by an incident angle of the incident light, and outputting a detection signal set including a plurality of detection signals output from the plurality of pixel output units, wherein the plurality of detection signal sets is obtained by a plurality of imaging elements, and the processing circuitry is configured to restore the image by using the plurality of detection signal sets and a coefficient set group selected on a basis of a distance between each of the plurality of imaging elements and the subject.

2. The signal processing device according to claim 1, wherein, in response to a determination that the distance between each of the imaging elements and the subject is shorter than a predetermined distance, the processing circuitry is configure to restore the image by using a coefficient set group selected on a basis of both the distance and a position of each of the imaging elements with respect to the subject, and the plurality of detection signal sets.

3. The signal processing device according to claim 1, wherein the processing circuitry is configured to restore the image by using a coefficient set group selected on a basis of the distance, the position, and orientation of each of the imaging elements with respect to the subject, and the plurality of detection signal sets.

4. The signal processing device according to claim 1, wherein the processing circuitry is configured to restore the image by using one simultaneous equation using the plurality of detection signal sets and the coefficient set group.

5. The signal processing device according to claim 1, further comprising:

two or more of the plurality of imaging elements.

6. The signal processing device according to claim 5, wherein at least a part of the pixel output units of the two or more of the imaging elements has incident angle directivity indicating directivity to the incident angle of the incident light from the subject.

7. The signal processing device according to claim 6, wherein incident angle directivities of two or more imaging elements out of the plurality of imaging elements are different from each other.

8. The signal processing device according to claim 6, wherein incident angle directivities of two or more imaging elements out of the plurality of imaging elements are same.

9. The signal processing device according to claim 1, wherein the plurality of pixel output units of the imaging element has a configuration capable of independently setting incident angle directivity for each pixel output unit, indicating directivity to the incident angle of the incident light from the subject.

10. A signal processing device comprising:

processing circuitry configured to restore an image by using a plurality of detection signal sets obtained by an imaging element in a plurality of states in which at least one of a position or orientation with respect to a subject is different; and the imaging element including a plurality of pixel output units, receiving incident light from the subject incident without an intervention of both an imaging lens and a pinhole, generating a detection signal indicating an output pixel value modulated by an incident angle of the incident light, and outputting a detection signal set including a plurality of detection signals output from the plurality of pixel output units, wherein the plurality of detection signal sets is obtained by two or more of imaging elements, and the processing circuitry is configured to restore the image by using a detection signal set obtained by the two or more of the imaging elements, and a detection signal set obtained by an imaging element different from the imaging elements included in the signal processing device.

11. The signal processing device according to claim 10, wherein at least a part of the pixel output units of the two or more of the imaging elements has incident angle directivity indicating directivity to the incident angle of the incident light from the subject.

12. The signal processing device according to claim 11, wherein incident angle directivities of two or more imaging elements out of the plurality of imaging elements are different from each other.

13. The signal processing device according to claim 11, wherein incident angle directivities of two or more imaging elements out of the plurality of imaging elements are same.

14. The signal processing device according to claim 10, wherein the plurality of pixel output units has a configuration capable of independently setting incident angle directivity for each pixel output unit, indicating directivity to the incident angle of the incident light from the subject.

15. An imaging device comprising:

an imaging element that includes a plurality of pixel output units receiving incident light from a subject incident without an intervention of both an imaging lens and a pinhole, generating a detection signal indicating an output pixel value modulated by an incident angle of the incident light, and outputting a detection signal set including a plurality of detection signals output from the plurality of pixel output units; and processing circuitry configured to associate the detection signal set with metadata for restoring an image using the detection signal set, wherein the processing circuitry is configured to associate a plurality of detection signal sets obtained by a plurality of imaging elements including the imaging element and the metadata for restoring the image using the plurality of detection signal sets, and the plurality of imaging elements includes an imaging element provided in another imaging device.

16. The imaging device according to claim 15, wherein the metadata includes at least one of a distance between the imaging element and the subject, a position of the imaging element with respect to the subject, orientation of the imaging element with respect to the subject, or a coefficient set group.

17. The imaging device according to claim 15, wherein at least a part of the pixel output units of the plurality of imaging elements has incident angle directivity indicating directivity to the incident angle of the incident light from the subject.

18. The imaging device according to claim 15, further comprising:

a transmitter that transmits the detection signal set.

19. The imaging device according to claim 18, wherein the transmitter transmits the metadata associated with the detection signal set.

20. The imaging device according to claim 15, wherein the plurality of pixel output units has a configuration capable of independently setting incident angle directivity for each pixel output unit, indicating directivity to the incident angle of the incident light from the subject.

* * * * *